US012574942B2

(12) United States Patent
Gao et al.

(10) Patent No.: US 12,574,942 B2
(45) Date of Patent: Mar. 10, 2026

(54) METHOD, DEVICE AND COMPUTER READABLE MEDIUM FOR PHYSICAL UPLINK SHARED CHANNEL REPETITION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 334 days.

(21) Appl. No.: 18/039,749

(22) PCT Filed: Dec. 3, 2020

(86) PCT No.: PCT/CN2020/133652
§ 371 (c)(1),
(2) Date: Jun. 1, 2023

(87) PCT Pub. No.: WO2022/116094
PCT Pub. Date: Jun. 9, 2022

(65) Prior Publication Data
US 2024/0129932 A1      Apr. 18, 2024

(51) Int. Cl.
*H04W 72/232*          (2023.01)
*H04B 7/0456*          (2017.01)
(Continued)

(52) U.S. Cl.
CPC ........ *H04W 72/232* (2023.01); *H04B 7/0481* (2023.05); *H04B 7/0639* (2013.01); *H04L 5/0051* (2013.01); *H04W 72/1268* (2013.01)

(58) Field of Classification Search
CPC ............ H04W 72/232; H04W 72/1268; H04B 7/0481; H04B 7/0639; H04B 7/0478; H04B 7/0404; H04L 5/0051; Y02D 30/70
See application file for complete search history.

(56) References Cited

U.S. PATENT DOCUMENTS

2018/0183503 A1    6/2018  Rahman et al.
2019/0181976 A1*   6/2019  Golitschek Edler von Elbwart ...
                                              H04W 72/0446
(Continued)

FOREIGN PATENT DOCUMENTS

CN       110856235 A      2/2020
CN       110958699 A      4/2020
(Continued)

OTHER PUBLICATIONS

JP Office Action for JP Application No. 2023-534005, mailed on Sep. 3, 2024 with English Translation.
(Continued)

*Primary Examiner* — Kiet Tang
(74) *Attorney, Agent, or Firm* — Sughrue Mion, PLLC

(57)          ABSTRACT

Embodiments of the present disclosure relate to methods, devices and computer readable media for communication of a RS. According to embodiments of the present disclosure, the terminal device receives information indicating a set of resources for transmitting a reference signal from the network device. If the terminal device receives an indication in a first slot for triggering a transmission of the reference signal, the terminal device determines a second slot for transmitting the reference signal. The terminal device determines whether the second slot is valid based on a slot configuration. In this way, it can avoid the SRS transmission timing ambiguous or misalignment between terminal device and network.

10 Claims, 7 Drawing Sheets

300

310
RECEIVE CONTROL INFORMATION INDICATING A FIRST INDEX ASSOCIATED WITH A FIRST TPMI AND A SECOND INDEX ASSOCIATED WITH A SECOND TPMI

320
DETERMINE THE SECOND TPMI

330
TRANSMIT THE PLURALIYT OF PUSCH TRANSMISSIONS

(51) Int. Cl.
     *H04B 7/06*     (2006.01)
     *H04L 5/00*     (2006.01)
     *H04W 72/1268*  (2023.01)

(56)                    References Cited

U.S. PATENT DOCUMENTS

| | | | | |
|---|---|---|---|---|
| 2019/0320469 A1* | 10/2019 | Huang | .................. | H04L 5/0053 |
| 2020/0106559 A1 | 4/2020 | Vilaipornsawai et al. | | |
| 2020/0186215 A1 | 6/2020 | Rahman et al. | | |
| 2020/0367217 A1 | 11/2020 | Wang et al. | | |
| 2021/0226680 A1* | 7/2021 | Khoshnevisan | ..... | H04B 7/0404 |
| 2021/0337534 A1* | 10/2021 | Xiong | ........................ | H04L 1/08 |
| 2023/0269734 A1 | 8/2023 | Matsumura et al. | | |

FOREIGN PATENT DOCUMENTS

| | | |
|---|---|---|
| WO | 2020/035069 A1 | 2/2020 |
| WO | 2022/029979 A1 | 2/2022 |

OTHER PUBLICATIONS

Extended European Search Report for EP Application No. 20963941. 8, dated on Jan. 15, 2024.

Qualcomm Incorporated, "Enhancements on Multi-TRP for PDCCH, PUCCH and PUSCH", 3GPP Draft, R1-2009251, Oct. 26-Nov. 13, 2020.

CATT, "Remaining issues on codebook based UL transmission", 3GPP TSG RAN WG1 Meeting #92bis, 2018, 5 pages, R1-1803738.

International Search Report of PCT/CN2020/133652 dated Sep. 6, 2021 [PCT/ISA/210].

Written Opinion of PCT/CN2020/133652 dated Sep. 6, 2021 [PCT/ISA/237].

EP Office Action for EP Application No. 20963941.8, mailed on Nov. 6, 2025.

Catt, "Remaining issues on codebook based UL transmission," 3GPP Draft; R1-1800237, Jan. 22-26, 2018.

Samsung, "Codebook-based UL transmission," 3GPP Draft; R1-1721399, Nov. 27-Dec. 1, 2017.

* cited by examiner

300

310

RECEIVE CONTROL INFORMATION INDICATING A FIRST INDEX ASSOCIATED WITH A FIRST TPMI AND A SECOND INDEX ASSOCIATED WITH A SECOND TPMI

320

DETERMINE THE SECOND TPMI

330

TRANSMIT THE PLURALIYT OF PUSCH TRANSMISSIONS

400

410

RECEIVE CONTROL INFORMATION INDICATING A
INDEX ASSOCIATED WITH A FIRST TPMI AND A
SECOND TPMI

420

DETERMINE THE SECOND TPMI

430

TRANSMIT THE PLURALIYT OF PUSCH
TRANSMISSIONS

600

610

TRANSMIT CONTROL INFORMATION INDICATING A
INDEX ASSOCIATED WITH A FIRST TPMI AND A
SECOND TPMI

620

RECEIVE THE PLURALIYT OF PUSCH TRANSMISSIONS

METHOD, DEVICE AND COMPUTER READABLE MEDIUM FOR PHYSICAL UPLINK SHARED CHANNEL REPETITION

CROSS REFERENCE TO RELATED APPLICATIONS

This application is a National Stage of International Application No. PCT/CN2020/133652 filed on Dec. 3, 2020.

TECHNICAL FIELD

Embodiments of the present disclosure generally relate to the field of telecommunication, and in particular, to methods, devices and computer storage media for physical uplink shared channel (PUSCH) repetitions.

BACKGROUND

Multi-input multi-output (MIMO) systems may include features that facilitate utilization of a large number of antenna elements at a base station for both sub-6 GHz and over-6 GHz frequency bands. In Release-17 (Rel-17), channels other than physical downlink shared channel (PDSCH) can benefit from multi-TRP transmission (as well as multi-panel reception) which also includes multi-TRP for inter-cell operations. Repetitions on PUSCH need to be further studied.

SUMMARY

In general, embodiments of the present disclosure provide methods, devices and computer storage media for PUSCH repetitions.

In a first aspect, there is provided a method of communication. The method comprises: receiving, from the network device, control information indicating a first index associated with a first transmission precoding matrix indicator (TPMI) and a second index associated with a second TPMI, the first index corresponding to a number of layers for a plurality of physical uplink shared channel (PUSCH) transmissions; determining the second TPMI based on the number of layers and at least one of: a configuration of codebook subset type, a configuration of full power mode, the first index, the second index, or a first value of the first TPMI; and transmitting, to the network device, the plurality of PUSCH transmissions processed based on the first TPMI and the second TPMI.

In a second aspect, there is provided a method of communication. The method comprises: receiving, from the network device, control information indicating an index associated with a first transmission precoding matrix indicator (TPMI) and a second TPMI for a plurality of physical uplink shared channel (PUSCH)transmissions, the index corresponding to a number of layers for the plurality of PUSCH transmissions; determining the second TPMI based on at least one of: the number of layers, a configuration of codebook subset type, a configuration of full power mode, the index or a first value of the first TPMI; and transmitting the plurality of PUSCH transmissions processed based on the first TPMI and the second TPMI.

In a third aspect, there is provided a method of communication. The method comprises: transmitting, to the terminal device, control information indicating a first index associated with a first transmission precoding matrix indicator (TPMI) and a second index associated with a second TPMI, the first index corresponding to a number of layers for a plurality of physical uplink shared channel (PUSCH) transmissions, the second TPMI determined based on the value of the number of layers and at least one of: a configuration of codebook subset type, a configuration of full power mode, the first index, the second index, or the first value of the first TPMI; and receiving, from the terminal deice, the plurality of PUSCH transmission processed based on based on the first TPMI and the second TPMI.

In a fourth aspect, there is provided a method of communication. The method comprises: transmitting, to the terminal device, control information control information indicating an index associated with a first transmission precoding matrix indicator (TPMI) and a second TPMI for a plurality of physical uplink shared channel (PUSCH) transmissions, the index corresponding to a number of layers for the plurality of PUSCH transmissions, the second TPMI for the plurality determined based on at least one of: the value of the number of layers, a configuration of codebook subset type, a configuration of full power mode, the index or the first value of the first TPMI; and receiving, from the terminal deice, the plurality of PUSCH transmission processed based on based on the first TPMI and the second TPMI.

In a fifth aspect, there is provided a terminal device. The terminal device comprises a processor and a memory coupled to the processor. The memory stores instructions that when executed by the processor, cause the terminal device to perform the method according to the first aspect or the second aspect of the present disclosure.

In a sixth aspect, there is provided a network device. The network device comprises a processor and a memory coupled to the processor. The memory stores instructions that when executed by the processor, cause the network device to perform the method according to the third aspect or the fourth aspect of the present disclosure.

In a fifth aspect, there is provided a computer readable medium having instructions stored thereon. The instructions, when executed on at least one processor, cause the at least one processor to perform the method according to the first aspect or the second aspect of the present disclosure.

In a sixth aspect, there is provided a computer readable medium having instructions stored thereon. The instructions, when executed on at least one processor, cause the at least one processor to perform the method according to the third aspect or the fourth second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
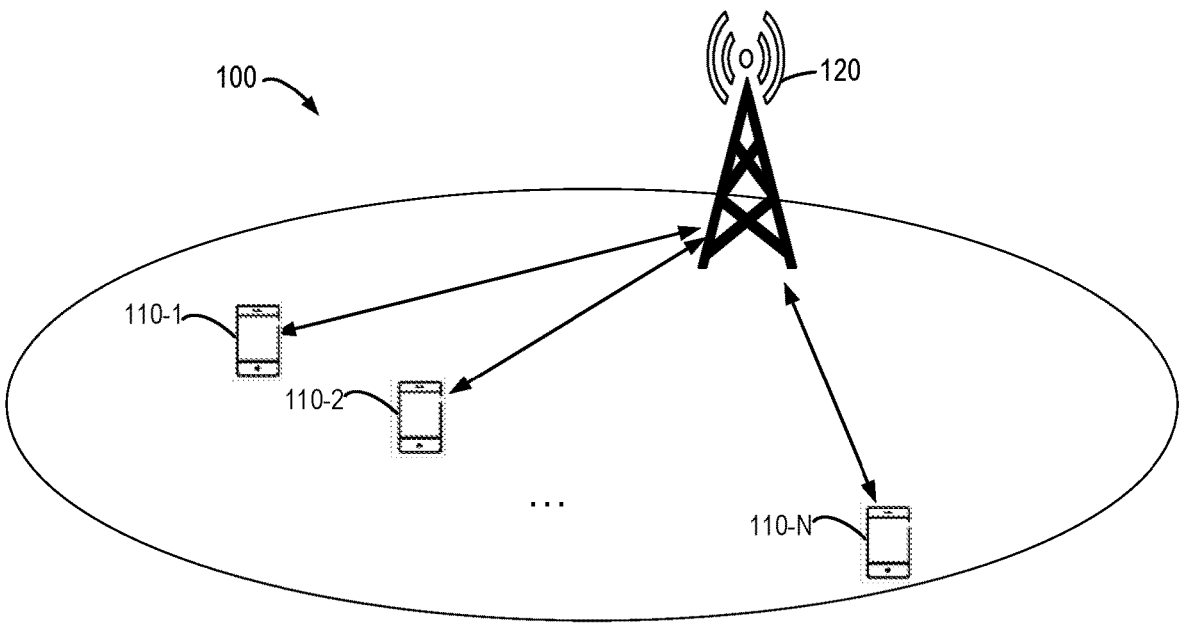
FIG. 1 is a schematic diagram of a communication environment in which embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

Support for multi-transmission point (TRP) deployment may be enhanced, which targets both frequency range (FR)1 and FR2. In particular, it can be to identify and specify features to improve reliability and robustness for channels other than PDSCH (that is, physical downlink control channel (PDCCH), PUSCH, and physical uplink control channel (PUCCH)) using multi-TRP and/or multi-panel, with Rel.16 reliability features as the baseline. To identify and specify features to enable inter-cell multi-TRP operations also can be considered. To evaluate and, if needed, specify enhancements for simultaneous multi-TRP transmission with multi-panel reception also can be considered.

For single downlink control information (DCI) based M-TRP PUSCH repetition schemes, codebook based PUSCH transmission may be supported with following enhancements: (1) support the indication of two sounding reference resource (SRS) resource indicators (SRIs): (i) bit field of SRI shall be enhanced and (ii) no changes on SRI field; (2) support the indication of two transmission precoding matrix indicators (TPMIs): (i) the same number of layers are applied for both TPMIs if two TPMIs are indicated; (ii) the number of SRS ports between two TRPs should be same. However, how to indicate two TPMIs are not considered which will influence at least a device's transmission or reception.

In order to solve at least part of the above mentioned problems, solutions on indicating TPMIs are proposed. According to embodiments of the present disclosure, a network device transmits control information indicating a first index associated with a first TPMI and a second index associated with a second TPMI to a terminal device. The terminal device determines the second TPMI based on the first index and at least one of: a configuration of codebook subset type, a configuration of full power mode, or a first value of the first TPMI. Alternatively, the network device transmits an index associated with the first TPMI and the second TPMI to the terminal device. In this way, overhead for communications can be reduced.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110." The number N can be any suitable integer number.

The communication system 100 further comprises network terminal device 120-1, a network device 120-2, . . . , a network device 120-M, which can be collectively referred to as "network device(s) 120." In some embodiments, the network device may be gNB. Alternatively, the network device may be IAB. The number M can be any suitable integer number. In the communication system 100, the network devices 120 and the terminal devices 110 can communicate data and control information to each other. Only for the purpose of illustrations, the network device 120-1 can be regarded as a source network device and the network device 120-2 can be regarded as a target network device. The numbers of terminal devices and network devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
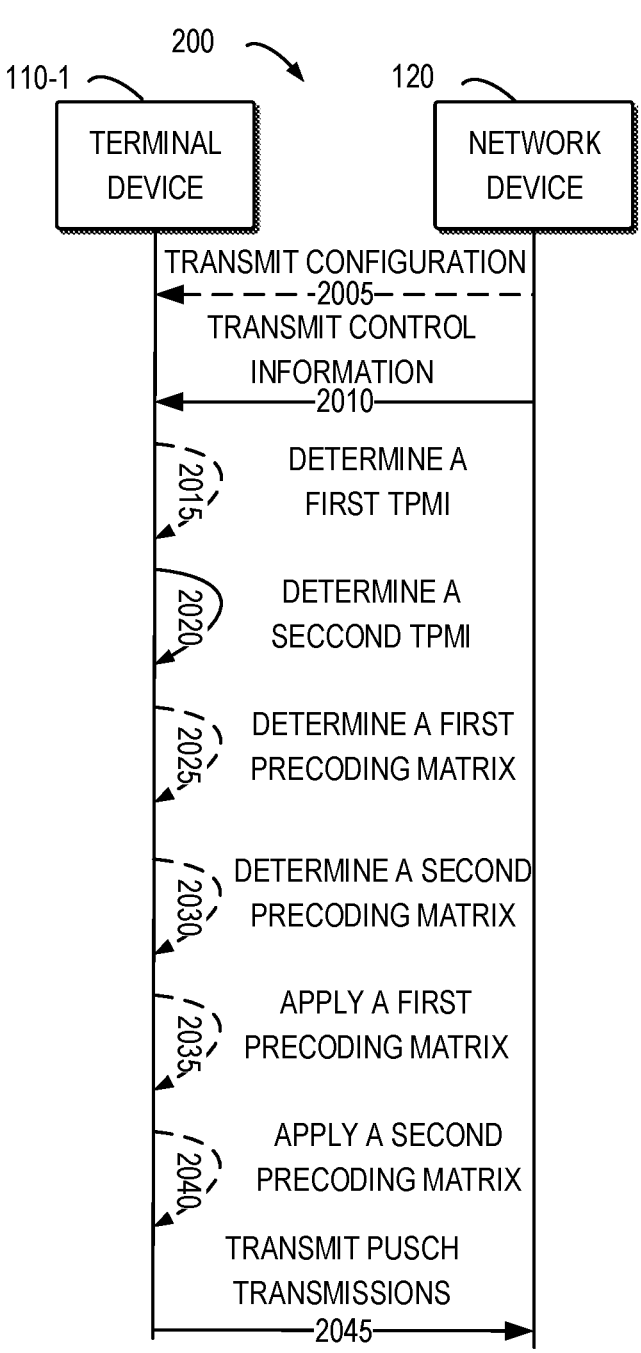
FIG. 2 illustrates a schematic diagram of interactions according to embodiments of the present disclosure.

Example embodiments of the present disclosure will be described in detail below with reference to the accompanying drawings. Reference is now made to FIG. 2, which illustrates a signaling flow 200 for PUSCH repetitions according to example embodiments of the present disclosure. For the purpose of discussion, the signaling flow 200 will be described with reference to FIG. 1. Only for the purpose of illustrations, the signaling flow 200 may involve the terminal device 110-1 and the network device 120.

In the following, the terms "transmission occasion", "transmission" and "repetition" can be used interchangeably. The terms "DCI", "DCI format" and "PDCCH" can be used interchangeably. The terms "TCI state", "Quasi-colocation (QCL)", "set of QCL parameter(s)", "QCL parameter(s)", "QCL assumption", "QCL configuration", "beam", "precoder", "precoding", "precoding matrix", "spatial relation info", "spatial relation information", "TPMI", "PMI", "transmission precoding matrix indicator" and "precoding matrix indicator" can be used interchangeably.

The network device 120 may transmit 2005 a configuration of a plurality of PUSCH transmissions to the terminal device 110-1. For example, the configuration may indicate resources for the plurality of PUSCH. Alternatively or in addition, the configuration may indicate receptions of the PUSCH. In some embodiments, the plurality of PUSCH transmissions may comprise a first number (for example, K1) of PUSCH transmissions. The first number K1 may be a positive integer. For example, K1 is in a range from 1 to 128. For example, the first number K1 may be any suitable number for {1, 2, 3, . . . , 128}. In some embodiments, the plurality of PUSCH transmissions may comprise a first set of PUSCH transmissions and a second set of PUSCH transmissions. The first set of PUSCH transmissions may comprise a second number (for example, K2) of PUSCH transmissions. The second number K2 is a positive integer. For example, K2 is in a range from 1 to 64. For example, the second number K2 may be any suitable number for {1, 2, 3, . . . , 64}. The second set of PUSCH transmissions may comprise a third number (for example, K3) of PUSCH transmissions. The third number K3 is a positive integer. For example, K3 is in a range from 1 to 64. For example, the third number K3 may be any suitable number for {1, 2, 3, . . . , 64}. In some embodiments, the first number K1 equals to the sum of the second number K2 and the third number K3. For example, K1=K2+K3. It should be noted that the plurality of PUSCH transmissions may comprise any suitable sets of PUSCH transmissions.

If the terminal device 110-1 is configured with single DCI based M-TRP PUSCH repetition schemes, and the terminal device 110-1 may be configured with codebook based uplink/PUSCH transmission (when the higher layer parameter txConfig in pusch-Config is set to 'codebook'), there may be two sets of PUSCH transmissions/repetitions and the precoder for the first set of PUSCH transmissions/repetitions is based on the TPMI/PMI indicated in the field "precoding information and number of layers" (or represented as the first TPMI/PMI/RI field) in DCI. An additional (i.e., second) precoding information (or represented as the additional/second TPMI/PMI) field may be introduced to indicate the TPMI/PMI (for the second set of PUSCH transmissions/repetitions), and the precoder for the second set of PUSCH transmissions/repetitions may be based on the TPMI/PMI indicated by the additional/second TPMI/PMI field. Alternatively, two TPMI/PMI (or precoding information) fields may indicate TPMI/PMI (for the first and second set of PUSCH transmissions/repetitions respectively).

In some embodiments, the terminal device 110-1 may be configured with one or more configurations, and the one or more configurations may include at least one of a configuration of a plurality of PUSCH transmissions/repetitions, and the plurality of PUSCH transmissions/repetitions may be scheduled by a single DCI, a configuration of the number of transmissions/repetitions for the plurality of PUSCH transmissions/repetitions, a configuration with codebook based uplink/PUSCH transmission/repetition (for example, when the higher layer parameter txConfig in pusch-Config is set to 'codebook'), a configuration of up to two TPMIs for the plurality of PUSCH transmissions/repetitions, a configuration of up to two SRIs for the plurality of PUSCH transmissions/repetitions, a configuration of up to two spatial relation information for the plurality of PUSCH transmissions/repetitions, a configuration of up to two precoders for the plurality of PUSCH transmissions/repetitions and a configuration of up to two uplink beams for the plurality of PUSCH transmissions/repetitions. In some embodiments, the one or more configurations may be configured via at least one of RRC, MAC CE and DCI. In some embodiments, the terminal device may receive a DCI to schedule a plurality of PUSCH transmissions/repetitions, and there may be two sets of PUSCH transmissions/repetitions for the plurality of PUSCH transmissions. In some embodiments, there may be two fields in the DCI (for example, the first field and the second field), and number of layers for the first and second set of PUSCH transmissions/repetitions (or for the plurality of PUSCH transmissions/repetitions) is indicated by the first index in the first field. And the first TPMI for the first set of PUSCH transmissions/repetitions is indicated by the first index in the first field. And the second TPMI for the second set of PUSCH transmissions/repetitions may be indicated by the second index in the second field. In some embodiments, there may be one field in the DCI, and number of layers for the first and second set of PUSCH transmissions/repetitions (or for the plurality of PUSCH transmissions/repetitions) and the first TPMI for the first set of PUSCH transmissions/repetitions and the second TPMI for the second set of PUSCH transmissions/repetitions may be indicated by the index in the field.

In some embodiments, there may be two fields in the DCI (for example, the first field and the second field), and the first number of the plurality of PUSCH transmissions may be configured as one, then the number of layers and the first TPMI indicated in the first field is applied for the PUSCH transmission. For example, the second field and/or the second index and/or the second TPMI may be ignored. In some embodiments, there may be one field in the DCI, and the first number of the plurality of PUSCH transmissions may be configured as one, then the number of layers and the first TPMI indicated in the field is applied for the PUSCH transmission. For example, the second TPMI may be ignored.

In some embodiments, the nominal number of the plurality of PUSCH transmissions may be configured as one, and the nominal one PUSCH transmission may consist A actual transmissions/repetitions, and A is a positive integer. For example, A may be at least one of $\{1, 2, 3, 4, 5, 6, 7\}$. In some embodiments, if the value of A is 1, there is one actual PUSCH transmission. For example, the first set of actual PUSCH transmissions/repetitions may include the actual one PUSCH transmission. For another example, there is no PUSCH transmission/repetition in the second set of actual PUSCH transmissions/repetitions. In some embodiments, if the value of A is larger than 1 (for example, A is at least one of $\{2, 3, 4, 5, 6, 7\}$), the actual A PUSCH transmissions/repetitions may include two sets of actual PUSCH transmissions/repetitions. The number of the first set of actual PUSCH transmissions/repetitions may be A1, and A1 may be a positive integer. For example, A1 may be at least one of $\{1, 2, 3, 4, 5, 6, 7\}$. And the number of the second set of actual PUSCH transmissions/repetitions may be A2, and A2 may be a non-negative integer. For example, A2 may be at least one of $\{0, 1, 2, 3, 4, 5, 6\}$. And A1+A2=A.

In some embodiments, there may be two fields in the DCI (for example, the first field and the second field), and the nominal number of the plurality of PUSCH transmissions may be configured as one, and the nominal one PUSCH transmission may consist A actual transmissions/repetitions, and A is a positive integer. For example, A may be at least one of $\{1, 2, 3, 4, 5, 6, 7\}$. In some embodiments, the number of layers and the first TPMI indicated by the first index in the first field is applied for the actual A PUSCH transmissions. For example, the second field and/or the second index and/or the second TPMI may be ignored. In some embodiments, if the value of A is 1, the number of layers and the first TPMI indicated in the first field is applied for the actual 1 PUSCH transmission. For example, the second field and/or the second index and/or the second TPMI may be ignored. In some embodiments, if the value of A is larger than 1 (for example, A is at least one of $\{2, 3, 4, 5, 6, 7\}$), the number of layers indicated by the first index in the first field is applied to the A actual PUSCH transmissions/repetitions. And the first TPMI indicated by the first index in the first field is applied for the first set of actual A1 PUSCH transmissions/repetitions. And the second TPMI indicated by the second index in the second field is applied for the second set of actual A2 PUSCH transmissions/repetitions. In some embodiments, there may be one field in the DCI, and the nominal number of the plurality of PUSCH transmissions may be configured as one, and the nominal one PUSCH transmission may consist A actual transmissions/repetitions, and A is a positive integer. For example, A may be at least one of $\{1, 2, 3, 4, 5, 6, 7\}$. In some embodiments, the number of layers and the first TPMI indicated by the index in the field is applied for the actual A PUSCH transmissions. For example, the second TPMI may be ignored. In some embodiments, if the value of A is 1, the number of layers and the first TPMI indicated by the index in the first field is applied for the actual 1 PUSCH transmission. For example, the second TPMI may be ignored. In some embodiments, if the value of A is larger than 1 (for example, A is at least one of $\{2, 3, 4, 5, 6, 7\}$), the number of layers indicated by the index in the field is applied to the A actual PUSCH transmissions/repetitions. And the first TPMI indicated by the index in the field is applied for the first set of actual A1 PUSCH transmissions/repetitions. And the second TPMI indicated by the index in the field is applied for the second set of actual A2 PUSCH transmissions/repetitions.

In some embodiments, the terminal device 110-1 may determine invalid symbol(s) for the plurality of PUSCH transmissions/repetitions as follows:

A symbol that is indicated as downlink by tdd-UL-DL-ConfigurationCommon or tdd-UL-DL-Configuration-Dedicated is considered as an invalid symbol for the plurality of PUSCH transmissions/repetitions.

For operation in unpaired spectrum, symbols indicated by ssb-PositionsInBurst in SIB1 or ssb-PositionsInBurst in ServingCellConfigCommon for reception of SS/PBCH blocks are considered as invalid symbols for the plurality of PUSCH transmissions/repetitions.

For operation in unpaired spectrum, symbol(s) indicated by pdcch-ConfigSIB1 in MIB for a CORESET for Type0-PDCCH CSS set are considered as invalid symbol(s) for the plurality of PUSCH transmissions/repetitions.

For operation in unpaired spectrum, if numberOfInvalidSymbolsForDL-UL-Switching-r16 is configured, numberOfInvalidSymbolsForDL-UL-Switching-r16 symbol(s) after the last symbol that is indicated as downlink in each consecutive set of all symbols that are indicated as downlink by tdd-UL-DL-ConfigurationCommon or tdd-UL-DL-ConfigurationDedicated are considered as invalid symbol(s) for the plurality of PUSCH transmissions/repetitions. The symbol(s) given by numberOfInvalidSymbolsForDL-UL-Switching-r16 are defined using the reference SCS configuration referenceSubcarrierSpacing provided in tdd-UL-DL-Configuration-Common.

The terminal device may be configured with the higher layer parameter invalidSymbolPattern-r16, which provides a symbol level bitmap spanning one or two slots (higher layer parameter symbols-r16 given by invalidSymbolPattern-r16). A bit value equal to 1 in the symbol level bitmap symbols-r16 indicates that the corresponding symbol is an invalid symbol for the plurality of PUSCH transmissions/repetitions. The terminal device may be additionally configured with a time-domain pattern (higher layer parameter periodicityAndPattern-r16 given byinvalidSymbolPattern-r16), where each bit of periodicityAndPattern-r16 corresponds to a unit equal to a duration of the symbol level bitmap symbols-r16, and a bit value equal to 1 indicates that the symbol level bitmap symbols-r16 is present in the unit. The periodicityAndPattern-r16 can be {1, 2, 4, 5, 8, 10, 20 or 40} units long, but maximum of 40 ms. The first symbol of periodicityAndPattern-r16 every 40 ms/P periods is a first symbol in frame of mod 4=0, where P is the duration of periodicityAndPattern-r16 in units of ms. When periodicityAndPattern-r16 is not configured, for a symbol level bitmap spanning two slots, the bits of the first and second slots correspond respectively to even and odd slots of a radio frame, and for a symbol level bitmap spanning one slot, the bits of the slot correspond to every slot of a radio frame. If invalidS-ymbolPattern-r16 is configured, when the terminal device applies the invalid symbol pattern is determined as follows:

if the PUSCH is scheduled by DCI format 0_1, or corresponds to a Type 2 configured grant activated by DCI format 0_1, and if invalidSymbolPattern-IndicatorForDCI-Format0-1-r16 is configured, if invalid symbol pattern indicator field is set 1, the terminal device applies the invalid symbol pattern; otherwise, the terminal device does not apply the invalid symbol pattern;

if the PUSCH is scheduled by DCI format 0_2, or corresponds to a Type 2 configured grant activated by DCI format 0_2, and if invalidSymbolPattern-IndicatorForDCI-Format0-2-r16 is configured, if invalid symbol pattern indicator field is set 1, the terminal device applies the invalid symbol pattern; otherwise, the terminal device does not apply the invalid symbol pattern;

otherwise, the terminal device applies the invalid symbol pattern.

If the terminal device is configured with multiple serving cells and is provided half-duplex-behavior-r16='enable', and is not capable of simultaneous transmission and reception on any of the multiple serving cells, and indicates support of capability for half-duplex operation in CA with unpaired spectrum, and is not configured to monitor PDCCH for detection of DCI format 2-0 on any of the multiple serving cells, a symbol is considered as an invalid symbol in any of the multiple serving cells for the plurality of PUSCH transmissions/repetitions if the symbol is indicated to the terminal device for reception of SS/PBCH blocks in any of the multiple serving cells by ssb-PositionsIn-Burst in SIB1 or ssb-PositionsInBurst in ServingCell-ConfigCommon, and a symbol is considered as an invalid symbol in any of the multiple serving cells for the plurality of PUSCH transmissions/repetitions with Type 1 or Type 2 configured grant except for the first Type 2 PUSCH transmission (including all repetitions) after activation if the symbol is indicated as downlink by tdd-UL-DL-Con-figurationCommon or tdd-UL-DL-ConfigurationDedi-cated on the reference cell, or the terminal device is configured by higher layers to receive PDCCH, PDSCH, or CSI-RS on the reference cell in the symbol.

In some embodiments, for the plurality of PUSCH transmissions/repetitions, after determining the invalid symbol(s) for the plurality of PUSCH transmissions/repetitions for each of the K nominal repetitions, the remaining symbols are considered as potentially valid symbols for the plurality of PUSCH transmissions/repetitions. If the number of potentially valid symbols for the plurality of PUSCH transmissions/repetitions is greater than zero for a nominal repetition, the nominal repetition consists of one or more actual repetitions, where each actual repetition consists of a consecutive set of all potentially valid symbols that can be used for the plurality of PUSCH transmissions/repetitions within a slot. An actual repetition with a single symbol is omitted except for the case of L=1. An actual repetition is omitted according to the conditions in Clause 9, Clause 11.1 and Clause 11.2A of [6, TS38.213]. The redundancy version to be applied on the nth actual repetition (with the counting including the actual repetitions that are omitted) is determined according to table 6.1.2.1-2 in TS38.214.

In some embodiments, for the plurality of PUSCH transmissions/repetitions, when the terminal device 110-1 receives a DCI that schedules aperiodic CSI report(s) or activates semi-persistent CSI report(s) on PUSCH with no transport block by a CSI request field on a DCI, the number of nominal repetitions is always assumed to be 1, regardless of the value of numberOfRepetitions-r16. When the terminal device 110-1 is scheduled to transmit the plurality of PUSCH transmissions/repetitions with no transport block and with aperiodic or semi-persistent CSI report(s) by a CSI request field on a DCI, the first nominal repetition is expected to be the same as the first actual repetition. For the plurality of PUSCH transmissions/repetitions carrying semi-persistent CSI report(s) without a corresponding PDCCH after being activated on PUSCH by a CSI request field on a DCI, if the first nominal repetition is not the same as the first actual repetition, the first nominal repetition is omitted; otherwise, the first nominal repetition is omitted according to the conditions in Clause 9, Clause 11.1 and Clause 11.2A of [6, TS38.213].

In some embodiments, for the plurality of PUSCH transmissions/repetitions, when a terminal device 110-1 is scheduled to transmit a transport block and aperiodic CSI report(s) on PUSCH by a CSI request field on a DCI, the CSI report(s) is multiplexed only on the first actual repetition. The terminal device 110-1 does not expect that the first actual repetition has a single symbol duration.

In some embodiments, if the number of layers is indicated as 1 by the first index in the first field, the second TPMI associated/indicated with the second index (For example, idx, and idx is a non-negative integer. For example, idx may be from 0 to 27. For another example, idx may be from 0 to 31) in the second field can only be any one of the TPMI associated with 1 layer. In some embodiments, if the number of layers is indicated as 2 by the first index in the first field, the second TPMI associated/indicated with the second index in the second field can only be any one of the TPMI associated with 2 layers. In some embodiments, if the number of layers is indicated as 3 by the first index in the first field, the second TPMI associated/indicated with the second index in the second field can only be any one of the TPMI associated with 3 layers. In some embodiments, if the number of layers is indicated as 4 by the first index in the first field, the second TPMI associated/indicated with the second index in the second field can only be any one of the TPMI associated with 4 layers.

In some embodiments, the second index in the second field may be associated/linked/related with Z TPMIs, and the Z TPMIs are associated with different values of number of layers, and Z is positive integer. For example, Z may be any one of {1, 2, 3, 4}. In some embodiments, which one of the Z TPMIs is indicated/associated by the second index in the second field is determined based on the number of layers indicated by the first index in the first field.

In some embodiments, in the case of Z=1, there is one TPMI (for example, $TPMI_{Z1}$) associated/linked/related with the second index. And $TPMI_{Z1}$ is associated with one value R1 for the number of layers (For example, R1 may be any one of {1,2,3,4}. For example, R1 may be any one of {1,2}. For another example, R1 may be 1.), then the second TPMI is indicated to be $TPMI_{Z1}$. For example, $TPMI_{Z1}=0$ is indicated by idx=0. For another example, $TPMI_{Z1}=1$ is indicated by idx=1. For example, $TPMI_{Z1}=i_{Z1}$ is indicated by idx=$i_{Z1}$, and $i_{Z1}$ is a non-negative integer. For example, $i_{Z1}$ may be from 0 to 27.

In some embodiments, in the case of Z=2, and there are 2 TPMIs (for example, $TPMI_{Z1}$ and $TPMI_{Z2}$) associated/linked/related with the second index. And $TPMI_{Z1}$ is associated with one value R1 for the number of layers (For example, R1 may be any one of {1,2,3,4}. For another example, R1 may be any one of {1,2}. For another example, R1 may be 1), and $TPMI_{Z2}$ is associated with one value R2 for the number of layers (For example, R2 may be any one of {1,2,3,4}. For example, R2 may be any one of {1,2}. For another example, R2 may be 2), and R1 is different from R2. And the second TPMI indicated/associated by the second index is determined based on the number of layers indicated by the first index in the first field. For example, if the number of layers indicated by the first index in the first field is R1, then the second TPMI is indicated to be $TPMI_{Z1}$ with number of layers R1 or to be "reserved" with number of layers R1. For another example, if the number of layers indicated by the first index in the first field is R2, then the second TPMI is indicated to be $TPMI_{Z2}$ with number of layers R2 or to be "reserved" with number of layers R2. For another example, the terminal device 110-1 is not assumed to be indicated with a value of the number of layers indicated by the first index in the first field which is different from R1 and R2. For another example, if the number of layers R3 (For example, R3 may be any one of {1,2,3,4}. For another example, R3 may be any one of {3,4}) indicated by the first index in the first field which is different from R1 and R2, then the second TPMI is assumed to be TPMI=0 with number of layers R3 or to be "reserved". For example, $TPMI_{Z1}=0$ with 1 layer and $TPMI_{Z2}=0$ with 2 layers may be associated/linked/related with idx=0. For another example, $TPMI_{Z1}=1$ with 1 layer and $TPMI_{Z2}=1$ with 2 layers may be associated/linked/related with idx=1. For another example, $TPMI_{Z1}=i_{Z2}$ with 1 layer or $TPMI_{Z1}=$"reserved" with 1 layer and $TPMI_{Z2}=i_{Z2}$ with 2 layers or $TPMI_{Z2}=$"reserved" with 2 layers may be associated/linked/related with idx=$i_{Z2}$, and $i_{Z2}$ is a non-negative integer. For example, $i_{Z2}$ may be from 0 to 27.

In some embodiments, in the case of Z=3, there are 3 TPMIs (for example, $TPMI_{Z1}$, $TPMI_{Z2}$ and $TPMI_{Z3}$) associated/linked/related with the second index. And $TPMI_{Z1}$ is associated with one value R1 for the number of layers (For example, R1 may be any one of {1,2,3,4}. For another example, R1 may be any one of {1,2,3}. For another example, R1 may be 1), $TPMI_{Z2}$ is associated with one value R2 for the number of layers (For example, R2 may be any one of {1,2,3,4}. For another example, R2 may be any one of {1,2,3}. For another example, R2 may be 2), $TPMI_{Z3}$ is associated with one value R3 for the number of layers (For example, R3 may be any one of {1,2,3,4}. For another example, R3 may be any one of {1,2,3}. For another example, R3 may be 3), and R1, R2 and R3 are different from each other. And the second TPMI indicated/associated by the second index is determined based on the number of layers indicated by the first index in the first field. For example, if the number of layers indicated by the first index in the first field is R1, then the second TPMI is indicated to be $TPMI_{Z1}$ with number of layers R1 or to be "reserved" with number of layers R1. For another example, if the number of layers indicated by the first index in the first field is R2, then the second TPMI is indicated to be $TPMI_{Z2}$ with number of layers R2 or to be "reserved" with number of layers R2. For another example, if the number of layers indicated by the first index in the first field is R3, then the second TPMI is indicated to be $TPMI_{Z3}$ with number of layers R3 or to be "reserved" with number of layers R3. For another example, the terminal device 110-1 is not assumed to be indicated with a value of the number of layers indicated by the first index in the first field which is different from R1 and R2 and R3. For another example, if the number of layers R4 (For example, R4 may be any one of {1,2,3,4}. For another example, R4 may be 4) indicated by the first index in the first field which is different from R1 and R2 and R3, then the second TPMI is assumed to be TPMI=0 with number of layers R4 or to be "reserved". For example, $TPMI_{Z1}=0$ with 1 layer, $TPMI_{Z2}=0$ with 2 layers and $TPMI_{Z3}=0$ with 3 layers may be associated/linked/related with idx=0. For another example, $TPMI_{Z1}=1$ with 1 layer, $TPMI_{Z2}=1$ with 2 layers and $TPMI_{Z3}=1$ with 3 layers may be associated/linked/related with idx=1. For another example, $TPMI_{Z1}=i_{Z3}$ with 1 layer or $TPMI_{Z1}=$"reserved" with 1 layer, $TPMI_{Z2}=i_{Z3}$ with 2 layers or $TPMI_{Z2}=$"reserved" with 2 layers and $TPMI_{Z3}=i_{Z3}$ with 3 layers or $TPMI_{Z3}=$"reserved" with 3 layers may be associated/linked/related with idx=$i_{Z3}$, and $i_{Z3}$ is a non-negative integer. For example, $i_{Z3}$ may be from 0 to 27.

In some embodiments, in the case of Z=4, there are 4 TPMIs (for example, $TPMI_{Z1}$, $TPMI_{Z2}$, $TPMI_{Z3}$ and $TPMI_{Z4}$) associated/linked/related with the second index. And $TPMI_{Z1}$ is associated with one value R1 for the number of layers (For example, R1 may be any one of {1,2,3,4}. For another example, R1 may be 1), $TPMI_{Z2}$ is associated with one value R2 for the number of layers (For example, R2 may be any one of {1,2,3,4}. For another example, R2 may be 2), $TPMI_{Z3}$ is associated with one value R3 for the number of layers (For example, R3 may be any one of {1,2,3,4}. For another example, R3 may be 3), $TPMI_{Z4}$ is associated with one value R4 for the number of layers (For example, R4 may be any one of {1,2,3,4}. For another example, R4 may be 4), and R1, R2, R3 and R4 are different from each other. And the second TPMI indicated/associated by the second index is determined based on the number of layers indicated by the first index in the first field. For example, if the number of layers indicated by the first index in the first field is R1, then the second TPMI is indicated to be $TPMI_{Z1}$ with number of layers R1 or to be "reserved" with number of layers R1. For another example, if the number of layers indicated by the first index in the first field is R2, then the second TPMI is indicated to be $TPMI_{Z2}$ with number of layers R2 or to be "reserved" with number of layers R2. For another example, if the number of layers indicated by the first index in the first field is R3, then the second TPMI is indicated to be $TPMI_{Z3}$ with number of layers R3 or to be "reserved" with number of layers R3. For another example, if the number of layers indicated by the first index in the first field is R4, then the second TPMI is indicated to be $TPMI_{Z4}$ with number of layers R4 or to be "reserved" with number of layers R4. For example, $TPMI_{Z1}=0$ with 1 layer, $TPMI_{Z2}=0$ with 2 layers, $TPMI_{Z3}=0$ with 3 layers and $TPMI_{Z4}=0$ with 4 layers may be associated/linked/related with idx=0. For another example, $TPMI_{Z1}=1$ with 1 layer, $TPMI_{Z2}=1$ with 2 layers, $\text{TPMI}_{Z3}=0$ with 3 layers and $\text{TPMI}_{Z4}=1$ with 4 layers may be associated/linked/related with idx=1. For another example, $\text{TPMI}_{Z1}=i_{Z4}$ with 1 layer or $\text{TPMI}_{Z1}=$"reserved" with 1 layer, $\text{TPMI}_{Z2}=i_{Z4}$ with 2 layers or $\text{TPMI}_{Z2}=$"reserved" with 2 layers, $\text{TPMI}_{Z3}=i_{Z4}$ with 3 layers or $\text{TPMI}_{Z3}=$"reserved" with 3 layers and $\text{TPMI}_{Z4}=i_{Z4}$ with 4 layers or $\text{TPMI}_{Z4}=$"reserved" with 4 layers may be associated/linked/related with idx=$i_{Z4}$, and $i_{Z4}$ is a non-negative integer. For example, $i_{Z4}$ may be from 0 to 27.

In some embodiments, if the number of antenna ports is configured as 4 or the number of SRS ports is 4, and if transform precoder is disabled, and if maxRank=2 or 3 or 4, and if ul-FullPowerTransmission-r16 is not configured or configured to fullpowerMode2 or configured to fullpower, and if codebookSubset is configured as non Coherent. In some embodiments, if the number of layers is indicated as 1 by the first index in the first field, the second TPMI associated/indicated with the second index in the second field can only be any one of TPMI={0, 1, 2, 3} with 1 layer. In some embodiments, if the number of layers is indicated as 2 by the first index in the first field, the second TPMI associated/indicated with the second index in the second field can only be any one of TPMI={0, 1, 2, 3, 4, 5} with 2 layers. In some embodiments, if the number of layers is indicated as 3 by the first index in the first field, the second TPMI associated/indicated with the second index in the second field can only be TPMI={0} with 3 layers. In some embodiments, if the number of layers is indicated as 3 by the first index in the first field, there is no need of a codepoint/bit index for the second index in the second field to indicate the second TPMI, and the second TPMI is assumed to be TPMI={0} with 3 layers. In some embodiments, if the number of layers is indicated as 3 by the first index in the first field, no matter which value or bit index is indicated by the second index in the second field, the second TPMI is assumed to be TPMI={0} with 3 layers. In some embodiments, if the number of layers is indicated as 4 by the first index in the first field, the second TPMI associated/indicated with the second index in the second field can only be TPMI={0} with 4 layers. In some embodiments, if the number of layers is indicated as 4 by the first index in the first field, there is no need of a codepoint/bit index for the second index in the second field to indicate the second TPMI, and the second TPMI is assumed to be TPMI={0} with 4 layers. In some embodiments, if the number of layers is indicated as 4 by the first index in the first field, no matter which value or bit index is indicated by the second index in the second field, the second TPMI is assumed to be TPMI={0} with 4 layers. In some embodiments, the size for the second field may be Y bits. Y is positive integer. For example, Y may be 2 or 3. In some embodiments, the number of valid codepoints or valid bit indices in the second field may be W. W is positive integer. For example, W may be 4 or 5 or 6. In some embodiments, the number of codepoints or bit indices which are not "reserved" in the second field may be W. W is positive integer. For example, W may be 4 or 5 or 6.

In some embodiments, if the number of antenna ports is configured as 4 or the number of SRS ports is 4, and if transform precoder is disabled, and if maxRank=2 or 3 or 4, and if ul-FullPowerTransmission-r16 is not configured or configured to fullpowerMode2 or configured to fullpower, and if codebookSubset is configured as partialAndNonCoherent. In some embodiments, if the number of layers is indicated as 1 by the first index in the first field, the second TPMI associated/indicated with the second index in the second field can only be any one of TPMI={0, 1, 2, 3, 4, 5, 6, 7, 8, 9, 10, 11} with 1 layer. In some embodiments, if the number of layers is indicated as 2 by the first index in the first field, the second TPMI associated/indicated with the second index in the second field can only be any one of TPMI={0, 1, 2, 3, 4, 5, 6, 7, 8, 9, 10, 11, 12, 13} with 2 layers. In some embodiments, if the number of layers is indicated as 3 by the first index in the first field, the second TPMI associated/indicated with the second index in the second field can only be any one of TPMI={0, 1} with 3 layers. In some embodiments, if the number of layers is indicated as 4 by the first index in the first field, the second TPMI associated/indicated with the second index in the second field can only be any one of TPMI={0, 1} with 4 layers. In some embodiments, the size for the second field may be Y bits. Y is positive integer. For example, Y may be 3 or 4. In some embodiments, the number of valid codepoints or valid bit indices in the second field may be W. W is positive integer. For example, W may be no larger than 14. For another example, W may be 12 or 13 or 14. In some embodiments, the number of codepoints or bit indices which are not "reserved" in the second field may be W. W is positive integer. For example, W may be no larger than 14. For another example, W may be 12 or 13 or 14.

In some embodiments, if the number of antenna ports is configured as 4 or the number of SRS ports is 4, and if transform precoder is disabled, and if maxRank=2 or 3 or 4, and if ul-FullPowerTransmission-r16 is not configured or configured to fullpowerMode2 or configured to fullpower, and if codebookSubset is configured as fullAndPartialAndNonCoherent. In some embodiments, if the number of layers is indicated as 1 by the first index in the first field, the second TPMI associated/indicated with the second index in the second field can only be any one of TPMI={0, 1, 2, 3, 4, 5, 6, 7, 8, 9, 10, 11, 12, 13, 14, 15, 16, 17, 18, 19, 20, 21, 22, 23, 24, 25, 26, 27} with 1 layer. In some embodiments, if the number of layers is indicated as 2 by the first index in the first field, the second TPMI associated/indicated with the second index in the second field can only be any one of TPMI={0, 1, 2, 3, 4, 5, 6, 7, 8, 9, 10, 11, 12, 13, 14, 15, 16, 17, 18, 19, 20, 21} with 2 layers. In some embodiments, if the number of layers is indicated as 3 by the first index in the first field, the second TPMI associated/indicated with the second index in the second field can only be any one of TPMI={0, 1, 2, 3, 4, 5, 6} with 3 layers. In some embodiments, if the number of layers is indicated as 4 by the first index in the first field, the second TPMI associated/indicated with the second index in the second field can only be any one of TPMI={0, 1, 2, 3, 4} with 4 layers. In some embodiments, the size for the second field may be Y bits. Y is positive integer. For example, Y may be 3 or 4 or 5. In some embodiments, the number of valid codepoints or valid bit indices in the second field may be W. W is positive integer. For example, W may be no larger than 28. For another example, W may be 26 or 27 or 28. In some embodiments, the number of codepoints or bit indices which are not "reserved" in the second field may be W. W is positive integer. For example, W may be no larger than 28. For another example, W may be 26 or 27 or 28.

In some embodiments, if the number of antenna ports is configured as 4 or the number of SRS ports is 4, and if transform precoder is disabled, and if maxRank=2, and if ul-FullPowerTransmission-r16 is configured to fullpowerMode1, and if codebookSubset is configured as non Coherent. In some embodiments, if the number of layers is indicated as 1 by the first index in the first field, the second TPMI associated/indicated with the second index in the second field can only be any one of TPMI={0, 1, 2, 3, 13} with 1 layer. In some embodiments, if the number of layers is indicated as 2 by the first index in the first field, the second TPMI associated/indicated with the second index in the second field can only be any one of TPMI={0, 1, 2, 3, 4, 5, 6} with 2 layers. In some embodiments, the size for the second field may be Y bits. Y is positive integer. For example, Y may be 2 or 3. In some embodiments, the number of valid codepoints or valid bit indices in the second field may be W. W is positive integer. For example, W may be no larger than 7. For another example, W may be 5 or 6 or 7. In some embodiments, the number of codepoints or bit indices which are not "reserved" in the second field may be W. W is positive integer. For example, W may be no larger than 7. For another example, W may be 5 or 6 or 7.

In some embodiments, if the number of antenna ports is configured as 4 or the number of SRS ports is 4, and if transform precoder is disabled, and if maxRank=2, and if ul-FullPowerTransmission-r16 is configured to fullpower-Mode1, and if codebookSubset is configured as partialAnd-NonCoherent. In some embodiments, if the number of layers is indicated as 1 by the first index in the first field, the second TPMI associated/indicated with the second index in the second field can only be any one of TPMI={0, 1, 2, 3, 13, 12, 14, 15} with 1 layer. In some embodiments, if the number of layers is indicated as 2 by the first index in the first field, the second TPMI associated/indicated with the second index in the second field can only be any one of TPMI={0, 1, 2, 3, 4, 5, 6, 7, 8, 9, 10, 11, 12, 13} with 2 layers. In some embodiments, the size for the second field may be Y bits. Y is positive integer. For example, Y may be 2 or 3 or 4. In some embodiments, the number of valid codepoints or valid bit indices in the second field may be W. W is positive integer. For example, W may be no larger than 14. For another example, W may be 12 or 13 or 14. In some embodiments, the number of codepoints or bit indices which are not "reserved" in the second field may be W. W is positive integer. For example, W may be no larger than 14. For another example, W may be 12 or 13 or 14.

In some embodiments, if the number of antenna ports is configured as 4 or the number of SRS ports is 4, and if transform precoder is disabled, and if maxRank=3 or 4, and if ul-FullPowerTransmission-r16 is configured to fullpower-Mode1, and if codebookSubset is configured as non Coherent. In some embodiments, if the number of layers is indicated as 1 by the first index in the first field, the second TPMI associated/indicated with the second index in the second field can only be any one of TPMI={0, 1, 2, 3, 13} with 1 layer. In some embodiments, if the number of layers is indicated as 2 by the first index in the first field, the second TPMI associated/indicated with the second index in the second field can only be any one of TPMI={0, 1, 2, 3, 4, 5, 6} with 2 layers. In some embodiments, if the number of layers is indicated as 3 by the first index in the first field, the second TPMI associated/indicated with the second index in the second field can only be any one of TPMI={0, 1} with 3 layers. In some embodiments, if the number of layers is indicated as 4 by the first index in the first field, the second TPMI associated/indicated with the second index in the second field can only be TPMI={0} with 4 layers. In some embodiments, if the number of layers is indicated as 4 by the first index in the first field, there is no need of a codepoint/bit index for the second index in the second field to indicate the second TPMI, and the second TPMI is assumed to be TPMI={0} with 4 layers. In some embodiments, if the number of layers is indicated as 4 by the first index in the first field, no matter which value or bit index is indicated by the second index in the second field, the second TPMI is assumed to be TPMI={0} with 4 layers. In some embodiments, the size for the second field may be Y bits. Y is positive integer. For example, Y may be 2 or 3. In some embodiments, the number of valid codepoints or valid bit indices in the second field may be W. W is positive integer. For example, W may be no larger than 7. For another example, W may be 5 or 6 or 7. In some embodiments, the number of codepoints or bit indices which are not "reserved" in the second field may be W. W is positive integer. For example, W may be no larger than 7. For another example, W may be 5 or 6 or 7.

In some embodiments, if the number of antenna ports is configured as 4 or the number of SRS ports is 4, and if transform precoder is disabled, and if maxRank=3 or 4, and if ul-FullPowerTransmission-r16 is configured to fullpower-Mode1, and if codebookSubset is configured as partialAndNonCoherent. In some embodiments, if the number of layers is indicated as 1 by the first index in the first field, the second TPMI associated/indicated with the second index in the second field can only be any one of TPMI={0, 1, 2, 3, 13, 12, 14, 15} with 1 layer. In some embodiments, if the number of layers is indicated as 2 by the first index in the first field, the second TPMI associated/indicated with the second index in the second field can only be any one of TPMI={0, 1, 2, 3, 4, 5, 6, 7, 8, 9, 10, 11, 12, 13} with 2 layers. In some embodiments, if the number of layers is indicated as 3 by the first index in the first field, the second TPMI associated/indicated with the second index in the second field can only be any one of TPMI={0, 1, 2} with 3 layers. In some embodiments, if the number of layers is indicated as 4 by the first index in the first field, the second TPMI associated/indicated with the second index in the second field can only be any one of TPMI={0, 1, 2} with 4 layers. In some embodiments, the size for the second field may be Y bits. Y is positive integer. For example, Y may be 3 or 4. In some embodiments, the number of valid codepoints or valid bit indices in the second field may be W. W is positive integer. For example, W may be no larger than 14. For another example, W may be 12 or 13 or 14. In some embodiments, the number of codepoints or bit indices which are not "reserved" in the second field may be W. W is positive integer. For example, W may be no larger than 14. For another example, W may be 12 or 13 or 14.

In some embodiments, if the number of antenna ports is configured as 2 or the number of SRS ports is 2, and if transform precoder is disabled, and if maxRank=2, and if ul-FullPowerTransmission-r16 is not configured or configured to fullpowerMode2 or configured to fullpower, and if codebookSubset is configured as nonCoherent. In some embodiments, if the number of layers is indicated as 1 by the first index in the first field, the second TPMI associated/indicated with the second index in the second field can only be any one of TPMI={0, 1} with 1 layer. In some embodiments, if the number of layers is indicated as 2 by the first index in the first field, the second TPMI associated/indicated with the second index in the second field can only be TPMI={0} with 2 layers. In some embodiments, if the number of layers is indicated as 2 by the first index in the first field, there is no need of a codepoint/bit index for the second index in the second field to indicate the second TPMI, and the second TPMI is assumed to be TPMI={0} with 2 layers. In some embodiments, if the number of layers is indicated as 2 by the first index in the first field, no matter which value or bit index is indicated by the second index in the second field, the second TPMI is assumed to be TPMI={0} with 2 layers. In some embodiments, there may be no need of the second field. And the second TPMI is assumed to be TPMI={0} with 1 layer if the number of layers is indicated with 1 by the first index in the first field. And the second TPMI is assumed to be TPMI={0} with 2 layers if the number of layers is indicated with 2 by the first index in the first field. In some embodiments, the size for the second field is 1 bit. In some embodiments, the number of valid codepoints or valid bit indices in the second field may be W. For example, W may be 1 or 2. In some embodiments, the number of codepoints or bit indices which are not "reserved" in the second field may be W. For example, W may be 1 or 2.

In some embodiments, if the number of antenna ports is configured as 2 or the number of SRS ports is 2, and if transform precoder is disabled, and if maxRank=2, and if ul-FullPowerTransmission-r16 is not configured or configured to fullpowerMode2 or configured to fullpower, and if codebookSubset is configured as fullAndPartialAndNonCoherent. In some embodiments, if the number of layers is indicated as 1 by the first index in the first field, the second TPMI associated/indicated with the second index in the second field can only be any one of TPMI={0, 1, 2, 3, 4, 5} with 1 layer. In some embodiments, if the number of layers is indicated as 2 by the first index in the first field, the second TPMI associated/indicated with the second index in the second field can only be any one of TPMI={0, 1, 2} with 2 layers. In some embodiments, the size for the second field may be Y bits. Y is positive integer. For example, Y may be 2 or 3. In some embodiments, the number of valid codepoints or valid bit indices in the second field may be W. W is positive integer. For example, W may be no larger than 6. For another example, W may be 4 or 5 or 6. In some embodiments, the number of codepoints or bit indices which are not "reserved" in the second field may be W. W is positive integer. For example, W may be no larger than 6. For another example, W may be 4 or 5 or 6.

In some embodiments, if the number of antenna ports is configured as 2 or the number of SRS ports is 2, and if transform precoder is disabled, and if maxRank=2, and if ul-FullPowerTransmission-r16 is configured to fullpowerMode1, and if codebookSubset is configured as non Coherent. In some embodiments, if the number of layers is indicated as 1 by the first index in the first field, the second TPMI associated/indicated with the second index in the second field can only be any one of TPMI={0, 1, 2} with 1 layer. In some embodiments, if the number of layers is indicated as 2 by the first index in the first field, the second TPMI associated/indicated with the second index in the second field can only be TPMI={0} with 2 layers. In some embodiments, if the number of layers is indicated as 2 by the first index in the first field, there is no need of a codepoint/bit index for the second index in the second field to indicate the second TPMI, and the second TPMI is assumed to be TPMI={0} with 2 layers. In some embodiments, if the number of layers is indicated as 2 by the first index in the first field, no matter which value or bit index is indicated by the second index in the second field, the second TPMI is assumed to be TPMI={0} with 2 layers. In some embodiments, the size for the second field may be Y bits. Y is positive integer. For example, Y may be 1 or 2. In some embodiments, the number of valid codepoints or valid bit indices in the second field may be W. W is positive integer. For example, W may be no larger than 3. For another example, W may be 1 or 2 or 3. In some embodiments, the number of codepoints or bit indices which are not "reserved" in the second field may be W. W is positive integer. For example, W may be no larger than 3. For another example, W may be 1 or 2 or 3.

In some embodiments, the number of layers (e.g. TRI/RI) may be same for the first and second set of PUSCH transmissions/repetitions, and the number of layers may be indicated in the field "precoding information and number of layers" (or represented as the first TPMI/PMI/RI field) in DCI. In other words, the additional/second TPMI/PMI field may not indicate information of TM/RI).

In some embodiments, the maximum transmission rank may be configured by the higher layer parameter maxRank in pusch-Config for PUSCH scheduled with DCI format 0_1 and maxRank-ForDCIFormat0_2 for PUSCH scheduled with DCI format 0_2. For example, the maximum transmission rank may be configured to be 2 or 3 or 4. It should be noted that the maximum transmission rank can be any suitable number.

Alternatively or in addition, type of codebook subset and/or type of full power mode may be configured per TRP or per SRS resource set or per PUSCH transmissions/repetitions set. In other words, the type of codebookSubset and/or type of full power mode for different TRPs or for different SRS resource sets or for different set of PUSCH transmissions/repetitions may be different.

The network device 120 transmits 2010 control information to the terminal device 110-1. In some embodiments, the control information may indicate a first index associated with the first TPMI and a second index associated with the second TPMI. Alternatively, the control information may indicate an index associated with the first TPMI and the second TPMI for the plurality of PUSCH transmissions. In some embodiments, the first index and the second index may be indicated directly. Alternatively, the first index and the second index may be indicated indirectly. In other embodiments, the control information may implicitly indicate the first index and the second index. Alternatively, the control information may explicitly indicate the first index and the second index.

Embodiments of the present disclosure are first described with the reference to the situation where the control information may indicate a first index associated with the first TPMI and a second index associated with the second TPMI.

In some embodiments, the terminal device 110-1 may determine 2015 the first TPMI based on the control information. The first index may correspond to a number of layers for the plurality of PUSCH transmissions. The first index may further correspond to the first value of the first TPMI. The terminal device 110-1 determines 2020 a second TPMI based on the number of layers and one or more of the followings: a configuration of codebook subset type, a configuration of full power mode, the first index, the second index, or the first value of the first TPMI.

In some embodiments, the size of the second TPMI/PMI field may depend on the number of (available) TPMIs for 1 and/or 2 layer transmission and the type of codebookSubset and the value of maxRank and type of full power mode. In this way, the size of the second TPMI field is less than the size of the first TPMI field, thereby saving overheads.

For example, the maximum value of number of TPMIs for 1 or 2 or 3 or 4 layer transmission may be M (where M is positive integer, and e.g. 3<=M<=28 or e.g. M∈{3, 6, 14, 16, 28}), the size for second TPMI/PMI field may be ceil(log 2(M)). Alternatively, the number of TPMIs for 1 or 2 layer transmission may be M (where M is positive integer, and e.g. 3<=M<=28 or e.g. M∈{3, 6, 16, 28}), the size for additional/second TPMI field may be ceil(log 2(M)). In other embodiments, the number of TPMIs for 1 layer transmission and codebookSubset=fullAndPartialAndNonCoheret may be M (where M is positive integer, and e.g. 3<=M<=28 or e.g. M∈{3, 6, 16, 28}), the size for second TPMI field may be ceil(log 2(M)). In a yet example embodiment, the number of TPMIs for 2 layer transmission and codebookSubset=PartialAndNonCoheret may be M (where M is positive integer, and e.g. 3<=M<=28 or e.g M∈{6, 14}), the size for second TPMI field may be ceil(log 2(M)).

In some embodiments, the terminal device 110-1 may be configured with a configuration of codebook subset type via at least one of RRC, MAC CE and DCI. For example, the configuration of codebook subset type comprises at least one of: nonCoherent, partialAndNonCoherent, or fullyAndPartialAndNonCoherent.

In some embodiments, the terminal device 110-1 may be configured with a configuration of full power mode. For example, the configuration of full power mode comprises at least one of: ul-FullPowerTransmission-r16 is not configured, ul-FullPowerTransmission-r16 is configured as full-powerMode1, ul-FullPowerTransmission-r16 is configured as fullpowerMode2, or ul-FullPowerTransmission-r16 is configured as fullpower.

In some embodiments, the configuration of codebook subset type (for example, codebookSubset in the following Table 1.) and/or the configuration of full power mode (for example, ul-FullPowerTransmission-r16 in the following Table 1.) may be configured for the terminal device 110-1 or configured for all or both of the SRS resource sets associated with "codebook" or with usage set to "codebook" or configured for the first SRS resource set associated with "codebook" or with usage set to "codebook". Only as an example, the first TPMI can be determined by the following Table 1:

TABLE 1

- Precoding information and number of layers - number of bits determined by the following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
  - 4 or 5 bits according to Table 7.3.1.1.2-2A for 4 antenna ports, if txConfig = codebook, ul-FullPowerTransmission-r16 = fullpowerMode1, maxRank=2, transform precoder is disabled, and according to the values of higher layer parameter codebookSubset;
  - 4 or 6 bits according to Table 7.3.1.1.2-2B for 4 antenna ports, if txConfig = codebook, ul-FullPowerTransmission-r16 = fullpowerMode1, maxRank=3 or 4, transform precoder is disabled, and according to the values of higher layer parameter codebookSubset;
  - 2, 4, or 5 bits according to Table 7.3.1.1.2-3 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
  - 3 or 4 bits according to Table 7.3.1.1.2-3A for 4 antenna ports, if txConfig = codebook, ul-FullPowerTransmission-r16 = fullpowerMode1, maxRank=1, and according to whether transform precoder is enabled or disabled, and the values of higher layer parameter codebookSubset;
  - 2 or 4 bits according to Table7.3.1.1.2-4 for 2 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank and codebookSubset;
  - 2 bits according to Table 7.3.1.1.2-4A for 2 antenna ports, if txConfig = codebook, ul-FullPowerTransmission-r16 = fullpowerMode1, transform precoder is disabled, maxRank=2, and codebookSubset=nonCoherent;
  - 1 or 3 bits according to Table7.3.1.1.2-5 for 2 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank and codebookSubset;
  - 2 bits according to Table 7.3.1.1.2-5A for 2 antenna ports, if txConfig = codebook, ul-FullPowerTransmission-r16 = fullpowerMode1, maxRank=1, and according to whether transform precoder is enabled or disabled, and the values of higher layer parameter codebookSubset;

TABLE 2

(for example, corresponding to Table 7.3.1.1.2-2 in 3GPP standard specification):
Precoding information and number of layers, for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | | |
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | . . . | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| . . . | . . . | | | | |
| 47 | 1 layers: TPMI = 27 | | | | |
| 48 | 2 layers: TPMI = 14 | | | | |
| ... | | | | | |
| 55 | 2 layers: TPMI = 21 | | | | |
| 56 | 3 layers: TPMI = 3 | | | | |
| ... | | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 3

(for example, corresponding to Table 7.3.1.1.2-2A in 3GPP standard
specification): Precoding information and number of layers for
4 antenna ports, if transform precoder is disabled, maxRank = 2,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 1 layer: TPMI = 13 | 10 | 1 layer: TPMI = 13 |
| 11 | 2 layer: TPMI = 6 | 11 | 2 layer: TPMI = 6 |
| 12 | 1 layer: TPMI = 4 | 12-15 | Reserved |

TABLE 3-continued (for example, corresponding to Table 7.3.1.1.2-2A in 3GPP standard
specification): Precoding information and number of layers for
4 antenna ports, if transform precoder is disabled, maxRank = 2,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| . . . | . . . | | |
| 20 | 1 layer: TPMI = 12 | | |
| 21 | 1 layer: TPMI = 14 | | |
| 22 | 1 layer: TPMI = 15 | | |
| 23 | 2 layers: TPMI = 7 | | |
| . . . | . . . | | |
| 29 | 2 layers: TPMI = 13 | | |
| 30-31 | Reserved | | |

TABLE 4

(for example, corresponding to Table 7.3.1.1.2-2B in 3GPP standard specification): Precoding information and number of layers for 4 antenna ports, if transform precoder is disabled, maxRank = 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 3 layers: TPMI = 0 | 10 | 3 layers: TPMI = 0 |
| 11 | 4 layers: TPMI = 0 | 11 | 4 layers: TPMI = 0 |
| 12 | 1 layer: TPMI = 13 | 12 | 1 layer: TPMI = 13 |
| 13 | 2 layer: TPMI = 6 | 13 | 2 layer: TPMI = 6 |

TABLE 4-continued (for example, corresponding to Table 7.3.1.1.2-2B in 3GPP standard specification): Precoding information and number of layers for 4 antenna ports, if transform precoder is disabled, maxRank = 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 14 | 3 layer: TPMI = 1 | 14 | 3 layer: TPMI = 1 |
| 15 | 1 layer: TPMI = 4 | 15 | Reserved |
| . . . | . . . | | |
| 23 | 1 layer: TPMI = 12 | | |
| 24 | 1 layer: TPMI = 14 | | |
| 25 | 1 layer: TPMI = 15 | | |
| 26 | 2 layers: TPMI = 7 | | |
| . . . | . . . | | |
| 32 | 2 layers: TPMI = 13 | | |
| 33 | 3 layers: TPMI = 2 | | |
| 34 | 4 layers: TPMI = 1 | | |
| 35 | 4 layers: TPMI = 2 | | |
| 36-63 | Reserved | | |

TABLE 5

(for example, corresponding to Table 7.3.1.1.2-3 in 3GPP standard specification): Precoding information and number of layers for 4 antenna ports, if transform precoder is enabled and ul-FullPowerTransmission-r16 is either not configured or configured to fullpowerMode2, or if transform precoder is disabled, maxRank = 1, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset= partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| . . . | . . . | . . . | . . . | | |
| 11 | 1 layer: TPMI = 11 | 11 | 1 layer: TPMI = 11 | | |
| 12 | 1 layers: TPMI = 12 | 12-15 | reserved | | |
| . . . | . . . | | | | |
| 27 | 1 layers: TPMI = 27 | | | | |
| 28-31 | reserved | | | | |

TABLE 6

(for example, corresponding to Table 7.3.1.1.2-3A in 3GPP standard specification): Precoding information and number of layers for 4 antenna ports, if transform precoder is enabled and ul-FullPowerTransmission-r16 = fullpowerMode1, or if transform precoder is disabled, maxRank = 1, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 1 layer: TPMI = 13 | 4 | 1 layer: TPMI = 13 |
| 5 | 1 layer: TPMI = 4 | 5-7 | Reserved |
| . . . | . . . | | |
| 13 | 1 layer: TPMI = 12 | | |
| 14 | 1 layer: TPMI = 14 | | |
| 15 | 1 layer: TPMI = 15 | | |

TABLE 7

(for example, corresponding to Table 7.3.1.1.2-4 in 3GPP standard specification): Precoding information and number of layers, for 2 antenna ports, if transform precoder is disabled, maxRank = 2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 8

(for example, corresponding to Table 7.3.1.1.2-4A in 3GPP standard specification): Precoding information and number of layers, for 2 antenna ports, if transform precoder is disabled, maxRank = 2, and ul-FullPowerTransmission-r16 = fullpowerMode1

| Bit field mapped to index | codebookSubset = nonCoherent |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |

TABLE 9

(for example, corresponding to Table 7.3.1.1.2-5 in 3GPP standard specification): Precoding information and number of layers, for 2 antenna ports, if transform precoder is enabled and ul-FullPowerTransmission-r16 is not configured or configured to fullpowerMode2 or configured to fullpower, or if transform precoder is disabled, maxRank = 1, and and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

TABLE 10

(for example, corresponding to Table 7.3.1.1.2-5A in 3GPP standard specification): Precoding information and number of layers, for 2 antenna ports, if transform precoder is enabled and ul-FullPowerTransmission-r16 = fullpowerMode1, or if transform precoder is disabled, maxRank = 1, and ul-FullPowerTransmission-r16 = fullpowerMode1

| Bit field mapped to index | codebookSubset = nonCoherent |
|---|---|
| 0 | 1 layer: TPMI = 0 |
| 1 | 1 layer: TPMI = 1 |
| 2 | 1 layer: TPMI = 2 |
| 3 | Reserved |

In some embodiments, the configuration of codebook subset type (for example, codebookSubset in the following Table 11.) and/or the configuration of full power mode (for example, ul-FullPowerTransmission-r16 in the following Table 11.) may be configured for the terminal device 110-1 or configured for all or both of the SRS resource sets associated with "codebook" or with usage set to "codebook" or configured for the second SRS resource set associated with "codebook" or with usage set to "codebook". In this situation, the second TPMI can be determined by the following Table 11:

TABLE 11

- Precoding information (additional) - number of bits determined by (at least one of) the following:
  - 0 bits if the higher layer parameter txConfig = nonCodeBook;
  - 0 bits for 1 antenna port and if the higher layer parameter txConfig = codebook;
  - 3, 4, or 5 bits according to Table 7.3.1.1.2-2C-1 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
  - 3 or 4 bits according to Table 7.3.1.1.2-2E for 4 antenna ports, if txConfig = codebook, ul-FullPowerTransmission-r16 = fullpowerMode1, maxRank=2, transform precoder is disabled, and according to the values of higher layer parameter codebookSubset;
  - 3 or 4 bits according to Table 7.3.1.1.2-2G for 4 antenna ports, if txConfig = codebook, ul-FullPowerTransmission-r16 = fullpowerMode1, maxRank=3 or 4, transform precoder is disabled, and according to the values of higher layer parameter codebookSubset;

TABLE 11-continued

Or
- 3 or 4 bits according to Table 7.3.1.1.2-2G for 4 antenna ports, if txConfig =
  codebook, ul-FullPowerTransmission-r16 = fullpowerMode1, maxRank=2 or 3 or
  4, transform precoder is disabled, and according to the values of higher layer
  parameter codebookSubset;
)
- 2, 4, or 5 bits according to Table 7.3.1.1.2-3 for 4 antenna ports, if txConfig =
  codebook, ul-FullPowerTransmission-r16 is not configured or configured to
  fullpowerMode2 or configured to fullpower, and according to whether transform
  precoder is enabled or disabled, and the values of higher layer parameters
  maxRank, and codebookSubset;
- 3 or 4 bits according to Table 7.3.1.1.2-3A for 4 antenna ports, if txConfig =
  codebook, ul-FullPowerTransmission-r16 = fullpowerMode1, maxRank=1, and
  according to whether transform precoder is enabled or disabled, and the values of
  higher layer parameter codebookSubset;
- 1 or 3 bits according to Table7.3.1.1.2-4B-1 for 2 antenna ports, if txConfig =
  codebook, ul-FullPowerTransmission-r16 is not configured or configured to
  fullpowerMode2 or configured to fullpower, and according to whether transform
  precoder is enabled or disabled, and the values of higher layer parameters
  maxRank and codebookSubset;
- 2 bits according to Table 7.3.1.1.2-4A for 2 antenna ports, if txConfig = codebook,
  ul-FullPowerTransmission-r16 = fullpowerMode1, transform precoder is disabled,
  maxRank=2, and codebookSubset=nonCoherent;
(or
- 2 bits according to Table 7.3.1.1.2-4C for 2 antenna ports, if txConfig = codebook,
  ul-FullPowerTransmission-r16 = fullpowerMode1, transform precoder is disabled,
  maxRank=2, and codebookSubset=nonCoherent;
)
- 1 or 3 bits according to Table7.3.1.1.2-5 for 2 antenna ports, if txConfig =
  codebook, ul-FullPowerTransmission-r16 is not configured or configured to
  fullpowerMode2 or configured to fullpower, and according to whether transform
  precoder is enabled or disabled, and the values of higher layer parameters
  maxRank and codebookSubset;
- 2 bits according to Table 7.3.1.1.2-5A for 2 antenna ports, if txConfig =
  codebook, ul-FullPowerTransmission-r16 = fullpowerMode1, maxRank=1, and
  according to whether transform precoder is enabled or disabled, and the values of
  higher layer parameter codebookSubset;
  For the higher layer parameter txConfig=codebook, if ul-FullPowerTransmission-r16
  is configured to fullpowerMode2, maxRank is configured to be larger than 2, and at
  least one SRS resource with 4 antenna ports is configured in an SRS resource set with
  usage set to 'codebook' and an SRS resource with 2 antenna ports is indicated via SRI
  in the same SRS resource set, then Table 7.3.1.1.2-4 is used.
  For the higher layer parameter txConfig = codebook, if different SRS resources with
  different number of antenna ports are configured, the bitwidth is determined
  according to the maximum number of ports in an SRS resource among the configured
  SRS resources in an SRS resource set with usage set to 'codebook'. If the number of
  ports for a configured SRS resource in the set is less than the maximum number of
  ports in an SRS resource among the configured SRS resources, a number of most
  significant bits with value set to '0' are inserted to the field.

TABLE 12

(for example, corresponding to Table 7.3.1.1.2-2C-1): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | If number of layers is indicated to be 1 according to the first field (for example, according to Table 7.3.1.1.2-2), 1 layer: TPMI = 0; If number of layers is indicated to be 2 according to the first field (for example, according to Table 7.3.1.1.2-2), 2 layer: TPMI = 0; If number of layers is indicated to be 3 according to the first field | 0 | If number of layers is indicated to be 1 according to the first field (for example, according to Table 7.3.1.1.2-2), 1 layer: TPMI = 0; If number of layers is indicated to be 2 according to the first field (for example, according to Table 7.3.1.1.2-2), 2 | 0 | If number of layers is indicated to be 1 according to the first field (for example, according to Table 7.3.1.1.2-2), 1 layer: TPMI = 0; If number of layers is indicated to |

TABLE 12-continued (for example, corresponding to Table 7.3.1.1.2-2C-1): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | (for example, according to Table 7.3.1.1.2-2), 3 layer: TPMI = 0; If number of layers is indicated to be 4 according to the first field (for example, according to Table 7.3.1.1.2-2), 4 layer: TPMI = 0; | | layer: TPMI = 0; If number of layers is indicated to be 3 according to the first field (for example, according to Table 7.3.1.1.2-2), 3 layer: TPMI = 0; If number of layers is indicated to be 4 according to the first field (for example, according to Table 7.3.1.1.2-2), 4 layer: TPMI = 0; | | be 2 according to the first field (for example, according to Table 7.3.1.1.2-2), 2 layer: TPMI = 0; If number of layers is indicated to be 3 according to the first field (for example, according to Table 7.3.1.1.2-2), 3 layer: TPMI = 0; If number of layers is indicated to be 4 according to the first field (for example, according to Table 7.3.1.1.2-2), 4 layer: TPMI = 0; |
| 1 | If number of layers is indicated to be 1 according to the first field (for example, according to Table 7.3.1.1.2-2), 1 layer: TPMI = 1; If number of layers is indicated to be 2 according to the first field (for example, according to Table 7.3.1.1.2-2), 2 layer: TPMI = 1; If number of layers is indicated to be 3 according to the first field (for example, according to Table 7.3.1.1.2-2), 3 layer: TPMI = 1; If number of layers is indicated to be 4 according to the first field (for example, according to Table 7.3.1.1.2-2), 4 layer: TPMI = 1; | 1 | If number of layers is indicated to be 1 according to the first field (for example, according to Table 7.3.1.1.2-2), 1 layer: TPMI = 1; If number of layers is indicated to be 2 according to the first field (for example, according to Table 7.3.1.1.2-2), 2 layer: TPMI = 1; If number of layers is indicated to be 3 according to the first field (for example, according to Table 7.3.1.1.2-2), 3 layer: TPMI = 1; If number of layers is indicated to be 4 according to the first field (for example, according to Table 7.3.1.1.2-2), 4 layer: TPMI = 1; | 1 | If number of layers is indicated to be 1 according to the first field (for example, according to Table 7.3.1.1.2-2), 1 layer: TPMI = 1; If number of layers is indicated to be 2 according to the first field (for example, according to Table 7.3.1.1.2-2), 2 layer: TPMI = 1; If number of layers is indicated to be 3 or 4 according to the first field (for example, according to Table 7.3.1.1.2-2), reserved; |

TABLE 12-continued (for example, corresponding to Table 7.3.1.1.2-2C-1): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 2 | If number of layers is indicated to be 1 according to the first field (for example, according to Table 7.3.1.1.2-2), 1 layer: TPMI = 2; If number of layers is indicated to be 2 according to the first field (for example, according to Table 7.3.1.1.2-2), 2 layer: TPMI = 2; If number of layers is indicated to be 3 according to the first field (for example, according to Table 7.3.1.1.2-2), 3 layer: TPMI = 2; If number of layers is indicated to be 4 according to the first field (for example, according to Table 7.3.1.1.2-2), 4 layer: TPMI = 2; | 2 | If number of layers is indicated to be 1 according to the first field (for example, according to Table 7.3.1.1.2-2), 1 layer: TPMI = 2; If number of layers is indicated to be 2 according to the first field (for example, according to Table 7.3.1.1.2-2), 2 layer: TPMI = 2; If number of layers is indicated to be 3 according to the first field (for example, according to Table 7.3.1.1.2-2), 3 layer: TPMI = 2; If number of layers is indicated to be 4 according to the first field (for example, according to Table 7.3.1.1.2-2), 4 layer: TPMI = 2; | | . . .    . . . |
| 3 | If number of layers is indicated to be 1 according to the first field (for example, according to Table 7.3.1.1.2-2), 1 layer: TPMI = 3; If number of layers is indicated to be 2 according to the first field (for example, according to Table 7.3.1.1.2-2), 2 layer: TPMI = 3; If number of layers is indicated to be 3 according to the first field (for example, according to Table 7.3.1.1.2-2), 3 layer: TPMI = 3; If number of layers is indicated to be 4 according to the first field (for example, according to Table 7.3.1.1.2-2), 4 layer: TPMI = 3; | 3 | If number of layers is indicated to be 1 according to the first field (for example, according to Table 7.3.1.1.2-2), 1 layer: TPMI = 3; If number of layers is indicated to be 2 according to the first field (for example, according to Table 7.3.1.1.2-2), 2 layer: TPMI = 3; If number of layers is indicated to be 3 or 4 according to the first field (for example, according to Table 7.3.1.1.2-2), reserved; | 3 | If number of layers is indicated to be 1 according to the first field (for example, according to Table 7.3.1.1.2-2), 1 layer: TPMI = 3; If number of layers is indicated to be 2 according to the first field (for example, according to Table 7.3.1.1.2-2), 2 layer: TPMI = 3; If number of layers is indicated to be 3 or 4 according to the first field (for example, according to Table 7.3.1.1.2-2), reserved; |

TABLE 12-continued (for example, corresponding to Table 7.3.1.1.2-2C-1): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 4 | If number of layers is indicated to be 1 according to the first field (for example, according to Table 7.3.1.1.2-2), 1 layer: TPMI = 4; If number of layers is indicated to be 2 according to the first field (for example, according to Table 7.3.1.1.2-2), 2 layer: TPMI = 4; If number of layers is indicated to be 3 according to the first field (for example, according to Table 7.3.1.1.2-2), 3 layer: TPMI = 4; If number of layers is indicated to be 4 according to the first field (for example, according to Table 7.3.1.1.2-2), 4 layer: TPMI = 4; | 4 | If number of layers is indicated to be 1 according to the first field (for example, according to Table 7.3.1.1.2-2), 1 layer: TPMI = 4; If number of layers is indicated to be 2 according to the first field (for example, according to Table 7.3.1.1.2-2), 2 layer: TPMI = 4; If number of layers is indicated to be 3 or 4 according to the first field (for example, according to Table 7.3.1.1.2-2), reserved; | 4 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 4; |
| 5 | If number of layers is indicated to be 1 according to the first field (for example, according to Table 7.3.1.1.2-2), 1 layer: TPMI = 5; If number of layers is indicated to be 2 according to the first field (for example, according to Table 7.3.1.1.2-2), 2 layer: TPMI = 5; If number of layers is indicated to be 3 according to the first field (for example, according to Table 7.3.1.1.2-2), 3 layer: TPMI = 5; If number of layers is indicated to be 4 according to the first field (for example, according to Table 7.3.1.1.2-2), reserved; | . . . | . . . | 5 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 5; |
| 6 | If number of layers is indicated to be 1 according to the first field (for example, according to Table 7.3.1.1.2-2), 1 layer: TPMI = 6; If number of layers is indicated to be 2 according to the first field (for example, according to Table 7.3.1.1.2-2), 2 layer: TPMI = 6; If number of layers is indicated to be 3 according to the first field (for example, according to Table 7.3.1.1.2-2), 3 layer: TPMI = 6; If number of layers is indicated to be 4 according to the first field | 11 | If number of layers is indicated to be 1 according to the first field (for example, according to Table 7.3.1.1.2-2), 1 layer: TPMI = 11; If number of layers is indicated to be 2 according to the first field (for example, according to Table 7.3.1.1.2-2), 2 layer: TPMI = 11; If number of layers is indicated to be 3 or 4 according to the first field (for example, | 6-7 | reserved |

TABLE 12-continued (for example, corresponding to Table 7.3.1.1.2-2C-1): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | (for example, according to Table 7.3.1.1.2-2), reserved; | | according to Table 7.3.1.1.2-2), reserved; | | |
| 7 | If number of layers is indicated to be 1 according to the first field (for example, according to Table 7.3.1.1.2-2), 1 layer: TPMI = 7; If number of layers is indicated to be 2 according to the first field (for example, according to Table 7.3.1.1.2-2), 2 layer: TPMI = 7; If number of layers is indicated to be 3 or 4 according to the first field (for example, according to Table 7.3.1.1.2-2), reserved; | 12 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 12; | | |
| . . . | . . . | 13 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 13; | | |
| 21 | If number of layers is indicated to be 1 according to the first field (for example, according to Table 7.3.1.1.2-2), 1 layer: TPMI = 21; If number of layers is indicated to be 2 according to the first field (for example, according to Table 7.3.1.1.2-2), 2 layer: TPMI = 21; If number of layers is indicated to be 3 or 4 according to the first field (for example, according to Table 7.3.1.1.2-2), reserved; | 14-15 | reserved | | |
| 22 | If number of layers is indicated to be 1 according to the first field (for example, according to Table 7.3.1.1.2-2), 1 layer: TPMI = 22; If number of layers is indicated to be 2 or 3 or 4 according to the first field (for example, according to Table 7.3.1.1.2-2), reserved; | | | | |
| . . . | . . . | | | | |
| 27 | If number of layers is indicated to be 1 according to the first field | | | | |

TABLE 12-continued (for example, corresponding to Table 7.3.1.1.2-2C-1): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | (for example, according to Table 7.3.1.1.2-2), 1 layer: TPMI = 27; If number of layers is indicated to be 2 or 3 or 4 according to the first field (for example, according to Table 7.3.1.1.2-2), reserved; | | | | |
| 28-31 | reserved | | | | |

TABLE 13

(for example, corresponding to Table 7.3.1.1.2-4B-1): Precoding information and number of layers, for 2 antenna ports, if transform precoder is disabled, maxRank = 2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | If number of layers is indicated to be 1 according to the first field (for example, according to Table 7.3.1.1.2-4), 1 layer: TPMI = 0; If number of layers is indicated to be 2 according to the first field (for example, according to Table 7.3.1.1.2-4), 2 layer: TPMI = 0; | 0 | If number of layers is indicated to be 1 according to the first field (for example, according to Table 7.3.1.1.2-4), 1 layer: TPMI = 0; If number of layers is indicated to be 2 according to the first field (for example, according to Table 7.3.1.1.2-4), 2 layer: TPMI = 0; |
| 1 | If number of layers is indicated to be 1 according to the first field (for example, according to Table 7.3.1.1.2-4), 1 layer: TPMI = 1; If number of layers is indicated to be 2 according to the first field (for example, according to Table 7.3.1.1.2-4), 2 layer: TPMI = 1; | 1 | If number of layers is indicated to be 1 according to the first field (for example, according to Table 7.3.1.1.2-4), 1 layer: TPMI = 1; If number of layers is indicated to be 2 according to the first field (for example, according to Table 7.3.1.1.2-4), reserved; |
| 2 | If number of layers is indicated to be 1 according to the first field (for example, according to Table 7.3.1.1.2-4), 1 layer: TPMI = 2; If number of layers is indicated to be 2 according to the first field (for example, according to Table 7.3.1.1.2-4), 2 layer: TPMI = 2; | | |
| 3 | If number of layers is indicated to be 1 according to the first field (for example, according to Table 7.3.1.1.2-4), 1 layer: TPMI = 3; If number of layers is indicated to be 2 according to the first field (for example, according to Table 7.3.1.1.2-4), 2 layer: TPMI = 3; | | |
| 4 | If number of layers is indicated to be 1 according to the first | | |

TABLE 13-continued (for example, corresponding to Table 7.3.1.1.2-4B-1): Precoding information and number of layers, for 2 antenna ports, if transform precoder is disabled, maxRank = 2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 5 | field (for example, according to Table 7.3.1.1.2-4), 1 layer: TPMI = 4; If number of layers is indicated to be 2 according to the first field (for example, according to Table 7.3.1.1.2-4), reserved; If number of layers is indicated to be 1 according to the first field (for example, according to Table 7.3.1.1.2-4), 1 layer: TPMI = 5; If number of layers is indicated to be 2 according to the first field (for example, according to Table 7.3.1.1.2-4), reserved; | | |
| 6-7 | reserved | | |

In another embodiment, the value of number of indexes which corresponds to TPMI associated with at least one of 1 or 2 or 3 or 4 layer (the index is not "reserved" for all number of layers) may be N (N is positive integer), and the size for the second TPMI/PMI field may be ceil(log 2(N)).

When the number of antenna ports is 2:

When codebookSubset configured with non Coherent, and the number of (available) TPMIs for 1 layer transmission is $T_{N1}$ ($T_{N1}$ is positive integer, e.g. $T_{N1}$=2), the number of (available) TPMIs for 2 layer transmission is $T_{N2}$ ($T_{N2}$ is positive integer, e.g. $T_{N2}$=1), the maximum value between $T_{N1}$ and $T_{N2}$ is N1, N1 is positive integer, and N1=max($T_{N1}$,$T_{N2}$). E.g. N1=2.

When codebookSubset configured with fullyAndPartialAndNonCoherent or partialAndNonCoherent, and when the number of antenna ports is 2, the number of (available) TPMIs for 1 layer transmission is $T_{P1}$ ($T_{P1}$ is positive integer, e.g. $T_{P1}$=6), the number of (available) TPMIs for 2 layer transmission is $T_{P2}$ ($T_{P2}$ is positive integer, e.g. $T_{P2}$=3), the maximum value between ($T_{P1}$-$T_{N1}$) and ($T_{P2}$-$T_{N2}$) is N2, N2 is positive integer, and N2=max(($T_{P1}$-$T_{N1}$), ($T_{P2}$-$T_{N2}$)). E.g. N2=4.

Then the value of N is N=N1+N2. e.g. N=6, and the size for second TPMI/PMI field is 3 bits.

When the number of antenna ports is 4

When codebookSubset configured with nonCoherent, the number of (available) TPMIs for 1 layer transmission is $T_{N1}$ ($T_{N1}$ is positive integer, e.g. $T_{N1}$=4), the number of (available) TPMIs for 2 layer transmission is $T_{N2}$ ($T_{N2}$ is positive integer, e.g. $T_{N2}$=6), the maximum value between $T_{N1}$ and $T_{N2}$ is N1, N1 is positive integer, and N1=max($T_{N1}$,T N2). E.g. N1=6.

When codebookSubset configured with partialAndNonCoherent, the number of (available) TPMIs for 1 layer transmission is $T_{P1}$ ($T_{P1}$ is positive integer, e.g. $T_{P1}$=12), the number of (available) TPMIs for 2 layer transmission is $T_{P2}$ ($T_{P2}$ is positive integer, e.g. $T_{P2}$=14), the maximum value between ($T_{P1}$-$T_{N1}$) and ($T_{P2}$-$T_{N2}$) is N2, N2 is positive integer, and N2=max (($T_{P1}$-$T_{N1}$),($T_{P2}$-$T_{N2}$)). E.g. N2=8.

When codebookSubset configured with fullyAndPartialAndNonCoherent, the number of (available) TPMIs for 1 layer transmission is $T_{F1}$ ($T_{F1}$ is positive integer, e.g. $T_{F1}$=28), the number of (available) TPMIs for 2 layer transmission is $T_{F2}$ ($T_{F2}$ is positive integer, e.g. $T_{F2}$=22), the maximum value between ($T_{F1}$-$T_{P1}$) and ($T_{F2}$-$T_{P2}$) is N3, N3 is positive integer, and N3=max (($T_{F1}$-$T_{P}$1),($T_{F2}$-$T_{P2}$)). E.g. N2=16.

The value of N is N=N1+N2+N3. e.g. N=30 and the size for second TPMI/PMI field is 5 bits.

In some embodiments, the configuration of codebook subset type (for example, codebookSubset in the following Table 14.) and/or the configuration of full power mode (for example, ul-FullPowerTransmission-r16 in the following Table 14.) may be configured for the terminal device 110-1 or configured for all or both of the SRS resource sets associated with "codebook" or with usage set to "codebook" or configured for the first SRS resource set associated with "codebook" or with usage set to "codebook". Only as an example, the first TPMI can be determined by the following Table 14:

TABLE 14

- Precoding information and number of layers - number of bits determined by the following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;

TABLE 14-continued

- 4 or 5 bits according to Table 7.3.1.1.2-2A for 4 antenna ports, if txConfig =
  codebook, ul-FullPowerTransmission-r16 = fullpowerMode1, maxRank=2,
  transform precoder is disabled, and according to the values of higher layer
  parameter codebookSubset;
- 4 or 6 bits according to Table 7.3.1.1.2-2B for 4 antenna ports, if txConfig =
  codebook, ul-FullPowerTransmission-r16 = fullpowerMode1, maxRank=3 or 4,
  transform precoder is disabled, and according to the values of higher layer
  parameter codebookSubset;
- 2, 4, or 5 bits according to Table 7.3.1.1.2-3 for 4 antenna ports, if txConfig =
  codebook, ul-FullPowerTransmission-r16 is not configured or configured to
  fullpowerMode2 or configured to fullpower, and according to whether transform
  precoder is enabled or disabled, and the values of higher layer parameters
  maxRank, and codebookSubset;
- 3 or 4 bits according to Table 7.3.1.1.2-3A for 4 antenna ports, if txConfig =
  codebook, ul-FullPowerTransmission-r16 = fullpowerMode1, maxRank=1, and
  according to whether transform precoder is enabled or disabled, and the values of
  higher layer parameter codebookSubset;
- 2 or 4 bits according to Table7.3.1.1.2-4 for 2 antenna ports, if txConfig =
  codebook, ul-FullPowerTransmission-r16 is not configured or configured to
  fullpowerMode2 or configured to fullpower, and according to whether transform
  precoder is enabled or disabled, and the values of higher layer parameters
  maxRank and codebookSubset;
- 2 bits according to Table 7.3.1.1.2-4A for 2 antenna ports, if txConfig = codebook,
  ul-FullPowerTransmission-r16 = fullpowerMode1, transform precoder is disabled,
  maxRank=2, and codebookSubset=nonCoherent;
- 1 or 3 bits according to Table7.3.1.1.2-5 for 2 antenna ports, if txConfig =
  codebook, ul-FullPowerTransmission-r16 is not configured or configured to
  fullpowerMode2 or configured to fullpower, and according to whether transform
  precoder is enabled or disabled, and the values of higher layer parameters
  maxRank and codebookSubset;
- 2 bits according to Table 7.3.1.1.2-5A for 2 antenna ports, if txConfig = codebook,
  ul-FullPowerTransmission-r16 = fullpowerMode1, maxRank=1, and according to
  whether transform precoder is enabled or disabled, and the values of higher layer
  parameter codebookSubset;

TABLE 15

(for example, corresponding to Table 7.3.1.1.2-2 in 3GPP standard specification):
Precoding information and number of layers, for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | | |
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | . . . | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| 47 | 1 layers: TPMI = 27 | | | | |
| 48 | 2 layers: TPMI = 14 | | | | |
| . . . | . . . | | | | |

TABLE 15-continued (for example, corresponding to Table 7.3.1.1.2-2 in 3GPP standard specification):
Precoding information and number of layers, for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 16

(for example, corresponding to Table 7.3.1.1.2-2A in 3GPP standard
specification): Precoding information and number of layers for 4
antenna ports, if transform precoder is disabled, maxRank = 2,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 1 layer: TPMI = 13 | 10 | 1 layer: TPMI = 13 |
| 11 | 2 layer: TPMI = 6 | 11 | 2 layer: TPMI = 6 |
| 12 | 1 layer: TPMI = 4 | 12-15 | Reserved |
| . . . | . . . | | |
| 20 | 1 layer: TPMI = 12 | | |
| 21 | 1 layer: TPMI = 14 | | |
| 22 | 1 layer: TPMI = 15 | | |
| 23 | 2 layers: TPMI = 7 | | |
| 29 | 2 layers: TPMI = 13 | | |
| 30-31 | Reserved | | |

TABLE 17

(for example, corresponding to Table 7.3.1.1.2-2B in 3GPP standard
specification): Precoding information and number of layers for
4 antenna ports, if transform precoder is disabled, maxRank =
3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 3 layers: TPMI = 0 | 10 | 3 layers: TPMI = 0 |
| 11 | 4 layers: TPMI = 0 | 11 | 4 layers: TPMI = 0 |
| 12 | 1 layer: TPMI = 13 | 12 | 1 layer: TPMI = 13 |
| 13 | 2 layer: TPMI = 6 | 13 | 2 layer: TPMI = 6 |
| 14 | 3 layer: TPMI = 1 | 14 | 3 layer: TPMI = 1 |
| 15 | 1 layer: TPMI = 4 | 15 | Reserved |
| . . . | . . . | | |
| 23 | 1 layer: TPMI = 12 | | |
| 24 | 1 layer: TPMI = 14 | | |
| 25 | 1 layer: TPMI = 15 | | |
| 26 | 2 layers: TPMI = 7 | | |
| . . . | . . . | | |
| 32 | 2 layers: TPMI = 13 | | |
| 33 | 3 layers: TPMI = 2 | | |
| 34 | 4 layers: TPMI = 1 | | |
| 35 | 4 layers: TPMI = 2 | | |
| 36-63 | Reserved | | |

TABLE 18

(for example, corresponding to Table 7.3.1.1.2-3 in 3GPP standard specification): Precoding
information and number of layers for 4 antenna ports, if transform precoder is enabled
and ul-FullPowerTransmission-r16 is either not configured or configured to fullpowerMode2,
or if transform precoder is disabled, maxRank = 1, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |

TABLE 18-continued (for example, corresponding to Table 7.3.1.1.2-3 in 3GPP standard specification): Precoding
information and number of layers for 4 antenna ports, if transform precoder is enabled
and ul-FullPowerTransmission-r16 is either not configured or configured to fullpowerMode2,
or if transform precoder is disabled, maxRank = 1, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| . . . | . . . | . . . | . . . | | |
| 11 | 1 layer: TPMI = 11 | 11 | 1 layer: TPMI = 11 | | |
| 12 | 1 layers: TPMI = 12 | 12-15 | reserved | | |
| . . . | . . . | | | | |
| 27 | 1 layers: TPMI = 27 | | | | |
| 28-31 | reserved | | | | |

TABLE 19

(for example, corresponding to Table 7.3.1.1.2-3A in 3GPP
standard specification): Precoding information and number
of layers for 4 antenna ports, if transform precoder is
enabled and ul-FullPowerTransmission-r16 = fullpowerMode1,
or if transform precoder is disabled, maxRank = 1,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 1 layer: TPMI = 13 | 4 | 1 layer: TPMI = 13 |
| 5 | 1 layer: TPMI = 4 | 5-7 | Reserved |
| . . . | . . . | | |
| 13 | 1 layer: TPMI = 12 | | |
| 14 | 1 layer: TPMI = 14 | | |
| 15 | 1 layer: TPMI = 15 | | |

TABLE 20

(for example, corresponding to Table 7.3.1.1.2-4 in 3GPP standard
specification): Precoding information and number of layers, for 2
antenna ports, if transform precoder is disabled, maxRank = 2,
and ul-FullPowerTransmission-r16 is not configured or configured
to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 21

(for example, corresponding to Table 7.3.1.1.2-4A in 3GPP standard
specification): Precoding information and number of layers, for 2
antenna ports, if transform precoder is disabled, maxRank = 2,
and ul-FullPowerTransmission-r16 = fullpowerMode1

| Bit field mapped to index | codebookSubset= nonCoherent |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |

TABLE 22

(for example, corresponding to Table 7.3.1.1.2-5 in 3GPP standard
specification): Precoding information and number of layers,
for 2 antenna ports, if transform precoder is enabled and
ul-FullPowerTransmission-r16 is not configured or configured
to fullpowerMode2 or configured to fullpower, or if transform
precoder is disabled, maxRank = 1, and and ul-FullPowerTransmission-
r16 is not configured or configured to fullpowerMode2 or configured
to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

TABLE 23

| (for example, corresponding to Table 7.3.1.1.2-5A in 3GPP standard specification): Precoding information and number of layers, for 2 antenna ports, if transform precoder is enabled and ul-FullPowerTransmission-r16 = fullpowerMode1, or if transform precoder is disabled, maxRank = 1, and ul-FullPowerTransmission-r16 = fullpowerMode1 | |
| --- | --- |
| Bit field mapped to index | codebookSubset = nonCoherent |
| 0 | 1 layer: TPMI = 0 |
| 1 | 1 layer: TPMI = 1 |
| 2 | 1 layer: TPMI = 2 |
| 3 | Reserved |

In some embodiments, the configuration of codebook subset type (for example, codebookSubset in the following Table 24.) and/or the configuration of full power mode (for example, ul-FullPowerTransmission-r16 in the following Table 24.) may be configured for the terminal device 110-1 or configured for all or both of the SRS resource sets associated with "codebook" or with usage set to "codebook" or configured for the second SRS resource set associated with "codebook" or with usage set to "codebook". In this situation, the second TPMI can be determined by the following Table 24:

TABLE 24

- Precoding information (additional) - number of bits determined by (at least one of) the following:
- 0 bits if the higher layer parameter txConfig = nonCodeBook;
- 0 bits for 1 antenna port and if the higher layer parameter txConfig = codebook;
- 3, 4, or 5 bits according to Table 7.3.1.1.2-2C for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
- 3 or 5 bits according to Table 7.3.1.1.2-2D for 4 antenna ports, if txConfig = codebook, ul-FullPowerTransmission-r16 = fullpowerMode1, maxRank=2, transform precoder is disabled, and according to the values of higher layer parameter codebookSubset;
- 3 or 5 bits according to Table 7.3.1.1.2-2F for 4 antenna ports, if txConfig = codebook, ul-FullPowerTransmission-r16 = fullpowerMode1, maxRank-3 or 4, transform precoder is disabled, and according to the values of higher layer parameter codebookSubset;
( or
- 3 or 5 bits according to Table 7.3.1.1.2-2F for 4 antenna ports, if txConfig = codebook, ul-FullPowerTransmission-r16 = fullpowerMode1, maxRank=2 or 3 or 4, transform precoder is disabled, and according to the values of higher layer parameter codebookSubset;
or
- 3 or 4 bits according to Table 7.3.1.1.2-2E for 4 antenna ports, if txConfig = codebook, ul-FullPowerTransmission-r16 = fullpowerMode1, maxRank=2, transform precoder is disabled, and according to the values of higher layer parameter codebookSubset;
- 3 or 4 bits according to Table 7.3.1.1.2-2G for 4 antenna ports, if txConfig = codebook, ul-FullPowerTransmission-r16 = fullpowerMode1, maxRank=3 or 4, transform precoder is disabled, and according to the values of higher layer parameter codebookSubset;
Or
- 3 or 4 bits according to Table 7.3.1.1.2-2G for 4 antenna ports, if txConfig = codebook, ul-FullPowerTransmission-r16 = fullpowerMode1, maxRank=2 or 3 or 4, transform precoder is disabled, and according to the values of higher layer parameter codebookSubset;
)
- 1 or 3 bits according to Table7.3.1.1.2-4B for 2 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank and codebookSubset;
- 2 bits according to Table 7.3.1.1.2-4A for 2 antenna ports, if txConfig = codebook, ul-FullPowerTransmission-r16 = fullpowerMode1, transform precoder is disabled, maxRank=2, and codebookSubset=nonCoherent;
(or
- 2 bits according to Table 7.3.1.1.2-4C for 2 antenna ports, if txConfig = codebook, ul-FullPowerTransmission-r16 = fullpowerMode1, transform precoder is disabled, maxRank=2, and codebookSubset=nonCoherent;
)
- 1 or 3 bits according to Table7.3.1.1.2-5 for 2 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank and codebookSubset;
- 2 bits according to Table 7.3.1.1.2-5A for 2 antenna ports, if txConfig = codebook, ul-FullPowerTransmission-r16 = fullpowerMode1, maxRank=1, and according to whether transform precoder is enabled or disabled, and the values of higher layer parameter codebookSubset;
For the higher layer parameter txConfig-codebook, if ul-FullPowerTransmission-r16 is configured to fullpowerMode2, maxRank is configured to be larger than 2, and at least one SRS resource with 4 antenna ports is configured in an SRS resource set with usage set to 'codebook' and an SRS resource with 2 antenna ports is indicated via SRI in the same SRS resource set, then Table 7.3.1.1.2-4 is used.

TABLE 24-continued

For the higher layer parameter txConfig = codebook, if different SRS resources with
different number of antenna ports are configured, the bitwidth is determined according to
the maximum number of ports in an SRS resource among the configured SRS resources in
an SRS resource set with usage set to 'codebook'. If the number of ports for a configured
SRS resource in the set is less than the maximum number of ports in an SRS resource
among the configured SRS resources, a number of most significant bits with value set to '0'
are inserted to the field.

TABLE 25

(for example, corresponding to Table 7.3.1.1.2-2 in 3GPP standard specification):
Precoding information and number of layers, for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | | |
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | . . . | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| . . . | . . . | | | | |
| 47 | 1 layers: TPMI = 27 | | | | |
| 48 | 2 layers: TPMI = 14 | | | | |
| .. . | | | | | |
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 26

(for example, corresponding to Table 7.3.1.1.2-2A in 3GPP standard
specification): Precoding information and number of layers for 4
antenna ports, if transform precoder is disabled, maxRank = 2,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |

TABLE 26-continued (for example, corresponding to Table 7.3.1.1.2-2A in 3GPP standard
specification): Precoding information and number of layers for 4
antenna ports, if transform precoder is disabled, maxRank = 2,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 9 | 2 layers: TPMI = 5 | 9 | 2 layers: TPMI = 5 |
| 10 | 1 layer: TPMI = 13 | 10 | 1 layer: TPMI = 13 |
| 11 | 2 layer: TPMI = 6 | 11 | 2 layer: TPMI = 6 |
| 12 | 1 layer: TPMI = 4 | 12-15 | Reserved |
| . . . | . . . | . . . | . . . |

TABLE 26-continued (for example, corresponding to Table 7.3.1.1.2-2A in 3GPP standard specification): Precoding information and number of layers for 4 antenna ports, if transform precoder is disabled, maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 20 | 1 layer: TPMI = 12 | | |
| 21 | 1 layer: TPMI = 14 | | |
| 22 | 1 layer: TPMI = 15 | | |
| 23 | 2 layers: TPMI = 7 | | |
| . . . | . . . | | |
| 29 | 2 layers: TPMI = 13 | | |
| 30-31 | Reserved | | |

TABLE 27

(for example, corresponding to Table 7.3.1.1.2-2B in 3GPP standard specification): Precoding information and number of layers for 4 antenna ports, if transform precoder is disabled, maxRank = 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |

TABLE 27-continued (for example, corresponding to Table 7.3.1.1.2-2B in 3GPP standard specification): Precoding information and number of layers for 4 antenna ports, if transform precoder is disabled, maxRank = 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 3 layers: TPMI = 0 | 10 | 3 layers: TPMI = 0 |
| 11 | 4 layers: TPMI = 0 | 11 | 4 layers: TPMI = 0 |
| 12 | 1 layer: TPMI = 13 | 12 | 1 layer: TPMI = 13 |
| 13 | 2 layer: TPMI = 6 | 13 | 2 layer: TPMI = 6 |
| 14 | 3 layer: TPMI = 1 | 14 | 3 layer: TPMI = 1 |
| 15 | 1 layer: TPMI = 4 | 15 | Reserved |
| 23 | 1 layer: TPMI = 12 | | |
| 24 | 1 layer: TPMI = 14 | | |
| 25 | 1 layer: TPMI = 15 | | |
| 26 | 2 layers: TPMI = 7 | | |
| . . . | . . . | | |
| 32 | 2 layers: TPMI = 13 | | |
| 33 | 3 layers: TPMI = 2 | | |
| 34 | 4 layers: TPMI = 1 | | |
| 35 | 4 layers: TPMI = 2 | | |
| 36-63 | Reserved | | |

TABLE 28

(for example, corresponding to Table 7.3.1.1.2-2C): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | If number of layers is indicated to be 1 according to the first field (for example, according to Table 7.3.1.1.2-2), 1 layer: TPMI = 0; If number of layers is indicated to be 2 according to the first field (for example, according to Table 7.3.1.1.2-2), 2 layer: TPMI = 0; If number of layers is indicated to be 3 according to the first field (for example, according to Table 7.3.1.1.2-2), 3 layer: TPMI = 0; If number of layers is indicated to be 4 according to the first field (for example, according to Table 7.3.1.1.2-2), 4 layer: TPMI = 0; | 0 | If number of layers is indicated to be 1 according to the first field (for example, according to Table 7.3.1.1.2-2), 1 layer: TPMI = 0; If number of layers is indicated to be 2 according to the first field (for example, according to Table 7.3.1.1.2-2), 2 layer: TPMI = 0; If number of layers is indicated to be 3 according to the first field (for example, according to Table 7.3.1.1.2-2), 3 layer: TPMI = 0; If number of layers is indicated to be 4 according to the first field (for example, according to Table 7.3.1.1.2-2), 4 layer: TPMI = 0; | 0 | If number of layers is indicated to be 1 according to the first field (for example, according to Table 7.3.1.1.2-2), 1 layer: TPMI = 0; If number of layers is indicated to be 2 according to the first field (for example, according to Table 7.3.1.1.2-2), 2 layer: TPMI = 0; If number of layers is indicated to be 3 according to the first field (for example, according to Table 7.3.1.1.2-2), |

TABLE 28-continued (for example, corresponding to Table 7.3.1.1.2-2C): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | | | | | 3 layer: TPMI = 0; If number of layers is indicated to be 4 according to the first field (for example, according to Table 7.3.1.1.2-2), 4 layer: TPMI = 0; |
| 1 | If number of layers is indicated to be 1 according to the first field (for example, according to Table 7.3.1.1.2-2), 1 layer: TPMI = 1; If number of layers is indicated to be 2 according to the first field (for example, according to Table 7.3.1.1.2-2), 2 layer: TPMI = 1; If number of layers is indicated to be 3 or 4 according to the first field (for example, according to Table 7.3.1.1.2-2), reserved; | 1 | If number of layers is indicated to be 1 according to the first field (for example, according to Table 7.3.1.1.2-2), 1 layer: TPMI = 1; If number of layers is indicated to be 2 according to the first field (for example, according to Table 7.3.1.1.2-2), 2 layer: TPMI = 1; If number of layers is indicated to be 3 or 4 according to the first field (for example, according to Table 7.3.1.1.2-2), reserved; | 1 | If number of layers is indicated to be 1 according to the first field (for example, according to Table 7.3.1.1.2-2), 1 layer: TPMI = 1; If number of layers is indicated to be 2 according to the first field (for example, according to Table 7.3.1.1.2-2), 2 layer: TPMI = 1; If number of layers is indicated to be 3 or 4 according to the first field (for example, according to Table 7.3.1.1.2-2), reserved; |
| 2 | If number of layers is indicated to be 1 according to the first field (for example, according to Table 7.3.1.1.2-2), 1 layer: TPMI = 2; If number of layers is indicated to be 2 according to the first field (for example, according to Table 7.3.1.1.2-2), 2 layer: TPMI = 2; If number of layers is indicated to be 3 or 4 according to the first field (for example, according to Table 7.3.1.1.2-2), reserved; | 2 | If number of layers is indicated to be 1 according to the first field (for example, according to Table 7.3.1.1.2-2), 1 layer: TPMI = 2; If number of layers is indicated to be 2 according to the first field (for example, according to Table 7.3.1.1.2-2), 2 layer: TPMI = 2; If number of layers is indicated to be 3 or 4 according to the first field (for example, | 2 | If number of layers is indicated to be 1 according to the first field (for example, according to Table 7.3.1.1.2-2), 1 layer: TPMI = 2; If number of layers is indicated to be 2 according to the first field (for example, according to Table 7.3.1.1.2-2), |

TABLE 28-continued (for example, corresponding to Table 7.3.1.1.2-2C): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | | | according to Table 7.3.1.1.2-2), reserved; | | 2 layer: TPMI = 2; If number of layers is indicated to be 3 or 4 according to the first field (for example, according to Table 7.3.1.1.2-2), reserved; |
| 3 | If number of layers is indicated to be 1 according to the first field (for example, according to Table 7.3.1.1.2-2), 1 layer: TPMI = 3; If number of layers is indicated to be 2 according to the first field (for example, according to Table 7.3.1.1.2-2), 2 layer: TPMI = 3; If number of layers is indicated to be 3 or 4 according to the first field (for example, according to Table 7.3.1.1.2-2), reserved; | 3 | If number of layers is indicated to be 1 according to the first field (for example, according to Table 7.3.1.1.2-2), 1 layer: TPMI = 3; If number of layers is indicated to be 2 according to the first field (for example, according to Table 7.3.1.1.2-2), 2 layer: TPMI = 3; If number of layers is indicated to be 3 or 4 according to the first field (for example, according to Table 7.3.1.1.2-2), reserved; | 3 | If number of layers is indicated to be 1 according to the first field (for example, according to Table 7.3.1.1.2-2), 1 layer: TPMI = 3; If number of layers is indicated to be 2 according to the first field (for example, according to Table 7.3.1.1.2-2), 2 layer: TPMI = 3; If number of layers is indicated to be 3 or 4 according to the first field (for example, according to Table 7.3.1.1.2-2), reserved; |
| 4 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 4; | 4 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 4; | 4 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 4; |

TABLE 28-continued (for example, corresponding to Table 7.3.1.1.2-2C): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 5 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 5; | 5 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 5; | 5 | If number of layers is indicated to be 1 or 3 or 4 according to the first field (for example, according to Table 7.3.1.1.2-2), reserved; If number of layers is indicated to be 2 according to the first field (for example, according to Table 7.3.1.1.2-2), 2 layer: TPMI = 5; |
| 6 | If number of layers is indicated to be 1 according to the first field (for example, according to Table 7.3.1.1.2-2), 1 layer: TPMI = 4; If number of layers is indicated to be 2 according to the first field (for example, according to Table 7.3.1.1.2-2), 2 layer: TPMI = 6; If number of layers is indicated to be 3 according to the first field (for example, according to Table 7.3.1.1.2-2), 3 layer: TPMI = 1; If number of layers is indicated to be 4 according to the first field (for example, according to Table 7.3.1.1.2-2), 4 layer: TPMI = 1; | 6 | If number of layers is indicated to be 1 according to the first field (for example, according to Table 7.3.1.1.2-2), 1 layer: TPMI = 4; If number of layers is indicated to be 2 according to the first field (for example, according to Table 7.3.1.1.2-2), 2 layer: TPMI = 6; If number of layers is indicated to be 3 according to the first field (for example, according to Table 7.3.1.1.2-2), 3 layer: TPMI = 1; If number of layers is indicated to be 4 according to the first field (for example, according to Table 7.3.1.1.2-2), 4 layer: TPMI = 1; | 6-7 | reserved |
| 7 | If number of layers is indicated to be 1 according to the first field (for example, according to Table 7.3.1.1.2-2), 1 layer: TPMI = 5; If number of layers is indicated to be 2 according to the first field (for example, according to Table 7.3.1.1.2-2), 2 layer: TPMI = 7; If number of layers is indicated to be 3 according to the first field | 7 | If number of layers is indicated to be 1 according to the first field (for example, according to Table 7.3.1.1.2-2), 1 layer: TPMI = 5; If number of layers is indicated to be 2 according to the first field (for example, according to Table 7.3.1.1.2-2), 2 | | |

TABLE 28-continued (for example, corresponding to Table 7.3.1.1.2-2C): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | (for example, according to Table 7.3.1.1.2-2), 3 layer: TPMI = 2; If number of layers is indicated to be 4 according to the first field (for example, according to Table 7.3.1.1.2-2), 4 layer: TPMI = 2; | | layer: TPMI = 7; If number of layers is indicated to be 3 according to the first field (for example, according to Table 7.3.1.1.2-2), 3 layer: TPMI = 2; If number of layers is indicated to be 4 according to the first field (for example, according to Table 7.3.1.1.2-2), 4 layer: TPMI = 2; | | |
| 8 | If number of layers is indicated to be 1 according to the first field (for example, according to Table 7.3.1.1.2-2), 1 layer: TPMI = 6; If number of layers is indicated to be 2 according to the first field (for example, according to Table 7.3.1.1.2-2), 2 layer: TPMI = 8; If number of layers is indicated to be 3 or 4 according to the first field (for example, according to Table 7.3.1.1.2-2), reserved; | 8 | If number of layers is indicated to be 1 according to the first field (for example, according to Table 7.3.1.1.2-2), 1 layer: TPMI = 6; If number of layers is indicated to be 2 according to the first field (for example, according to Table 7.3.1.1.2-2), 2 layer: TPMI = 8; If number of layers is indicated to be 3 or 4 according to the first field (for example, according to Table 7.3.1.1.2-2), reserved; | | |
| . . . | . . . | . . . | . . . | | |
| 13 | If number of layers is indicated to be 1 according to the first field (for example, according to Table 7.3.1.1.2-2), 1 layer: TPMI = 11; If number of layers is indicated to be 2 according to the first field (for example, according to Table 7.3.1.1.2-2), 2 layer: TPMI = 13; If number of layers is indicated to be 3 or 4 according to the first field (for example, according to Table 7.3.1.1.2-2), reserved; | 13 | If number of layers is indicated to be 1 according to the first field (for example, according to Table 7.3.1.1.2-2), 1 layer: TPMI = 11; If number of layers is indicated to be 2 according to the first field (for example, according to Table 7.3.1.1.2-2), 2 layer: TPMI = 13; If number of layers is indicated to be 3 or 4 according to the first field (for example, according to Table 7.3.1.1.2-2), reserved; | | |
| 14 | If number of layers is indicated to be 1 according to the first field | 14-15 | reserved | | |

TABLE 28-continued (for example, corresponding to Table 7.3.1.1.2-2C): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | (for example, according to Table 7.3.1.1.2-2), 1 layer: TPMI = 12; If number of layers is indicated to be 2 according to the first field (for example, according to Table 7.3.1.1.2-2), 2 layer: TPMI = 14; If number of layers is indicated to be 3 according to the first field (for example, according to Table 7.3.1.1.2-2), 3 layer: TPMI = 3; If number of layers is indicated to be 4 according to the first field (for example, according to Table 7.3.1.1.2-2), 4 layer: TPMI = 3; | | | | |
| 15 | If number of layers is indicated to be 1 according to the first field (for example, according to Table 7.3.1.1.2-2), 1 layer: TPMI = 13; If number of layers is indicated to be 2 according to the first field (for example, according to Table 7.3.1.1.2-2), 2 layer: TPMI = 15; If number of layers is indicated to be 3 according to the first field (for example, according to Table 7.3.1.1.2-2), 3 layer: TPMI = 4; If number of layers is indicated to be 4 according to the first field (for example, according to Table 7.3.1.1.2-2), 4 layer: TPMI = 4; | | | | |
| 16 | If number of layers is indicated to be 1 according to the first field (for example, according to Table 7.3.1.1.2-2), 1 layer: TPMI = 14; If number of layers is indicated to be 2 according to the first field (for example, according to Table 7.3.1.1.2-2), 2 layer: TPMI = 16; If number of layers is indicated to be 3 according to the first field (for example, according to Table 7.3.1.1.2-2), 3 layer: TPMI = 5; If number of layers is indicated to be 4 according to the first field (for example, according to Table 7.3.1.1.2-2), reserved; | | | | |

TABLE 28-continued (for example, corresponding to Table 7.3.1.1.2-2C): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 17 | If number of layers is indicated to be 1 according to the first field (for example, according to Table 7.3.1.1.2-2), 1 layer: TPMI = 15; If number of layers is indicated to be 2 according to the first field (for example, according to Table 7.3.1.1.2-2), 2 layer: TPMI = 17; If number of layers is indicated to be 3 according to the first field (for example, according to Table 7.3.1.1.2-2), 3 layer: TPMI = 6; If number of layers is indicated to be 4 according to the first field (for example, according to Table 7.3.1.1.2-2), reserved; | | | | |
| 18 | If number of layers is indicated to be 1 according to the first field (for example, according to Table 7.3.1.1.2-2), 1 layer: TPMI = 16; If number of layers is indicated to be 2 according to the first field (for example, according to Table 7.3.1.1.2-2), 2 layer: TPMI = 18; If number of layers is indicated to be 3 or 4 according to the first field (for example, according to Table 7.3.1.1.2-2), reserved; | | | | |
| . . . | . . . | | | | |
| 21 | If number of layers is indicated to be 1 according to the first field (for example, according to Table 7.3.1.1.2-2), 1 layer: TPMI = 19; If number of layers is indicated to be 2 according to the first field (for example, according to Table 7.3.1.1.2-2), 2 layer: TPMI = 21; If number of layers is indicated to be 3 or 4 according to the first field (for example, according to Table 7.3.1.1.2-2), reserved; | | | | |
| 22 | If number of layers is indicated to be 1 according to the first field (for example, according to Table 7.3.1.1.2-2), 1 layer: TPMI = 20; If number of layers is indicated to be 2 or 3 or 4 according to the first field | | | | |

TABLE 28-continued (for example, corresponding to Table 7.3.1.1.2-2C): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | (for example, according to Table 7.3.1.1.2-2), reserved; | | | | |
| . . . | . . . | | | | |
| 29 | If number of layers is indicated to be 1 according to the first field (for example, according to Table 7.3.1.1.2-2), 1 layer: TPMI = 27; If number of layers is indicated to be 2 or 3 or 4 according to the first field (for example, according to Table 7.3.1.1.2-2), reserved; | | | | |
| 30-31 | reserved | | | | |

TABLE 29

(for example, corresponding to Table 7.3.1.1.2-2D): Precoding information and number of layers for 4 antenna ports, if transform precoder is disabled, maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 according to Table 7.3.1.1.2-2A, 1 layer: TPMI = 0; If number of layers is indicated to be 2 according to the first field (for example, according to Table 7.3.1.1.2-2A), 2 layer: TPMI = 0; | 0 | If number of layers is indicated to be 1 according to the first field (for example, according to Table 7.3.1.1.2-2A), 1 layer: TPMI = 0; If number of layers is indicated to be 2 according to the first field (for example, according to Table 7.3.1.1.2-2A), 2 layer: TPMI = 0; |
| 1 | If number of layers is indicated to be 1 according to the first field (for example, according to Table 7.3.1.1.2-2A), 1 layer: TPMI = 1; If number of layers is indicated to be 2 according to the first field (for example, according to Table 7.3.1.1.2-2A), 2 layer: TPMI = 1; | 1 | If number of layers is indicated to be 1 according to the first field (for example, according to Table 7.3.1.1.2-2A), 1 layer: TPMI = 1; If number of layers is indicated to be 2 according to the first example, according to Table 7.3.1.1.2-2A), 2 layer: TPMI = 1; |
| . . . | . . . | . . . | . . . |
| 3 | If number of layers is indicated to be 1 according to the first field (for example, according to Table 7.3.1.1.2-2A), 1 layer: TPMI = 3; If number of layers is indicated to be 2 according to the first field (for example, according to Table 7.3.1.1.2-2A), 2 layer: TPMI = 3; | 3 | If number of layers is indicated to be 1 according to the first field (for example, according to Table 7.3.1.1.2-2A), 1 layer: TPMI = 3; If number of layers is indicated to be 2 according to the first field (for example, according to Table 7.3.1.1.2-2A), 2 layer: TPMI = 3; |

TABLE 29-continued (for example, corresponding to Table 7.3.1.1.2-2D): Precoding information and number of layers for 4 antenna ports, if transform precoder is disabled, maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 4 | If number of layers is indicated to be 1 according to the first field (for example, according to Table 7.3.1.1.2-2A), reserved; If number of layers is indicated to be 2 according to the first field (for example, according to Table 7.3.1.1.2-2A), 2 layer: TPMI = 4; | 4 | If number of layers is indicated to be 1 according to the first field (for example, according to Table 7.3.1.1.2-2A), reserved; If number of layers is indicated to be 2 according to the first field (for example, according to Table 7.3.1.1.2-2A), 2 layer: TPMI = 4; |
| 5 | If number of layers is indicated to be 1 according to the first field (for example, according to Table 7.3.1.1.2-2A), reserved; If number of layers is indicated to be 2 according to the first field (for example, according to Table 7.3.1.1.2-2A), 2 layer: TPMI = 5; | 5 | If number of layers is indicated to be 1 according to the first field (for example, according to Table 7.3.1.1.2-2A), reserved; If number of layers is indicated to be 2 according to the first field (for example, according to Table 7.3.1.1.2-2A), 2 layer: TPMI = 5; |
| 6 | If number of layers is indicated to be 1 according to the first field (for example, according to Table 7.3.1.1.2-2A), 1 layer: TPMI = 13; If number of layers is indicated to be 2 according to the first field (for example, according to Table 7.3.1.1.2-2A), 2 layer: TPMI = 6; | 6 | If number of layers is indicated to be 1 according to the first field (for example, according to Table 7.3.1.1.2-2A), 1 layer: TPMI = 13; If number of layers is indicated to be 2 according to the first field (for example, according to Table 7.3.1.1.2-2A), 2 layer: TPMI = 6; |
| 7 | If number of layers is indicated to be 1 according to the first field (for example, according to Table 7.3.1.1.2-2A), 1 layer: TPMI = 4; If number of layers is indicated to be 2 according to the first field (for example, according to Table 7.3.1.1.2-2A), 2 layer: TPMI = 7; | 7 | reserved |
| . . . | . . . | | |
| 13 | If number of layers is indicated to be 1 according to the first field (for example, according to Table 7.3.1.1.2-2A), 1 layer: TPMI = 10; If number of layers is indicated to be 2 according to the first field (for example, according to Table 7.3.1.1.2-2A), 2 layer: TPMI = 13; | | |
| 14 | If number of layers is indicated to be 1 according to the first field (for example, according to Table 7.3.1.1.2-2A), 1 layer: TPMI = 11; If number of layers is indicated to be 2 according to the first field (for example, according to Table 7.3.1.1.2-2A), reserved; | | |
| 15 | If number of layers is indicated to be 1 according to the first field (for example, according to Table 7.3.1.1.2-2A), 1 layer: TPMI = 12; If number of layers is indicated to be 2 according to the first field (for example, according to Table 7.3.1.1.2-2A), reserved; | | |
| 16 | If number of layers is indicated to be 1 according to the first field (for example, according to Table 7.3.1.1.2-2A), 1 layer: TPMI = 14; | | |

TABLE 29-continued (for example, corresponding to Table 7.3.1.1.2-2D): Precoding information
and number of layers for 4 antenna ports, if transform precoder is disabled,
maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 2 according to the first field (for example, according to Table 7.3.1.1.2-2A), reserved; | | |
| 17 | If number of layers is indicated to be 1 according to the first field (for example, according to Table 7.3.1.1.2-2A), 1 layer: TPMI = 15; If number of layers is indicated to be 2 according to the first field (for example, according to Table 7.3.1.1.2-2A), reserved; | | |
| 18-31 | reserved | | |

TABLE 30

(for example, corresponding to Table 7.3.1.1.2-2E): Precoding information
and number of layers for 4 antenna ports, if transform precoder is disabled,
maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 according to the first field (for example, according to Table 7.3.1.1.2-2A), 1 layer: TPMI = 0; If number of layers is indicated to be 2 according to the first field (for example, according to Table 7.3.1.1.2-2A), 2 layer: TPMI = 0; | 0 | If number of layers is indicated to be 1 according to the first field (for example, according to Table 7.3.1.1.2-2A), 1 layer: TPMI = 0; If number of layers is indicated to be 2 according to the first field (for example, according to Table 7.3.1.1.2-2A), 2 layer: TPMI = 0; |
| 1 | If number of layers is indicated to be 1 according to the first field (for example, according to Table 7.3.1.1.2-2A), 1 layer: TPMI = 1; If number of layers is indicated to be 2 according to the first field (for example, according to Table 7.3.1.1.2-2A), 2 layer: TPMI = 1; | 1 | If number of layers is indicated to be 1 according to the first field (for example, according to Table 7.3.1.1.2-2A), 1 layer: TPMI = 1; If number of layers is indicated to be 2 according to the first field (for example, according to Table 7.3.1.1.2-2A), 2 layer: TPMI = 1; |
| . . . | . . . | . . . | . . . |
| 3 | If number of layers is indicated to be 1 according to the first field (for example, according to Table 7.3.1.1.2-2A), 1 layer: TPMI = 3; If number of layers is indicated to be 2 according to the first field (for example, according to Table 7.3.1.1.2-2A), 2 layer: TPMI = 3; | 3 | If number of layers is indicated to be 1 according to the first field (for example, according to Table 7.3.1.1.2-2A), 1 layer: TPMI = 3; If number of layers is indicated to be 2 according to the first field (for example, according to Table 7.3.1.1.2-2A), 2 layer: TPMI = 3; |
| 4 | If number of layers is indicated to be 1 according to the first field (for example, according to Table 7.3.1.1.2-2A), 1 layer: TPMI = 4; If number of layers is indicated to be 2 according to the first field (for example, according to Table 7.3.1.1.2-2A), 2 layer: TPMI = 4; | 4 | If number of layers is indicated to be 1 according to the first field (for example, according to Table 7.3.1.1.2-2A), reserved; If number of layers is indicated to be 2 according to the first field (for |

TABLE 30-continued (for example, corresponding to Table 7.3.1.1.2-2E): Precoding information and number of layers for 4 antenna ports, if transform precoder is disabled, maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | | | example, according to Table 7.3.1.1.2-2A), 2 layer: TPMI = 4; |
| 5 | If number of layers is indicated to be 1 according to the first field (for example, according to Table 7.3.1.1.2-2A), 1 layer: TPMI = 5; If number of layers is indicated to be 2 according to the first field (for example, according to Table 7.3.1.1.2-2A), 2 layer: TPMI = 5; | 5 | If number of layers is indicated to be 1 according to the first field (for example, according to 7.3.1.1.2-2A), reserved; If number of layers is indicated to be 2 according to the first field (for example, according to Table 7.3.1.1.2-2A), 2 layer: TPMI = 5; |
| 6 | If number of layers is indicated to be 1 according to the first field (for example, according to Table 7.3.1.1.2-2A), 1 layer: TPMI = 13; If number of layers is indicated to be 2 according to the first field (for example, according to Table 7.3.1.1.2-2A), 2 layer: TPMI = 6; | 6 | If number of layers is indicated to be 1 according to the first field (for example, according to Table 7.3.1.1.2-2A), 1 layer: TPMI = 13; If number of layers is indicated to be 2 according to the first field (for example, according to Table 7.3.1.1.2-2A), 2 layer: TPMI = 6; |
| 7 | If number of layers is indicated to be 1 according to the first field (for example, according to Table 7.3.1.1.2-2A), 1 layer: TPMI = 6; If number of layers is indicated to be 2 according to the first field (for example, according to Table 7.3.1.1.2-2A), 2 layer: TPMI = 7; | 7 | reserved |
| . . . | . . . | | |
| 13 | If number of layers is indicated to be 1 according to the first field (for example, according to Table 7.3.1.1.2-2A), 1 layer: TPMI = 12; If number of layers is indicated to be 2 according to the first field (for example, according to Table 7.3.1.1.2-2A), 2 layer: TPMI = 13; | | |
| 14 | If number of layers is indicated to be 1 according to the first field (for example, according to Table 7.3.1.1.2-2A), 1 layer: TPMI = 14; If number of layers is indicated to be 2 according to the first field (for example, according to Table 7.3.1.1.2-2A), reserved; | | |
| 15 | If number of layers is indicated to be 1 according to the first field (for example, according to Table 7.3.1.1.2-2A), 1 layer: TPMI = 15; If number of layers is indicated to be 2 according to the first field (for example, according to Table 7.3.1.1.2-2A), reserved; | | |

TABLE 31

(for example, corresponding to Table 7.3.1.1.2-2F): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 according to the first field (for example, according to Table 7.3.1.1.2-2A or according to Table 7.3.1.1.2-2B), 1 layer: TPMI = 0; If number of layers is indicated to be 2 according to the first field (for example, according to Table 7.3.1.1.2-2A or according to Table 7.3.1.1.2-2B), 2 layer: TPMI = 0; If number of layers is indicated to be 3 according to the first field (for example, according to Table 7.3.1.1.2-2A or according to Table 7.3.1.1.2-2B), 3 layer: TPMI = 0; If number of layers is indicated to be 4 according to the first field (for example, according to Table 7.3.1.1.2-2A or according to Table 7.3.1.1.2-2B), 4 layer: TPMI = 0; | 0 | If number of layers is indicated to be 1 according to the first field (for example, according to Table 7.3.1.1.2-2A or according to Table 7.3.1.1.2-2B), 1 layer: TPMI = 0; f number of layers is indicated to be 2 according to the first field (for example, according to Table 7.3.1.1.2-2A or according to Table 7.3.1.1.2-2B), 2 layer: TPMI = 0; If number of layers is indicated to be 3 according to the first field (for example, according to Table 7.3.1.1.2-2A or according to Table 7.3.1.1.2-2B), 3 layer: TPMI = 0; If number of layers is indicated to be 4 according to the first field (for example, according to Table 7.3.1.1.2-2A or according to Table 7.3.1.1.2-2B), 4 layer: TPMI = 0; |
| 1 | If number of layers is indicated to be 1 according to the first field (for example, according to Table 7.3.1.1.2-2A or according to Table 7.3.1.1.2-2B), 1 layer: TPMI = 1; If number of layers is indicated to be 2 according to the first field (for example, according to Table 7.3.1.1.2-2A or according to Table 7.3.1.1.2-2B), 2 layer: TPMI = 1; If number of layers is indicated to be 3 or 4 according to the first field (for example, according to Table 7.3.1.1.2-2A or according to Table 7.3.1.1.2-2B), reserved; | 1 | If number of layers is indicated to be 1 according to the first field (for example, according to Table 7.3.1.1.2-2A or according to Table 7.3.1.1.2-2B), 1 layer: TPMI = 1; If number of layers is indicated to be 2 according to the first field (for example, according to Table 7.3.1.1.2-2A or according to Table 7.3.1.1.2-2B), 2 layer: TPMI = 1; If number of layers is indicated to be 3 or 4 according to the first field (for example, according to Table 7.3.1.1.2-2A or according to Table 7.3.1.1.2-2B), reserved; |
| . . . | . . . | . . . | . . . |
| 3 | If number of layers is indicated to be 1 according to the first field (for example, according to Table 7.3.1.1.2-2A or according to Table 7.3.1.1.2-2B), 1 layer: TPMI = 3; If number of layers is indicated to be 2 according to the first field (for example, according to Table 7.3.1.1.2-2A or according to Table 7.3.1.1.2-2B), 2 layer: TPMI = 3; If number of layers is indicated to be 3 or 4 according to the first field (for example, according to Table 7.3.1.1.2-2A or according to Table 7.3.1.1.2-2B), reserved; | 3 | If number of layers is indicated to be 1 according to the first field (for example, according to Table 7.3.1.1.2-2A or according to Table 7.3.1.1.2-2B), 1 layer: TPMI = 3; If number of layers is indicated to be 2 according to the first field (for example, according to Table 7.3.1.1.2-2A or according to Table 7.3.1.1.2-2B), 2 layer: TPMI = 3; If number of layers is indicated to be 3 or 4 according to the first field (for example, according to Table 7.3.1.1.2-2A or according to Table 7.3.1.1.2-2B), reserved; |

TABLE 31-continued (for example, corresponding to Table 7.3.1.1.2-2F): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 4 | If number of layers is indicated to be 1 or 3 or 4 according to the first field (for example, according to Table 7.3.1.1.2-2A or according to Table 7.3.1.1.2-2B), reserved; If number of layers is indicated to be 2 according to the first field (for example, according to Table 7.3.1.1.2-2A or according to Table 7.3.1.1.2-2B), 2 layer: TPMI = 4; | 4 | If number of layers is indicated to be 1 or 3 or 4 according to the first field (for example, according to Table 7.3.1.1.2-2A or according to Table 7.3.1.1.2-2B), reserved; If number of layers is indicated to be 2 according to the first field (for example, according to Table 7.3.1.1.2-2A or according to Table 7.3.1.1.2-2B), 2 layer: TPMI = 4; |
| 5 | If number of layers is indicated to be 1 or 3 or 4 according to the first field (for example, according to Table 7.3.1.1.2-2A or according to Table 7.3.1.1.2-2B), reserved; If number of layers is indicated to be 2 according to the first field (for example, according to Table 7.3.1.1.2-2A or according to Table 7.3.1.1.2-2B), 2 layer: TPMI = 5; | 5 | If number of layers is indicated to be 1 or 3 or 4 according to the first field (for example, according to Table 7.3.1.1.2-2A or according to Table 7.3.1.1.2-2B), reserved; If number of layers is indicated to be 2 according to the first field (for example, according to Table 7.3.1.1.2-2A or according to Table 7.3.1.1.2-2B), 2 layer: TPMI-5; |
| 6 | If number of layers is indicated to be 1 according to the first field (for example, according to Table 7.3.1.1.2-2A or according to Table 7.3.1.1.2-2B), 1 layer: TPMI = 13; If number of layers is indicated to be 2 according to the first field (for example, according to Table 7.3.1.1.2-2A or according to Table 7.3.1.1.2-2B), 2 layer: TPMI = 6; If number of layers is indicated to be 3 according to the first field (for example, according to Table 7.3.1.1.2-2A or according to Table 7.3.1.1.2-2B), 3 layer: TPMI = 1; If number of layers is indicated to be 4 according to the first field (for example, according to Table 7.3.1.1.2-2A or according to Table 7.3.1.1.2-2B), reserved; | 6 | If number of layers is indicated to be 1 according to the first field (for example, according to Table 7.3.1.1.2-2A or according to Table 7.3.1.1.2-2B), 1 layer: TPMI = 13; If number of layers is indicated to be 2 according to the first field (for example, according to Table 7.3.1.1.2-2A or according to Table 7.3.1.1.2-2B), 2 layer: TPMI = 6; If number of layers is indicated to be 3 according to the first field (for example, according to Table 7.3.1.1.2-2A or according to Table 7.3.1.1.2-2B), 3 layer: TPMI = 1; If number of layers is indicated to be 4 according to the first field (for example, according to Table 7.3.1.1.2-2A or according to Table 7.3.1.1.2-2B), reserved; |
| 7 | If number of layers is indicated to be 1 according to the first field (for example, according to Table 7.3.1.1.2-2A or according to Table 7.3.1.1.2-2B), 1 layer: TPMI = 4; If number of layers is indicated to be 2 according to the first field (for example, according to Table 7.3.1.1.2-2A or according to Table 7.3.1.1.2-2B), 2 layer: TPMI = 7; If number of layers is indicated to be 3 according to the first field (for example, according to Table 7.3.1.1.2-2A or according to Table 7.3.1.1.2-2B), 3 layer: TPMI = 2; | 7 | reserved |

TABLE 31-continued (for example, corresponding to Table 7.3.1.1.2-2F): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 4 according to the first field (for example, according to Table 7.3.1.1.2-2A or according to Table 7.3.1.1.2-2B), 4 layer: TPMI = 1; | | |
| 8 | If number of layers is indicated to be 1 according to the first field (for example, according to Table 7.3.1.1.2-2A or according to Table 7.3.1.1.2-2B), 1 layer: TPMI = 5; If number of layers is indicated to be 2 according to the first field (for example, according to Table 7.3.1.1.2-2A or according to Table 7.3.1.1.2-2B), 2 layer: TPMI = 8; If number of layers is indicated to be 3 according to the first field (for example, according to Table 7.3.1.1.2-2A or according to Table 7.3.1.1.2-2B), reserved; If number of layers is indicated to be 4 according to the first field (for example, according to Table 7.3.1.1.2-2A or according to Table 7.3.1.1.2-2B), 4 layer: TPMI = 2; | | |
| 9 | If number of layers is indicated to be 1 according to the first field (for example, according to Table 7.3.1.1.2-2A or according to Table 7.3.1.1.2-2B), 1 layer: TPMI = 6; If number of layers is indicated to be 2 according to the first field (for example, according to Table 7.3.1.1.2-2A or according to Table 7.3.1.1.2-2B), 2 layer: TPMI = 9; If number of layers is indicated to be 3 or 4 according to the first field (for example, according to Table 7.3.1.1.2-2A or according to Table 7.3.1.1.2-2B), reserved; | | |
| ... | ... | | |
| 13 | If number of layers is indicated to be 1 according to the first field (for example, according to Table 7.3.1.1.2-2A or according to Table 7.3.1.1.2-2B), 1 layer: TPMI = 10; If number of layers is indicated to be 2 according to the first field (for example, according to Table 7.3.1.1.2-2A or according to Table 7.3.1.1.2-2B), 2 layer: TPMI = 13; If number of layers is indicated to be 3 or 4 according to the first field (for example, according to Table 7.3.1.1.2-2A or according to Table 7.3.1.1.2-2B), reserved; | | |
| 14 | If number of layers is indicated to be 1 according to the first field (for example, according to Table 7.3.1.1.2-2A or according to Table 7.3.1.1.2-2B), 1 layer: | | |

TABLE 31-continued (for example, corresponding to Table 7.3.1.1.2-2F): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | TPMI = 11;<br>If number of layers is indicated to be 2 or 3 or 4 according to the first field (for example, according to Table 7.3.1.1.2-2A or according to Table 7.3.1.1.2-2B), reserved; | | |
| 15 | If number of layers is indicated to be 1 according to the first field (for example, according to Table 7.3.1.1.2-2A or according to Table 7.3.1.1.2-2B), 1 layer: TPMI = 12;<br>If number of layers is indicated to be 2 or 3 or 4 according to the first field (for example, according to Table 7.3.1.1.2-2A or according to Table 7.3.1.1.2-2B), reserved; | | |
| 16 | If number of layers is indicated to be 1 according to the first field (for example, according to Table 7.3.1.1.2-2A or according to Table 7.3.1.1.2-2B), 1 layer: TPMI = 14;<br>If number of layers is indicated to be 2 or 3 or 4 according to the first field (for example, according to Table 7.3.1.1.2-2A or according to Table 7.3.1.1.2-2B), reserved; | | |
| 17 | If number of layers is indicated to be 1 according to the first field (for example, according to Table 7.3.1.1.2-2A or according to Table 7.3.1.1.2-2B), 1 layer: TPMI = 15;<br>If number of layers is indicated to be 2 or 3 or 4 according to the first field (for example, according to Table 7.3.1.1.2-2A or according to Table 7.3.1.1.2-2B), reserved; | | |
| 18-31 | reserved | | |

TABLE 32

(for example, corresponding to Table 7.3.1.1.2-2G): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 according to the first field (for example, according to Table 7.3.1.1.2-2A or according to Table 7.3.1.1.2-2B), 1 layer: TPMI = 0;<br>If number of layers is indicated to be 2 according to the first field (for example, according to Table 7.3.1.1.2-2A or according to Table 7.3.1.1.2-2B), 2 layer: TPMI = 0; | 0 | If number of layers is indicated to be 1 according to the first field (for example, according to Table 7.3.1.1.2-2A or according to Table 7.3.1.1.2-2B), 1 layer: TPMI = 0;<br>If number of layers is indicated to be 2 according to the first field (for example, according to Table 7.3.1.1.2-2A or according to |

TABLE 32-continued (for example, corresponding to Table 7.3.1.1.2-2G): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 3 according to the first field (for example, according to Table 7.3.1.1.2-2A or according to Table 7.3.1.1.2-2B), 3 layer: TPMI = 0; If number of layers is indicated to be 4 according to the first field (for example, according to Table 7.3.1.1.2-2A or according to Table 7.3.1.1.2-2B), 4 layer: TPMI = 0; | | Table 7.3.1.1.2-2B), 2 layer: TPMI = 0; If number of layers is indicated to be 3 according to the first field (for example, according to Table 7.3.1.1.2-2A or according to Table 7.3.1.1.2-2B), 3 layer: TPMI = 0; If number of layers is indicated to be 4 according to the first field (for example, according to Table 7.3.1.1.2-2A or according to Table 7.3.1.1.2-2B), 4 layer: TPMI = 0; |
| 1 | If number of layers is indicated to be 1 according to the first field (for example, according to Table 7.3.1.1.2-2A or according to Table 7.3.1.1.2-2B), 1 layer: TPMI = 1; If number of layers is indicated to be 2 according to the first field (for example, according to Table 7.3.1.1.2-2A or according to Table 7.3.1.1.2-2B), 2 layer: TPMI = 1; If number of layers is indicated to be 3 or 4 according to the first field (for example, according to Table 7.3.1.1.2-2A or according to Table 7.3.1.1.2-2B), reserved; | 1 | If number of layers is indicated to be 1 according to the first field (for example, according to Table 7.3.1.1.2-2A or according to Table 7.3.1.1.2-2B), 1 layer: TPMI = 1; If number of layers is indicated to be 2 according to the first field (for example, according to Table 7.3.1.1.2-2A or according to Table 7.3.1.1.2-2B), 2 layer: TPMI = 1; If number of layers is indicated to be 3 or 4 according to the first field (for example, according to Table 7.3.1.1.2-2A or according to Table 7.3.1.1.2-2B), reserved; |
| . . . | . . . | . . . | . . . |
| 3 | If number of layers is indicated to be 1 according to the first field (for example, according to Table 7.3.1.1.2-2A or according to Table 7.3.1.1.2-2B), 1 layer: TPMI = 3; If number of layers is indicated to be 2 according to the first field (for example, according to Table 7.3.1.1.2-2A or according to Table 7.3.1.1.2-2B), 2 layer: TPMI = 3; If number of layers is indicated to be 3 or 4 according to the first field (for example, according to Table 7.3.1.1.2-2A or according to Table 7.3.1.1.2-2B), reserved; | 3 | If number of layers is indicated to be 1 according to the first field (for example, according to Table 7.3.1.1.2-2A or according to Table 7.3.1.1.2-2B), 1 layer: TPMI = 3; If number of layers is indicated to be 2 according to the first field (for example, according to Table 7.3.1.1.2-2A or according to Table 7.3.1.1.2-2B), 2 layer: TPMI = 3; If number of layers is indicated to be 3 or 4 according to the first field (for example, according to Table 7.3.1.1.2-2A or according to Table 7.3.1.1.2-2B), reserved; |
| 4 | If number of layers is indicated to be 1 according to the first field (for example, according to Table 7.3.1.1.2-2A or according to Table 7.3.1.1.2-2B), 1 layer: TPMI = 4; If number of layers is indicated to be 2 according to the first field (for example, according to Table 7.3.1.1.2-2A or according to Table 7.3.1.1.2-2B), 2 layer: TPMI = 4; If number of layers is indicated to be 3 or 4 according to the | 4 | If number of layers is indicated to be 1 according to the first field (for example, according to Table 7.3.1.1.2-2A or according to Table 7.3.1.1.2-2B), 1 layer: TPMI = 4; If number of layers is indicated to be 2 according to the first field (for example, according to Table 7.3.1.1.2-2A or according to Table 7.3.1.1.2-2B), 2 layer: TPMI = 4; |

TABLE 32-continued (for example, corresponding to Table 7.3.1.1.2-2G): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | first field (for example, according to Table 7.3.1.1.2-2A or according to Table 7.3.1.1.2-2B), reserved; | | If number of layers is indicated to be 3 or 4 according to the first field (for example, according to Table 7.3.1.1.2-2A or according to Table 7.3.1.1.2-2B), reserved; |
| 5 | If number of layers is indicated to be 1 according to the first field (for example, according to Table 7.3.1.1.2-2A or according to Table 7.3.1.1.2-2B), 1 layer: TPMI = 5; If number of layers is indicated to be 2 according to the first field (for example, according to Table 7.3.1.1.2-2A or according to Table 7.3.1.1.2-2B), 2 layer: TPMI = 5; If number of layers is indicated to be 3 or 4 according to the first field (for example, according to Table 7.3.1.1.2-2A or according to Table 7.3.1.1.2-2B), reserved; | 5 | If number of layers is indicated to be 1 according to the first field (for example, according to Table 7.3.1.1.2-2A or according to Table 7.3.1.1.2-2B), 1 layer: TPMI = 5; If number of layers is indicated to be 2 according to the first field (for example, according 7.3.1.1.2-2A or according to Table 7.3.1.1.2-2B), 2 layer: TPMI = 5; If number of layers is indicated to be 3 or 4 according to the first field (for example, according to Table 7.3.1.1.2-2A or according to Table 7.3.1.1.2-2B), reserved; |
| 6 | If number of layers is indicated to be 1 according to the first field (for example, according to Table 7.3.1.1.2-2A or according to Table 7.3.1.1.2-2B), 1 layer: TPMI = 13; If number of layers is indicated to be 2 according to the first field (for example, according to Table 7.3.1.1.2-2A or according to Table 7.3.1.1.2-2B), 2 layer: TPMI = 6; If number of layers is indicated to be 3 according to the first field (for example, according to Table 7.3.1.1.2-2A or according to Table 7.3.1.1.2-2B), 3 layer: TPMI = 1; If number of layers is indicated to be 4 according to the first field (for example, according to Table 7.3.1.1.2-2A or according to Table 7.3.1.1.2-2B), reserved; | 6 | If number of layers is indicated to be 1 according to the first field (for example, according to Table 7.3.1.1.2-2A or according to Table 7.3.1.1.2-2B), 1 layer: TPMI = 13; If number of layers is indicated to be 2 according to the first field (for example, according to Table 7.3.1.1.2-2A or according to Table 7.3.1.1.2-2B), 2 layer: TPMI = 6; If number of layers is indicated to be 3 according to the first field (for according to Table 7.3.1.1.2-2A or according to Table 7.3.1.1.2-2B), 3 layer: TPMI = 1; If number of layers is indicated to be 4 according to the first field (for example, according to Table 7.3.1.1.2-2A or according to Table 7.3.1.1.2-2B), reserved; |
| 7 | If number of layers is indicated to be 1 according to the first field (for example, according to Table 7.3.1.1.2-2A or according to Table 7.3.1.1.2-2B), 1 layer: TPMI = 7; If number of layers is indicated to be 2 according to the first field (for example, according to Table 7.3.1.1.2-2A or according to Table 7.3.1.1.2-2B), 2 layer: TPMI = 7; If number of layers is indicated to be 3 according to the first field (for example, according to Table 7.3.1.1.2-2A or according to Table 7.3.1.1.2-2B), 3 layer: TPMI = 2; | 7 | reserved |

TABLE 32-continued (for example, corresponding to Table 7.3.1.1.2-2G): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 4 according to the first field (for example, according to Table 7.3.1.1.2-2A or according to Table 7.3.1.1.2-2B), 4 layer: TPMI = 1; | | |
| 8 | If number of layers is indicated to be 1 according to the first field (for example, according to Table 7.3.1.1.2-2A or according to Table 7.3.1.1.2-2B), 1 layer: TPMI = 8; If number of layers is indicated to be 2 according to the first field (for example, according to Table 7.3.1.1.2-2A or according to Table 7.3.1.1.2-2B), 2 layer: TPMI = 8; If number of layers is indicated to be 3 according to the first field (for example, according to Table 7.3.1.1.2-2A or according to Table 7.3.1.1.2-2B), reserved; If number of layers is indicated to be 4 according to the first field (for example, according to Table 7.3.1.1.2-2A or according to Table 7.3.1.1.2-2B), 4 layer: TPMI = 2; | | |
| 9 | If number of layers is indicated to be 1 according to the first field (for example, according to Table 7.3.1.1.2-2A or according to Table 7.3.1.1.2-2B), 1 layer: TPMI = 9; If number of layers is indicated to be 2 according to the first field (for example, according to Table 7.3.1.1.2-2A or according to Table 7.3.1.1.2-2B), 2 layer: TPMI = 9; If number of layers is indicated to be 3 or 4 according to the first field (for example, according to Table 7.3.1.1.2-2A or according to Table 7.3.1.1.2-2B), reserved; | | |
| . . . | . . . | | |
| 13 | If number of layers is indicated to be 1 according to the first field (for example, according to Table 7.3.1.1.2-2A or according to Table 7.3.1.1.2-2B), 1 layer: TPMI = 13; If number of layers is indicated to be 2 according to the first field (for example, according to Table 7.3.1.1.2-2A or according to Table 7.3.1.1.2-2B), 2 layer: TPMI = 13; If number of layers is indicated to be 3 or 4 according to the first field (for example, according to Table 7.3.1.1.2-2A or according to Table 7.3.1.1.2-2B), reserved; | | |
| 14 | If number of layers is indicated to be 1 according to the first field (for example, according to Table 7.3.1.1.2-2A or according to Table 7.3.1.1.2-2B), 1 layer: | | |

TABLE 32-continued

| (for example, corresponding to Table 7.3.1.1.2-2G): Precoding information and number of layers for 4 antenna ports, if transform precoder is disabled, maxRank = 2 or 3 or 4, and ul-FullPowerTransmission-r16 = fullpowerMode1 | | | |
|---|---|---|---|
| Bit field mapped to index | codebookSubset = partialAndNonCoherent | Bit field mapped to index | codebookSubset = nonCoherent |
| | TPMI = 14; If number of layers is indicated to be 2 or 3 or 4 according to the first field (for example, according to Table 7.3.1.1.2-2A or according to Table 7.3.1.1.2-2B), reserved; | | |
| 15 | If number of layers is indicated to be 1 according to the first field (for example, according to Table 7.3.1.1.2-2A or according to Table 7.3.1.1.2-2B), 1 layer: TPMI = 15; If number of layers is indicated to be 2 or 3 or 4 according to the first field (for example, according to Table 7.3.1.1.2-2A or according to Table 7.3.1.1.2-2B), reserved; | | |

TABLE 33

| (for example, corresponding to Table 7.3.1.1.2-4B): Precoding information and number of layers, for 2 antenna ports, if transform precoder is disabled, maxRank = 2, and ul-FullPowerTransmission-r16 is not configured or configured to fullpowerMode2 or configured to fullpower | | | |
|---|---|---|---|
| Bit field mapped to index | codebookSubset = fullyAndPartialAndNonCoherent | Bit field mapped to index | codebookSubset = nonCoherent |
| 0 | If number of layers is indicated to be 1 according to the first field (for example, according to Table 7.3.1.1.2-4), 1 layer: TPMI = 0; If number of layers is indicated to be 2 according to the first field (for example, according to Table 7.3.1.1.2-4), 2 layer: TPMI = 0; | 0 | If number of layers is indicated to be 1 according to the first field (for example, according to Table 7.3.1.1.2-4), 1 layer: TPMI = 0; If number of layers is indicated to be 2 according to the first field (for example, according to Table 7.3.1.1.2-4), 2 layer: TPMI = 0; |
| 1 | If number of layers is indicated to be 1 according to the first field (for example, according to Table 7.3.1.1.2-4), 1 layer: TPMI = 1; If number of layers is indicated to be 2 according to the first field (for example, according to Table 7.3.1.1.2-4), reserved; | 1 | If number of layers is indicated to be 1 according to the first field (for example, according to Table 7.3.1.1.2-4), 1 layer: TPMI = 1; If number of layers is indicated to be 2 according to the first field (for example, according to Table 7.3.1.1.2-4), reserved; |
| 2 | If number of layers is indicated to be 1 according to the first field (for example, according to Table 7.3.1.1.2-4), 1 layer: TPMI = 2; If number of layers is indicated to be 2 according to the first field (for example, according to Table 7.3.1.1.2-4), 2 layer: TPMI = 1; | | |
| 3 | If number of layers is indicated to be 1 according to the first field (for example, according to Table 7.3.1.1.2-4), 1 layer: | | |

TABLE 33-continued (for example, corresponding to Table 7.3.1.1.2-4B): Precoding information
and number of layers, for 2 antenna ports, if transform precoder is
disabled, maxRank = 2, and ul-FullPowerTransmission-r16 is not
configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| | TPMI = 3; If number of layers is indicated to be 2 according to the first field (for example, according to Table 7.3.1.1.2-4), 2 layer: TPMI = 2; | | |
| 4 | If number of layers is indicated to be 1 according to the first field (for example, according to Table 7.3.1.1.2-4), 1 layer: TPMI = 4; If number of layers is indicated to be 2 according to the first field (for example, according to Table 7.3.1.1.2-4), reserved; | | |
| 5 | If number of layers is indicated to be 1 according to the first field (for example, according to Table 7.3.1.1.2-4), 1 layer: TPMI = 5; If number of layers is indicated to be 2 according to the first field (for example, according to Table 7.3.1.1.2-4), reserved; | | |
| 6-7 | reserved | | |

TABLE 34

(for example, corresponding to Table 7.3.1.1.2-4C): Precoding
information and number of layers, for 2 antenna ports,
if transform precoder is disabled, maxRank = 2,
and ul-FullPowerTransmission-r16 = fullpowerMode1

| Bit field mapped to index | codebookSubset = nonCoherent |
|---|---|
| 0 | If number of layers is indicated to be 1 according to Table 7.3.1.1.2-4A, 1 layer: TPMI = 0; If number of layers is indicated to be 2 according to the first field (for example, according to Table 7.3.1.1.2-4A), 2 layer: TPMI = 0; |
| 1 | If number of layers is indicated to be 1 according to the first field (for example, according to Table 7.3.1.1.2-4A), 1 layer: TPMI = 1; If number of layers is indicated to be 2 according to Table 7.3.1.1.2-4A), reserved; If number of layers is indicated to be 1 according to the first field (for example, according to Table 7.3.1.1.2-4A), 1 layer: TPMI = 2; |
| 2 | If number of layers is indicated to be 2 according to the first field (for example, according to Table 7.3.1.1.2-4A), reserved; |
| 3 | reserved |

TABLE 35

(for example, corresponding to Table 7.3.1.1.2-5 in 3GPP standard
specification): Precoding information and number of layers,
for 2 antenna ports, if transform precoder is enabled and
ul-FullPowerTransmission-r16 is not configured or configured
to fullpowerMode2 or configured to fullpower, or if transform
precoder is disabled, maxRank = 1, and and ul-FullPowerTransmission-
r16 is not configured or configured to fullpowerMode2 or configured
to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

TABLE 36

(for example, corresponding to Table 7.3.1.1.2-5A in 3GPP
standard specification): Precoding information and number
of layers, for 2 antenna ports, if transform precoder
is enabled and ul-FullPowerTransmission-r16 = fullpowerMode1,
or if transform precoder is disabled, maxRank = 1,
and ul-FullPowerTransmission-r16 = fullpowerMode1

| Bit field mapped to index | codebookSubset = nonCoherent |
|---|---|
| 0 | 1 layer: TPMI = 0 |
| 1 | 1 layer: TPMI = 1 |

TABLE 36-continued

| (for example, corresponding to Table 7.3.1.1.2-5A in 3GPP standard specification): Precoding information and number of layers, for 2 antenna ports, if transform precoder is enabled and ul-FullPowerTransmission-r16 = fullpowerMode1, or if transform precoder is disabled, maxRank = 1, and ul-FullPowerTransmission-r16 = fullpowerMode1 | |
|---|---|
| Bit field mapped to index | codebookSubset = nonCoherent |
| 2 | 1 layer: TPMI = 2 |
| 3 | Reserved |

In some embodiment, in the table of TPMI/precoding information corresponding to the additional/second TPMI field, there may be only TPMIs corresponding to same value of number of layers with that indicated in the first TPMI field. In addition, the bit field mapping to index or interpretation of bit field according to second TPMI field may depend on the value of number of layers indicated according to the first TPMI field. Alternatively, the bit field indicated in the second TPMI field may be only mapped to the TPMI with same value of number of layers with that indicated in the first TPMI field.

In some embodiments, type of codebookSubset and type of full power mode may be configured per terminal device. In other words, the type of codebookSubset and type of full power mode for different TRPs or for different SRS resource sets or for different set of PUSCH transmissions/repetitions may be the same. In this situation, the size of the second TPMI/PMI field may depend on the number of TPMIs for 1 and/or 2 layer transmission and the type of codebookSubset and the value of maxRank and type of full power mode and bit index in the first TPMI/PMI field or TPMI index in the first TPMI/PMI field. In this way, the size of the second TPMI field is less than the size of the first TPMI field, thereby saving overheads.

In some embodiments, the value of number of indexes which corresponds to TPMI associated with at least one of 1 or 2 or 3 or 4 layer (the index is not "reserved" for all number of layers) may be N (N is positive integer), and the size for the second TPMI/PMI field may be ceil(log 2(N)).

When the number of antenna ports is 2:

When codebookSubset configured with non Coherent, and the number of (available) TPMIs for 1 layer transmission is $T_{N1}$ ($T_{N1}$ is positive integer, e.g. $T_{N1}$=2), the number of (available) TPMIs for 2 layer transmission is $T_{N2}$ ($T_{N2}$ is positive integer, e.g. $T_{N2}$=1), the maximum value between $T_{N1}$ and $T_{N2}$ is N1, N1 is positive integer, and N1=max($T_{N1}$,$T_{N2}$). E.g. N1=2.

When codebookSubset configured with fullyAndPartialAndNonCoherent or partialAndNonCoherent, and when the number of antenna ports is 2, the number of (available) TPMIs for 1 layer transmission is $T_{P1}$ ($T_{P1}$ is positive integer, e.g. $T_{P1}$=6), the number of (available) TPMIs for 2 layer transmission is $T_{P2}$ ($T_{P2}$ is positive integer, e.g. $T_{P2}$=3), the maximum value between ($T_{P1}$-$T_{N1}$) and ($T_{P2}$-$T_{N2}$) is N2, N2 is positive integer, and N2=max(($T_{P1}$-$T_{N1}$),($T_{P2}$-$T_{N2}$)). E.g. N2=4.

Then the value of N is N=N1+N2. e.g. N=6 and the size for second TPMI/PMI field may be 3 bits.

When the number of antenna ports is 4:

When codebookSubset configured with non Coherent, and when number of layers in first TPMI/PMI field is 1 and TPMI value $\in$ {0, 1, 2, 3}, then the number of (available) TPMIs for 1 layer transmission for second set of PUSCH transmissions/repetitions or for additional/second TPMI/PMI field is $T_{N1}$ ($T_{N1}$ is positive integer, e.g. $T_{N1}$=4), when number of layers in first TPMI/PMI field is 2 and TPMI value $\in$ {0, 1, 2, 3, 4, 5}, the number of (available) TPMIs for 2 layer transmission for second set of PUSCH transmissions/repetitions or for additional/second TPMI/PMI field is $T_{N2}$ ($T_{N2}$ is positive integer, e.g. $T_{N2}$=6), the maximum value between $T_{N1}$ and $T_{N2}$ is N, N is positive integer, and N=max($T_{N1}$,$T_{N2}$). E.g. N=6, and the size for second TPMI/PMI field is 3 bits.

When codebookSubset configured with partialAndNonCoherent, and when number of layers in first TPMI/PMI field is 1 and TPMI value $\in$ {0, 1, 2, 3}, then the number of (available) TPMIs for 1 layer transmission for second set of PUSCH transmissions/repetitions or for additional/second TPMI/PMI field is $T_{N1}$ ($T_{N1}$ is positive integer, e.g. $T_{N1}$=4), when number of layers in first TPMI/PMI field is 2 and TPMI value $\in$ {0, 1, 2, 3, 4, 5}, the number of (available) TPMIs for 2 layer transmission for second set of PUSCH transmissions/repetitions or for additional/second TPMI/PMI field is $T_{N2}$ ($T_{N2}$ is positive integer, e.g. $T_{N2}$=6), and when number of when number of layers in first TPMI/PMI field is 1 and TPMI value$\in$ {4-11}, then the number of (available) TPMIs for 1 layer transmission for second set of PUSCH transmissions/repetitions or for additional/second TPMI/PMI field is $T_{P1}$ ($T_{P1}$ is positive integer, e.g. $T_{P1}$=8), when number of layers in first TPMI/PMI field is 2 and TPMI value$\in$ {6-13}, the number of (available) TPMIs for 2 layer transmission for second set of PUSCH transmissions/repetitions or for additional/second TPMI/PMI field is $T_{P2}$ ($T_{P2}$ is positive integer, e.g. $T_{P2}$=8), the maximum value among $T_{N1}$, $T_{N2}$, $T_{P1}$ and $T_{P2}$ is N, N is positive integer, and N=max($T_{N1}$,$T_{N2}$,$T_{P1}$,$T_{P2}$). E.g. N=8, and the size for second TPMI/PMI field may be 3 bits When codebookSubset configured with fullyAndPartialAndNonCoherent, and when number of layers in first TPMI/PMI field is 1 and TPMI value$\in$ {0, 1, 2, 3}, then the number of (available) TPMIs for 1 layer transmission for second set of PUSCH transmissions/repetitions or for additional/second TPMI/PMI field is $T_{N1}$ ($T_{N1}$ is positive integer, e.g. $T_{N1}$=4), when number of layers in first TPMI/PMI field is 2 and TPMI value E {0, 1, 2, 3, 4, 5}, the number of (available) TPMIs for 2 layer transmission for second set of PUSCH transmissions/repetitions or for additional/second TPMI/PMI field is $T_{N2}$ ($T_{N2}$ is positive integer, e.g. $T_{N2}$=6), and when number of when number of layers in first TPMI/PMI field is 1 and TPMI value$\in$ {4-11}, then the number of (available) TPMIs for 1 layer transmission for second set of PUSCH transmissions/repetitions or for additional/second TPMI/PMI field is $T_{P1}$ ($T_{P1}$ is positive integer, e.g. $T_{P1}$=8), when number of layers in first TPMI/PMI field is 2 and TPMI value$\in$ {6-13}, the number of (available) TPMIs for 2 layer transmission for second set of PUSCH transmissions/repetitions or for additional/second TPMI/PMI field is $T_{P2}$ ($T_{P2}$ is positive integer, e.g. $T_{P2}$=8), and when number of when number of layers in first TPMI/PMI field is 1 and TPMI value$\in$ {12-27}, then the number of (available) TPMIs for 1 layer transmission for second set of PUSCH transmissions/repetitions or for additional/second TPMI/PMI field is $T_{F1}$ ($T_{F1}$ is positive integer, e.g. $T_{F1}$=16), when number of layers in first TPMI/PMI field is 2 and TPMI value$\in$ {14-21}, the number of (available) TPMIs for 2 layer transmission for second set of PUSCH transmissions/repetitions or for additional/second TPMI/PMI field is $T_{F2}$ ($T_{F2}$ is positive integer, e.g. $T_{F2}$=8), the maximum value among $T_{N1}$, $T_{N2}$, $T_{P1}$, $T_{P2}$, $T_{F1}$ and $T_{F2}$ is N, N is positive integer, and N=max($T_{N1}$,$T_{N2}$,$T_{P1}$,$T_{F2}$,$T_{F1}$,$T_{F2}$). E.g. N=16, and the size for second TPMI/PMI field may be 4 bits The bit field mapping to index or interpretation of bit field according to the additional/second TPMI field depends on the value of number of layers and the value of TPMI index indicated according to the first TPMI field. Number of bits for the second TPMI field can be further reduced, which can save the signaling overhead in DCI.

In some embodiments, the configuration of codebook subset type (for example, codebookSubset in the following Table 37.) and/or the configuration of full power mode (for example, ul-FullPowerTransmission-r16 in the following Table 37.) may be configured for the terminal device 110-1 or configured for all or both of the SRS resource sets associated with "codebook" or with usage set to "codebook" or configured for the first SRS resource set associated with "codebook" or with usage set to "codebook". Only as an example, the first TPMI can be determined by the following Table 37:

TABLE 37

- Precoding information and number of layers - number of bits determined by the following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
  - 4 or 5 bits according to Table 7.3.1.1.2-2A for 4 antenna ports, if txConfig = codebook, ul-FullPowerTransmission-r16 = fullpowerMode1, maxRank=2, transform precoder is disabled, and according to the values of higher layer parameter codebookSubset;
  - 4 or 6 bits according to Table 7.3.1.1.2-2B for 4 antenna ports, if txConfig = codebook, ul-FullPowerTransmission-r16 = fullpowerMode1, maxRank=3 or 4, transform precoder is disabled, and according to the values of higher layer parameter codebookSubset;
  - 2, 4, or 5 bits according to Table 7.3.1.1.2-3 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
  - 3 or 4 bits according to Table 7.3.1.1.2-3A for 4 antenna ports, if txConfig = codebook, ul-FullPowerTransmission-r16 = fullpowerMode1, maxRank=1, and according to whether transform precoder is enabled or disabled, and the values of higher layer parameter codebookSubset;
  - 2 or 4 bits according to Table7.3.1.1.2-4 for 2 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank and codebookSubset;
  - 2 bits according to Table 7.3.1.1.2-4A for 2 antenna ports, if txConfig = codebook, ul-FullPowerTransmission-r16 = fullpowerMode1, transform precoder is disabled, maxRank=2, and codebookSubset=nonCoherent;
  - 1 or 3 bits according to Table7.3.1.1.2-5 for 2 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank and codebookSubset;
  - 2 bits according to Table 7.3.1.1.2-5A for 2 antenna ports, if txConfig = codebook, ul-FullPowerTransmission-r16 = fullpowerMode1, maxRank=1, and according to whether transform precoder is enabled or disabled, and the values of higher layer parameter codebookSubset;

TABLE 38

(for example, corresponding to Table 7.3.1.1.2-2 in 3GPP standard specification): Precoding information and number of layers, for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |

TABLE 38-continued (for example, corresponding to Table 7.3.1.1.2-2 in 3GPP standard specification):
Precoding information and number of layers, for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| . . . | . . . | . . . | . . . | . . . | . . . |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| . . . | . . . | . . . | . . . | | |
| 19 | 1 layer: TPMI = 11 | 19 | 1 layer: TPMI = 11 | | |
| 20 | 2 layers: TPMI = 6 | 20 | 2 layers: TPMI = 6 | | |
| . . . | . . . | . . . | . . . | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| . . . | . . . | | | | |
| 47 | 1 layers: TPMI = 27 | | | | |
| 48 | 2 layers: TPMI = 14 | | | | |
| . . . | . . . | | | | |
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 39

(for example, corresponding to Table 7.3.1.1.2-2A in 3GPP standard
specification): Precoding information and number of layers for 4
antenna ports, if transform precoder is disabled, maxRank = 2,
and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 1 layer: TPMI = 13 | 10 | 1 layer: TPMI = 13 |
| 11 | 2 layer: TPMI = 6 | 11 | 2 layer: TPMI = 6 |
| 12 | 1 layer: TPMI = 4 | 12-15 | Reserved |
| . . . | . . . | | |
| 20 | 1 layer: TPMI = 12 | | |
| 21 | 1 layer: TPMI = 14 | | |
| 22 | 1 layer: TPMI = 15 | | |
| 23 | 2 layers: TPMI = 7 | | |
| . . . | . . . | | |
| 29 | 2 layers: TPMI = 13 | | |
| 30-31 | Reserved | | |

TABLE 40

(for example, corresponding to Table 7.3.1.1.2-2B in 3GPP standard
specification): Precoding information and number of layers for 4
antenna ports, if transform precoder is disabled, maxRank = 3
or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 2 layers: TPMI = 0 | 4 | 2 layers: TPMI = 0 |
| . . . | . . . | . . . | . . . |
| 9 | 2 layers: TPMI = 5 | 9 | 2 layers: TPMI = 5 |
| 10 | 3 layers: TPMI = 0 | 10 | 3 layers: TPMI = 0 |
| 11 | 4 layers: TPMI = 0 | 11 | 4 layers: TPMI = 0 |
| 12 | 1 layer: TPMI = 13 | 12 | 1 layer: TPMI = 13 |
| 13 | 2 layer: TPMI = 6 | 13 | 2 layer: TPMI = 6 |
| 14 | 3 layer: TPMI = 1 | 14 | 3 layer: TPMI = 1 |
| 15 | 1 layer: TPMI = 4 | 15 | Reserved |
| . . . | . . . | | |
| 23 | 1 layer: TPMI = 12 | | |
| 24 | 1 layer: TPMI = 14 | | |
| 25 | 1 layer: TPMI = 15 | | |
| 26 | 2 layers: TPMI = 7 | | |
| . . . | . . . | | |

TABLE 40-continued (for example, corresponding to Table 7.3.1.1.2-2B in 3GPP standard specification): Precoding information and number of layers for 4 antenna ports, if transform precoder is disabled, maxRank = 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 32 | 2 layers: TPMI = 13 | | |
| 33 | 3 layers: TPMI = 2 | | |
| 34 | 4 layers: TPMI = 1 | | |
| 35 | 4 layers: TPMI = 2 | | |
| 36-63 | Reserved | | |

TABLE 43

(for example, corresponding to Table 7.3.1.1.2-4 in 3GPP standard specification): Precoding information and number of layers, for 2 antenna ports, if transform precoder is disabled, maxRank = 2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |

TABLE 41

(for example, corresponding to Table 7.3.1.1.2-3 in 3GPP standard specification): Precoding information and number of layers for 4 antenna ports, if transform precoder is enabled and ul-FullPowerTransmission-r16 is either not configured or configured to fullpowerMode2, or if transform precoder is disabled, maxRank = 1, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| | | . . . | . . . | | |
| 11 | 1 layer: TPMI = 11 | 11 | 1 layer: TPMI = 11 | | |
| 12 | 1 layers: TPMI = 12 | 12-15 | reserved | | |
| . . . | . . . | | | | |
| 27 | 1 layers: TPMI = 27 | | | | |
| 28-31 | reserved | | | | |

TABLE 42

(for example, corresponding to Table 7.3.1.1.2-3A in 3GPP standard specification): Precoding information and number of layers for 4 antenna ports, if transform precoder is enabled and ul-FullPowerTransmission-r16 = fullpowerMode1, or if transform precoder is disabled, maxRank = 1, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| . . . | . . . | . . . | . . . |
| 3 | 1 layer: TPMI = 3 | 3 | 1 layer: TPMI = 3 |
| 4 | 1 layer: TPMI = 13 | 4 | 1 layer: TPMI = 13 |
| 5 | 1 layer: TPMI = 4 | 5-7 | Reserved |
| . . . | . . . | | |
| 13 | 1 layer: TPMI = 12 | | |
| 14 | 1 layer: TPMI = 14 | | |
| 15 | 1 layer: TPMI = 15 | | |

TABLE 43-continued (for example, corresponding to Table 7.3.1.1.2-4 in 3GPP standard specification): Precoding information and number of layers, for 2 antenna ports, if transform precoder is disabled, maxRank = 2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

TABLE 44

(corresponding to Table 7.3.1.1.2-4A in 3GPP standard specification): Precoding information and number of layers, for 2 antenna ports, if transform precoder is disabled, maxRank = 2, and ul-FullPowerTransmission-r16 = fullpowerMode1

| Bit field mapped to index | codebookSubset = nonCoherent |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |

TABLE 45

(for example, corresponding to Table 7.3.1.1.2-5 in 3GPP standard specification): Precoding information and number of layers, for 2 antenna ports, if transform precoder is enabled and ul-FullPowerTransmission-r16 is not configured or configured to fullpowerMode2 or configured to fullpower, or if transform precoder is disabled, maxRank = 1, and and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

TABLE 46

(for example, corresponding to Table 7.3.1.1.2-5A in 3GPP standard specification): Precoding information and number of layers, for 2 antenna ports, if transform precoder is enabled and ul-FullPowerTransmission-r16 = fullpowerMode1, or if transform precoder is disabled, maxRank = 1, and ul-FullPowerTransmission-r16 = fullpowerMode1

| Bit field mapped to index | codebookSubset = nonCoherent |
|---|---|
| 0 | 1 layer: TPMI = 0 |
| 1 | 1 layer: TPMI = 1 |
| 2 | 1 layer: TPMI = 2 |
| 3 | Reserved |

In some embodiments, the configuration of codebook subset type (for example, codebookSubset in the following Table 47.) and/or the configuration of full power mode (for example, ul-FullPowerTransmission-r16 in the following Table 47.) may be configured for the terminal device 110-1 or configured for all or both of the SRS resource sets associated with "codebook" or with usage set to "codebook" or configured for the second SRS resource set associated with "codebook" or with usage set to "codebook". In this situation, the second TPMI can be determined by the following Table 47:

TABLE 47

- Precoding information (additional) - number of bits determined by (at least one of) the following:
- 0 bits if the higher layer parameter txConfig = nonCodeBook;
- 0 bits for 1 antenna port and if the higher layer parameter txConfig = codebook;
- 3, 3, or 4 bits according to Table 7.3.1.1.2-2C-2 for 4 antenna ports, if txConfig = codebook, ul-FullPowerTransmission-r16 is not configured or configured to fullpowerMode2 or configured to fullpower, and according to whether transform precoder is enabled or disabled, and the values of higher layer parameters maxRank, and codebookSubset;
- 3 or 4 bits according to Table 7.3.1.1.2-2D-2 for 4 antenna ports, if txConfig = codebook, ul-FullPowerTransmission-r16 = fullpowerMode1, maxRank=2, transform precoder is disabled, and according to the values of higher layer parameter codebookSubset;
( or
- 3 or 4 bits according to Table 7.3.1.1.2-2E-2 for 4 antenna ports, if txConfig = codebook, ul-FullPowerTransmission-r16 = fullpowerMode1, maxRank=2, transform precoder is disabled, and according to the values of higher layer parameter codebookSubset;
)
- 3 or 4 bits according to Table 7.3.1.1.2-2F-2 for 4 antenna ports, if txConfig = codebook, ul-FullPowerTransmission-r16 = fullpowerMode1, maxRank=3 or 4, transform precoder is disabled, and according to the values of higher layer parameter codebookSubset;
( or
- 3 or 4 bits according to Table 7.3.1.1.2-2F-2 for 4 antenna ports, if txConfig = codebook, ul-FullPowerTransmission-r16 = fullpowerMode1, maxRank=2 or 3 or 4, transform precoder is disabled, and according to the values of higher layer parameter codebookSubset;
or
- 3 or 4 bits according to Table 7.3.1.1.2-2E-2 for 4 antenna ports, if txConfig = codebook, ul-FullPowerTransmission-r16 = fullpowerMode1, maxRank=2, transform precoder is disabled, and according to the values of higher layer parameter codebookSubset;

TABLE 47-continued

- 3 or 4 bits according to Table 7.3.1.1.2-2G-2 for 4 antenna ports, if txConfig =
codebook, ul-FullPowerTransmission-r16 = fullpowerMode1, maxRank=3 or 4, transform
precoder is disabled, and according to the values of higher layer parameter
codebookSubset;
Or
- 3 or 4 bits according to Table 7.3.1.1.2-2G-2 for 4 antenna ports, if txConfig =
codebook, ul-FullPowerTransmission-r16 = fullpowerMode1, maxRank=2 or 3 or 4,
transform precoder is disabled, and according to the values of higher layer parameter
codebookSubset;
)
- 1 or 3 bits according to Table7.3.1.1.2-4B-2 for 2 antenna ports, if txConfig =
codebook, ul-FullPowerTransmission-r16 is not configured or configured to
fullpowerMode2 or configured to fullpower, and according to whether transform precoder
is enabled or disabled, and the values of higher layer parameters maxRank and
codebookSubset;
- 2 bits according to Table 7.3.1.1.2-4A-2 for 2 antenna ports, if txConfig = codebook,
ul-FullPowerTransmission-r16 = fullpowerMode1, transform precoder is disabled,
maxRank=2, and codebookSubset=nonCoherent;
(or
- 2 bits according to Table 7.3.1.1.2-4C-2 for 2 antenna ports, if txConfig = codebook,
ul-FullPowerTransmission-r16 = fullpowerMode1, transform precoder is disabled,
maxRank=2, and codebookSubset=nonCoherent;
)
- 1 or 3 bits according to Table7.3.1.1.2-5 for 2 antenna ports, if txConfig = codebook,
ul-FullPowerTransmission-r16 is not configured or configured to fullpowerMode2 or
configured to fullpower, and according to whether transform precoder is enabled or
disabled, and the values of higher layer parameters maxRank and codebookSubset;
2 bits according to Table 7.3.1.1.2-5A for 2 antenna ports, if txConfig = codebook,
ul-FullPowerTransmission-r16 = fullpowerMode1, maxRank=1, and according to whether
transform precoder is enabled or disabled, and the values of higher layer parameter
codebookSubset;
For the higher layer parameter txConfig=codebook, if ul-FullPowerTransmission-r16 is
configured to fullpowerMode2, maxRank is configured to be larger than 2, and at least one
SRS resource with 4 antenna ports is configured in an SRS resource set with usage set to
'codebook' and an SRS resource with 2 antenna ports is indicated via SRI in the same SRS
resource set, then Table 7.3.1.1.2-4 is used.
For the higher layer parameter txConfig = codebook, if different SRS resources with
different number of antenna ports are configured, the bitwidth is determined according to
the maximum number of ports in an SRS resource among the configured SRS resources in
an SRS resource set with usage set to 'codebook'. If the number of ports for a configured
SRS resource in the set is less than the maximum number of ports in an SRS resource
among the configured SRS resources, a number of most significant bits with value set to '0'
are inserted to the field.

TABLE 48

(for example, corresponding to Table 7.3.1.1.2-2C-2): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | If number of layers is indicated to be 1 and if TPMI ∈ {0, 1, 2, 3} according to the first field (for example, according to Table 7.3.1.1.2-2), 1 layer: TPMI = 0; If number of layers is indicated to be 1 and if TPMI ∈ {4-11} according to the first field (for example, according to Table 7.3.1.1.2-2), 1 layer: TPMI = 4; If number of layers is indicated to be 1 and if TPMI ∈ {12-27} according to the first field (for example, according to Table 7.3.1.1.2-2), 1 layer: TPMI = 12; | 0 | If number of layers is indicated to be 1 and if TPMI ∈ {0, 1, 2, 3} according to the first field (for example, according to Table 7.3.1.1.2-2), 1 layer: TPMI = 0; If number of layers is indicated to be 1 and if TPMI ∈ {4-11} according to the first field (for example, according to Table 7.3.1.1.2-2), 1 layer: TPMI = 4; If number of | 0 | If number of layers is indicated to be 1 and/or TPMI ∈ {0, 1, 2, 3} according to the first field (for example, according to Table 7.3.1.1.2-2), 1 layer: TPMI = 0; If number of layers is indicated to be 2 and/or TPMI ∈ {0, 1, 2, 3, 4, 5} according to the first field |

TABLE 48-continued (for example, corresponding to Table 7.3.1.1.2-2C-2): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 2 and TPMI ∈ {0, 1, 2, 3, 4, 5} according to the first field (for example, according to Table 7.3.1.1.2-2), 2 layer: TPMI = 0; If number of layers is indicated to be 2 and TPMI ∈ {6-13} according to the first field (for example, according to Table 7.3.1.1.2-2), 2 layer: TPMI = 6; If number of layers is indicated to be 2 and TPMI W {14-21} according to the first field (for example, according to Table 7.3.1.1.2-2), 2 layer: TPMI = 14; If number of layers is indicated to be 3 and TPMI = 0 according to the first field (for example, according to Table 7.3.1.1.2-2), 3 layer: TPMI = 0; If number of layers is indicated to be 3 and TPMI ∈ {1, 2} according to the first field (for example, according to Table 7.3.1.1.2-2), 3 layer: TPMI = 1; If number of layers is indicated to be 3 and TPMI ∈ {3-6} according to the first field (for example, according to Table 7.3.1.1.2-2), 3 layer: TPMI = 3; If number of layers is indicated to be 4 and TPMI = 0 according to the first field (for example, according to Table 7.3.1.1.2-2), 4 layer: TPMI = 0; If number of layers is indicated to be 4 and TPMI ∈ {1, 2} according to the first field (for example, according to Table 7.3.1.1.2-2), 4 layer: TPMI = 1; If number of layers is indicated to be 4 and TPMI ∈ {3, 4} according to the first field (for example, according to Table 7.3.1.1.2-2), 4 layer: TPMI = 3; | | layers is indicated to be 2 and TPMI ∈ {0, 1, 2, 3, 4, 5} according to the first field (for example, according to Table 7.3.1.1.2-2), 2 layer: TPMI = 0; If number of layers is indicated to be 2 and TPMI ∈ {6-13} according to the first field (for example, according to Table 7.3.1.1.2-2), 2 layer: TPMI = 6; If number of layers is indicated to be 3 and TPMI = 0 according to the first field (for example, according to Table 7.3.1.1.2-2), 3 layer: TPMI = 0; If number of layers is indicated to be 3 and TPMI ∈ {1, 2} according to the first field (for example, according to Table 7.3.1.1.2-2), 3 layer: TPMI = 1; If number of layers is indicated to be 4 and TPMI = 0 according to the first field (for example, according to Table 7.3.1.1.2-2), 4 layer: TPMI = 0; If number of layers is indicated to be 4 and TPMI ∈ {1, 2} according to the first field (for example, according to Table 7.3.1.1.2-2), 4 layer: TPMI = 1; | | (for example, according to Table 7.3.1.1.2-2), 2 layer: TPMI = 0; If number of layers is indicated to be 3 and/or TPMI = 0 according to the first field (for example, according to Table 7.3.1.1.2-2), 3 layer: TPMI = 0; If number of layers is indicated to be 4 and/or TPMI = 0 according to the first field (for example, according to Table 7.3.1.1.2-2), 4 layer: TPMI = 0; |
| 1 | If number of layers is indicated to be 1 and if TPMI ∈ {0, 1, 2, 3} according to the first field (for example, according to Table 7.3.1.1.2-2), 1 layer: TPMI = 1; | 1 | If number of layers is indicated to be 1 and if TPMI ∈ {0, 1, 2, 3} according to the first field (for example, | 1 | If number of layers is indicated to be 1 and/or TPMI ∈ {0, 1, 2, 3} according to the first field |

TABLE 48-continued (for example, corresponding to Table 7.3.1.1.2-2C-2): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 1 and if TPMI ∈ {4-11} according to the first field (for example, according to Table 7.3.1.1.2-2), 1 layer: TPMI = 5; If number of layers is indicated to be 1 and if TPMI ∈ {12-27} according to the first field (for example, according to Table 7.3.1.1.2-2), 1 layer: TPMI = 13; If number of layers is indicated to be 2 and TPMI ∈ {0, 1, 2, 3, 4, 5} according to the first field (for example, according to Table 7.3.1.1.2-2), 2 layer: TPMI = 1; If number of layers is indicated to be 2 and TPMI ∈ {6-13} according to the first field (for example, according to Table 7.3.1.1.2-2), 2 layer: TPMI = 7; If number of layers is indicated to be 2 and TPMI ∈ {14-21} according to the first field (for example, according to Table 7.3.1.1.2-2), 2 layer: TPMI = 15; If number of layers is indicated to be 3 and TPMI = 0 according to the first field (for example, according to Table 7.3.1.1.2-2), reserved; If number of layers is indicated to be 3 and TPMI ∈ {1, 2} according to the first field (for example, according to Table 7.3.1.1.2-2), 3 layer: TPMI = 2; If number of layers is indicated to be 3 and TPMI ∈ {3-6} according to the first field (for example, according to Table 7.3.1.1.2-2), 3 layer: TPMI = 4; If number of layers is indicated to be 4 and TPMI = 0 according to the first field (for example, according to Table 7.3.1.1.2-2), reserved; If number of layers is indicated to be 4 and TPMI ∈ {1, 2} according to the first field (for example, according to Table 7.3.1.1.2-2), 4 layer: TPMI = 2; | | according to Table 7.3.1.1.2-2), 1 layer: TPMI = 1; If number of layers is indicated to be 1 and if TPMI ∈ {4-11} according to the first field (for example, according to Table 7.3.1.1.2-2), 1 layer: TPMI = 5; If number of layers is indicated to be 2 and TPMI ∈ {0, 1, 2, 3, 4, 5} according to the first field (for example, according to Table 7.3.1.1.2-2), 2 layer: TPMI = 1; If number of layers is indicated to be 2 and TPMI ∈ {6-13} according to the first field (for example, according to Table 7.3.1.1.2-2), 2 layer: TPMI = 7; If number of layers is indicated to be 3 and TPMI = 0 according to the first field (for example, according to Table 7.3.1.1.2-2), reserved; If number of layers is indicated to be 3 and TPMI ∈ {1, 2} according to the first field (for example, according to Table 7.3.1.1.2-2), 3 layer: TPMI = 2; If number of layers is indicated to be 4 and TPMI = 0 according to the first field (for example, according to Table 7.3.1.1.2-2), reserved; If number of layers is indicated to be 4 and TPMI ∈ {1, 2} according to the first field (for example, according to Table 7.3.1.1.2-2), 4 | | (for example, according to Table 7.3.1.1.2-2), 1 layer: TPMI = 1; If number of layers is indicated to be 2 and/or TPMI ∈ {0, 1, 2, 3, 4, 5} according to the first field (for example, according to Table 7.3.1.1.2-2), 2 layer: TPMI = 1; If number of layers is indicated to be 3 or 4 according to the first field (for example, according to Table 7.3.1.1.2-2), reserved; |

TABLE 48-continued (for example, corresponding to Table 7.3.1.1.2-2C-2): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 4 and TPMI ∈ {3, 4} according to the first field (for example, according to Table 7.3.1.1.2-2), 4 layer: TPMI = 4; | | layer: TPMI = 2; | | |
| 2 | If number of layers is indicated to be 1 and if TPMI ∈ {0, 1, 2, 3} according to the first field (for example, according to Table 7.3.1.1.2-2), 1 layer: TPMI = 2; If number of layers is indicated to be 1 and if TPMI ∈ {4-11} according to the first field (for example, according to Table 7.3.1.1.2-2), 1 layer: TPMI = 6; If number of layers is indicated to be 1 and if TPMI ∈ {12-27} according to the first field (for example, according to Table 7.3.1.1.2-2), 1 layer: TPMI = 14; If number of layers is indicated to be 2 and TPMI ∈ {0, 1, 2, 3, 4, 5} according to the first field (for example, according to Table 7.3.1.1.2-2), 2 layer: TPMI = 2; If number of layers is indicated to be 2 and TPMI ∈ {6-13} according to the first field (for example, according to Table 7.3.1.1.2-2), 2 layer: TPMI = 8; If number of layers is indicated to be 2 and TPMI ∈ {14-21} according to the first field (for example, according to Table 7.3.1.1.2-2), 2 layer: TPMI = 16; If number of layers is indicated to be 3 and TPMI ∈ {0, 1, 2} according to the first field (for example, according to Table 7.3.1.1.2-2), reserved; If number of layers is indicated to be 3 and TPMI ∈ {3-6} according to the first field (for example, according to Table 7.3.1.1.2-2), 3 layer: TPMI = 5; If number of layers is indicated to be 4 and/or TPMI ∈ {0, 1, 2, 3, 4} according to the first field (for example, according to Table 7.3.1.1.2-2), reserved; | 2 | If number of layers is indicated to be 1 and if TPMI ∈ {0, 1, 2, 3} according to the first field (for example, according to Table 7.3.1.1.2-2), 1 layer: TPMI = 2; If number of layers is indicated to be 1 and if TPMI ∈ {4-11} according to the first field (for example, according to Table 7.3.1.1.2-2), 1 layer: TPMI = 6; If number of layers is indicated to be 2 and TPMI ∈ {0, 1, 2, 3, 4, 5} according to the first field (for example, according to Table 7.3.1.1.2-2), 2 layer: TPMI = 2; If number of layers is indicated to be 2 and TPMI ∈ {6-13} according to the first field (for example, according to Table 7.3.1.1.2-2), 2 layer: TPMI = 8; If number of layers is indicated to be 3 or 4 and/or TPMI ∈ {0, 1, 2} according to the first field (for example, according to Table 7.3.1.1.2-2), reserved; | 2 | If number of layers is indicated to be 1 and/or TPMI ∈ {0, 1, 2, 3} according to the first field (for example, according to Table 7.3.1.1.2-2), 1 layer: TPMI = 2; If number of layers is indicated to be 2 and/or TPMI ∈ {0, 1, 2, 3, 4, 5} according to the first field (for example, according to Table 7.3.1.1.2-2), 2 layer: TPMI = 2; If number of layers is indicated to be 3 or 4 according to the first field (for example, according to Table 7.3.1.1.2-2), reserved; |

TABLE 48-continued (for example, corresponding to Table 7.3.1.1.2-2C-2): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 3 | If number of layers is indicated to be 1 and if TPMI ∈ {0, 1, 2, 3} according to the first field (for example, according to Table 7.3.1.1.2-2), 1 layer: TPMI = 3; If number of layers is indicated to be 1 and if TPMI ∈ {4-11} according to the first field (for example, according to Table 7.3.1.1.2-2), 1 layer: TPMI = 7; If number of layers is indicated to be 1 and if TPMI ∈ {12-27} according to the first field (for example, according to Table 7.3.1.1.2-2), 1 layer: TPMI = 15; If number of layers is indicated to be 2 and TPMI ∈ {0, 1, 2, 3, 4, 5} according to the first field (for example, according to Table 7.3.1.1.2-2), 2 layer: TPMI = 3; If number of layers is indicated to be 2 and TPMI ∈ {6-13} according to the first field (for example, according to Table 7.3.1.1.2-2), 2 layer: TPMI = 9; If number of layers is indicated to be 2 and TPMI ∈ {14-21} according to the first field (for example, according to Table 7.3.1.1.2-2), 2 layer: TPMI = 17; If number of layers is indicated to be 3 and TPMI ∈ {0, 1, 2} according to the first field (for example, according to Table 7.3.1.1.2-2), reserved; If number of layers is indicated to be 3 and TPMI ∈ {3-6} according to the first field (for example, according to Table 7.3.1.1.2-2), 3 layer: TPMI = 6; If number of layers is indicated to be 4 and/or TPMI ∈ {0, 1, 2, 3, 4} according to the first field (for example, according to Table 7.3.1.1.2-2), reserved; | 3 | If number of layers is indicated to be 1 and if TPMI ∈ {0, 1, 2, 3} according to the first field (for example, according to Table 7.3.1.1.2-2), 1 layer: TPMI = 3; If number of layers is indicated to be 1 and if TPMI ∈ {4-11} according to the first field (for example, according to Table 7.3.1.1.2-2), 1 layer: TPMI = 7; If number of layers is indicated to be 2 and TPMI ∈ {0, 1, 2, 3, 4, 5} according to the first field (for example, according to Table 7.3.1.1.2-2), 2 layer: TPMI = 3; If number of layers is indicated to be 2 and TPMI ∈ {6-13} according to the first field (for example, according to Table 7.3.1.1.2-2), 2 layer: TPMI = 9; If number of layers is indicated to be 3 or 4 and/or TPMI ∈ {0, 1, 2} according to the first field (for example, according to Table 7.3.1.1.2-2), reserved; | 3 | If number of layers is indicated to be 1 and/or TPMI ∈ {0, 1, 2, 3} according to the first field (for example, according to Table 7.3.1.1.2-2), 1 layer: TPMI = 3; If number of layers is indicated to be 2 and/or TPMI ∈ {0, 1, 2, 3, 4, 5} according to the first field (for example, according to Table 7.3.1.1.2-2), 2 layer: TPMI = 3; If number of layers is indicated to be 3 or 4 according to the first field (for example, according to Table 7.3.1.1.2-2), reserved; |
| 4 | If number of layers is indicated to be 1 and if TPMI ∈ {0, 1, 2, 3} according to the first field (for example, according to Table 7.3.1.1.2-2), reserved; | 4 | If number of layers is indicated to be 1 and if TPMI ∈ {0, 1, 2, 3} according to the first field (for | 4 | If number of layers is indicated to be 1 or 3 or 4 according to the first field (for example, |

TABLE 48-continued (for example, corresponding to Table 7.3.1.1.2-2C-2): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 1 and if TPMI ∈ {4-11} according to the first field (for example, according to Table 7.3.1.1.2-2), 1 layer: TPMI = 8; If number of layers is indicated to be 1 and if TPMI ∈ {12-27} according to the first field (for example, according to Table 7.3.1.1.2-2), 1 layer: TPMI = 16; If number of layers is indicated to be 2 and TPMI ∈ {0, 1, 2, 3, 4, 5} according to the first field (for example, according to Table 7.3.1.1.2-2), 2 layer: TPMI = 4; If number of layers is indicated to be 2 and TPMI ∈ {6-13} according to the first field (for example, according to Table 7.3.1.1.2-2), 2 layer: TPMI = 10; If number of layers is indicated to be 2 and TPMI ∈ {14-21} according to the first field (for example, according to Table 7.3.1.1.2-2), 2 layer: TPMI = 18; If number of layers is indicated to be 3 and/or TPMI ∈ {0-6} according to the first field (for example, according to Table 7.3.1.1.2-2), reserved; If number of layers is indicated to be 4 and/or TPMI ∈ {0, 1, 2, 3, 4} according to the first field (for example, according to Table 7.3.1.1.2-2), reserved; | | example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 8; If number of layers is indicated to be 2 and TPMI ∈ {0, 1, 2, 3, 4, 5} according to the first field (for example, according to Table 7.3.1.1.2-2), 2 layer: TPMI = 4; If number of layers is indicated to be 2 and TPMI ∈ {6-13} according to the first field (for example, according to Table 7.3.1.1.2-2), 2 layer: TPMI = 10; If number of layers is indicated to be 3 or 4 and/or TPMI ∈ {0, 1, 2} according to the first field (for example, according to Table 7.3.1.1.2-2), reserved; | | according to Table 7.3.1.1.2-2), reserved; If number of layers is indicated to be 2 and/or TPMI ∈ {0, 1, 2, 3, 4, 5} according to the first field (for example, according to Table 7.3.1.1.2-2), 2 layer: TPMI = 4; |
| 5 | If number of layers is indicated to be 1 and if TPMI ∈ {0, 1, 2, 3} according to the first field (for example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 9; If number of layers is indicated to be 1 and if TPMI ∈ {12-27} according to the first field (for example, according to Table 7.3.1.1.2-2), 1 layer: TPMI = 17; | 5 | If number of layers is indicated to be 1 and if TPMI ∈ {0, 1, 2, 3} according to the first field (for example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 9; | 5 | If number of layers is indicated to be 1 or 3 or 4 according to the first field (for example, according to Table 7.3.1.1.2-2), reserved; If number of layers is indicated to be 2 and/or TPMI ∈ {0, 1, 2, 3, 4, 5} according to the first field (for example, according to |

TABLE 48-continued (for example, corresponding to Table 7.3.1.1.2-2C-2): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 2 and TPMI ∈ {0, 1, 2, 3, 4, 5} according to the first field (for example, according to Table 7.3.1.1.2-2), 2 layer: TPMI = 5; If number of layers is indicated to be 2 and TPMI ∈ {6-13} according to the first field (for example, according to Table 7.3.1.1.2-2), 2 layer: TPMI = 11; If number of layers is indicated to be 2 and TPMI ∈ {14-21} according to the first field (for example, according to Table 7.3.1.1.2-2), 2 layer: TPMI = 19; If number of layers is indicated to be 3 and/or TPMI ∈ {0-6} according to the first field (for example, according to Table 7.3.1.1.2-2), reserved; If number of layers is indicated to be 4 and/or TPMI ∈ {0, 1, 2, 3, 4} according to the first field (for example, according to Table 7.3.1.1.2-2), reserved; | | If number of layers is indicated to be 2 and TPMI ∈ {0, 1, 2, 3, 4, 5} according to the first field (for example, according to Table 7.3.1.1.2-2), 2 layer: TPMI = 5; If number of layers is indicated to be 2 and TPMI ∈ {6-13} according to the first field (for example, according to Table 7.3.1.1.2-2), 2 layer: TPMI = 11; If number of layers is indicated to be 3 or 4 and/or TPMI ∈ {0, 1, 2} according to the first field (for example, according to Table 7.3.1.1.2-2), reserved; | | Table 7.3.1.1.2-2), 2 layer: TPMI = 5; |
| 6 | If number of layers is indicated to be 1 and if TPMI ∈ {0, 1, 2, 3} according to the first field (for example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 10; If number of layers is indicated to be 1 and if TPMI ∈ {12-27} according to the first field (for example, according to Table 7.3.1.1.2-2), 1 layer: TPMI = 18; If number of layers is indicated to be 2 and TPMI ∈ {0, 1, 2, 3, 4, 5} according to the first field (for example, according to Table 7.3.1.1.2-2), reserved; If number of layers is indicated to be 2 and TPMI ∈ {6-13} according to the first field (for example, according to Table 7.3.1.1.2-2), 2 layer: TPMI = 12; | 6 | If number of layers is indicated to be 1 and if TPMI ∈ {0, 1, 2, 3} according to the first field (for example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 10; If number of layers is indicated to be 2 and TPMI ∈ {0, 1, 2, 3, 4, 5} according to the first field (for example, according to Table 7.3.1.1.2-2), reserved; If number of layers is indicated to be 2 and TPMI ∈ {6-13} | 6-7 | reserved |

TABLE 48-continued (for example, corresponding to Table 7.3.1.1.2-2C-2): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 2 and TPMI ∈ {14-21} according to the first field (for example, according to Table 7.3.1.1.2-2), 2 layer: TPMI = 20; If number of layers is indicated to be 3 and/or TPMI ∈ {0-6} according to the first field (for example, according to Table 7.3.1.1.2-2), reserved; If number of layers is indicated to be 4 and/or TPMI ∈ {0, 1, 2, 3, 4} according to the first field (for example, according to Table 7.3.1.1.2-2), reserved; | | according to the first field (for example, according to Table 7.3.1.1.2-2), 2 layer: TPMI = 12; If number of layers is indicated to be 3 or 4 and/or TPMI ∈ {0, 1, 2} according to the first field (for example, according to Table 7.3.1.1.2-2), reserved; | | |
| 7 | If number of layers is indicated to be 1 and if TPMI ∈ {0, 1, 2, 3} according to the first field (for example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 11; If number of layers is indicated to be 1 and if TPMI ∈ {12-27} according to the first field (for example, according to Table 7.3.1.1.2-2), 1 layer: TPMI = 19; If number of layers is indicated to be 2 and TPMI ∈ {0, 1, 2, 3, 4, 5} according to the first field (for example, according to Table 7.3.1.1.2-2), reserved; If number of layers is indicated to be 2 and TPMI ∈ {6-13} according to the first field (for example, according to Table 7.3.1.1.2-2), 2 layer: TPMI = 13; If number of layers is indicated to be 2 and TPMI ∈ {14-21} according to the first field (for example, according to Table 7.3.1.1.2-2), 2 layer: TPMI = 21; If number of layers is indicated to be 3 and/or TPMI ∈ {0-6} according to the first field (for example, according to Table 7.3.1.1.2-2), reserved; | 7 | If number of layers is indicated to be 1 and if TPMI ∈ {0, 1, 2, 3} according to the first field (for example, according to Table 7.3.1.1.2-2), reserved; If number of layers is indicated to be 1 and if TPMI ∈ {4-11} according to the first field (for example, according to Table 7.3.1.1.2-2), 1 layer: TPMI = 11; If number of layers is indicated to be 2 and TPMI ∈ {0, 1, 2, 3, 4, 5} according to the first field (for example, according to Table 7.3.1.1.2-2), reserved; If number of layers is indicated to be 2 and TPMI ∈ {6-13} according to the first field (for example, according to Table 7.3.1.1.2-2), 2 layer: TPMI = 13; If number of layers is indicated to be 3 or 4 and/or TPMI ∈ {0, 1, 2} according to the first field (for example, according to Table | | |

TABLE 48-continued (for example, corresponding to Table 7.3.1.1.2-2C-2): Precoding information (for
second set of PUSCH transmissions/repetitions), for 4 antenna ports, if transform
precoder is disabled, maxRank = 2 or 3 or 4, and ul-FullPowerTransmission-
r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 4 and/or TPMI ∈ {0, 1, 2, 3, 4} according to the first field (for example, according to Table 7.3.1.1.2-2), reserved; | | 7.3.1.1.2-2), reserved; | | |
| 8 | If number of layers is indicated to be 1 and if TPMI ∈ {0-11} according to the first field (for example, according to Table 7.3.1.1.2-2), reserved; If number of layers is indicated to be 1 and if TPMI ∈ {12-27} according to the first field (for example, according to Table 7.3.1.1.2-2), 1 layer: TPMI = 20; If number of layers is indicated to be 2 and/or TPMI ∈ {0-21} according to the first field (for example, according to Table 7.3.1.1.2-2), reserved; If number of layers is indicated to be 3 and/or TPMI ∈ {0-6} according to the first field (for example, according to Table 7.3.1.1.2-2), reserved; If number of layers is indicated to be 4 and/or TPMI ∈ {0, 1, 2, 3, 4} according to the first field (for example, according to Table 7.3.1.1.2-2), reserved; | | | | |
| . . . | . . . | | | | |
| 15 | If number of layers is indicated to be 1 and if TPMI ∈ {0-11} according to the first field (for example, according to Table 7.3.1.1.2-2), reserved; If number of layers is indicated to be 1 and if TPMI ∈ {12-27} according to the first field (for example, according to Table 7.3.1.1.2-2), 1 layer: TPMI = 27; If number of layers is indicated to be 2 and/or TPMI ∈ {0-21} according to the first field (for example, according to Table 7.3.1.1.2-2), reserved; If number of layers is indicated to be 3 and/or TPMI ∈ {0-6} according to the first field (for example, according to Table 7.3.1.1.2-2), reserved; | | | | |

TABLE 48-continued (for example, corresponding to Table 7.3.1.1.2-2C-2): Precoding information (for second set of PUSCH transmissions/repetitions), for 4 antenna ports, if transform precoder is disabled, maxRank = 2 or 3 or 4, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| | If number of layers is indicated to be 4 and/or TPMI ∈ {0, 1, 2, 3, 4} according to the first field (for example, according to Table 7.3.1.1.2-2), reserved; | | | | |

TABLE 49

(for example, corresponding to Table 7.3.1.1.2-2D-2): Precoding information and number of layers for 4 antenna ports, if transform precoder is disabled, maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 and TPMI ∈ {0, 1, 2, 3, 13} according to Table 7.3.1.1.2-2A, 1 layer: TPMI = 0; If number of layers is indicated to be 1 and TPMI ∈ {4-12, 14, 15} according to the first field (for example, according to Table 7.3.1.1.2-2A), 1 layer: TPMI = 4; If number of layers is indicated to be 2 and TPMI ∈ {0, 1, 2, 3, 4, 5, 6} according to the first field (for example, according to Table 7.3.1.1.2-2A), 2 layer: TPMI = 0; If number of layers is indicated to be 2 and TPMI ∈ {7-13} according to the first field (for example, according to Table 7.3.1.1.2-2A), 2 layer: TPMI = 7; | 0 | If number of layers is indicated to be 1 and/or TPMI ∈ {0, 1, 2, 3, 13} according to the first field (for example, according to Table 7.3.1.1.2-2A), 1 layer: TPMI = 0; If number of layers is indicated to be 2 and/or TPMI ∈ {0, 1, 2, 3, 4, 5, 6} according to the first field (for example, according to Table 7.3.1.1.2-2A), 2 layer: TPMI = 0; |
| 1 | If number of layers is indicated to be 1 and TPMI ∈ {0, 1, 2, 3, 13} according to the first field (for example, according to Table 7.3.1.1.2-2A), 1 layer: TPMI = 1; If number of layers is indicated to be 1 and TPMI ∈ {4-12, 14, 15} according to the first field (for example, according to Table 7.3.1.1.2-2A), 1 layer: TPMI = 5; If number of layers is indicated to be 2 and TPMI ∈ {0, 1, 2, 3, 4, 5, 6} according to the first field (for example, according to Table 7.3.1.1.2-2A), 2 layer: TPMI = 1; If number of layers is indicated to be 2 and TPMI ∈ {7-13} according to the first field (for example, according to Table 7.3.1.1.2-2A), 2 layer: TPMI = 8; | 1 | If number of layers is indicated to be 1 and/or TPMI ∈ {0, 1, 2, 3, 13} according to the first field (for example, according to Table 7.3.1.1.2-2A), 1 layer: TPMI = 1; If number of layers is indicated to be 2 and/or TPMI ∈ {0, 1, 2, 3, 4, 5, 6} according to the first field (for example, according to Table 7.3.1.1.2-2A), 2 layer: TPMI = 1; |
| . . . | . . . | . . . | . . . |
| 3 | If number of layers is indicated to be 1 and TPMI ∈ {0, 1, 2, 3, 13} according to the first field (for example, according to Table 7.3.1.1.2-2A), 1 layer: TPMI = 3; If number of layers is indicated to be 1 and TPMI ∈ {4-12, 14, 15} according to the first field (for example, according to Table 7.3.1.1.2-2A), 1 layer: TPMI = 7; | 3 | If number of layers is indicated to be 1 and/or TPMI ∈ {0, 1, 2, 3, 13} according to the first field (for example, according to Table 7.3.1.1.2-2A), 1 layer: TPMI = 3; If number of layers is indicated to be 2 and/or TPMI ∈ {0, 1, 2, 3, 4, 5, 6} |

TABLE 49-continued (for example, corresponding to Table 7.3.1.1.2-2D-2): Precoding information
and number of layers for 4 antenna ports, if transform precoder is disabled,
maxRank = 2, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 2 and TPMI ∈ {0, 1, 2, 3, 4, 5, 6} according to the first field (for example, according to Table 7.3.1.1.2-2A), 2 layer: TPMI = 3; If number of layers is indicated to be 2 and TPMI E {7-13} according to the first field (for example, according to Table 7.3.1.1.2-2A), 2 layer: TPMI = 10; | | according to the first field (for example, according to Table 7.3.1.1.2-2A), 2 layer: TPMI = 3; |
| 4 | If number of layers is indicated to be 1 and TPMI ∈ {0, 1, 2, 3, 13} according to the first field (for example, according to Table 7.3.1.1.2-2A), 1 layer: TPMI = 13; If number of layers is indicated to be 1 and TPMI ∈ {4-12, 14, 15} according to the first field (for example, according to Table 7.3.1.1.2-2A), 1 layer: TPMI = 8; If number of layers is indicated to be 2 and TPMI ∈ {0, 1, 2, 3, 4, 5, 6} according to the first field (for example, according to Table 7.3.1.1.2-2A), 2 layer: TPMI = 4; If number of layers is indicated to be 2 and TPMI ∈ {7-13} according to the first field (for example, according to Table 7.3.1.1.2-2A), 2 layer: TPMI = 11; | 4 | If number of layers is indicated to be 1 and/or TPMI ∈ {0, 1, 2, 3, 13} according to the first field (for example, according to Table 7.3.1.1.2-2A), 1 layer: TPMI = 13; If number of layers is indicated to be 2 and/or TPMI ∈ {0, 1, 2, 3, 4, 5, 6} according to the first field (for example, according to Table 7.3.1.1.2-2A), 2 layer: TPMI = 4; |
| 5 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 9; If number of layers is indicated to be 2 and TPMI ∈ {0, 1, 2, 3, 4, 5, 6} according to the first field (for example, according to Table 7.3.1.1.2-2A), 2 layer: TPMI = 5; If number of layers is indicated to be 2 and TPMI ∈ {7-13} according to the first field (for example, according to Table 7.3.1.1.2-2A), 2 layer: TPMI = 12; | 5 | If number of layers is indicated to be 1 and/or TPMI ∈ {0, 1, 2, 3, 13} according to the first field (for example, according to Table 7.3.1.1.2-2A), reserved; If number of layers is indicated to be 2 and/or TPMI ∈ {0, 1, 2, 3, 4, 5, 6} according to the first field (for example, according to Table 7.3.1.1.2-2A), 2 layer: TPMI = 5; |
| 6 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 10; If number of layers is indicated to be 2 and TPMI ∈ {0, 1, 2, 3, 4, 5, 6} according to the first field (for example, according to Table 7.3.1.1.2-2A), 2 layer: TPMI = 6; If number of layers is indicated to be 2 and TPMI ∈ {7-13} according to the first field (for example, according to Table 7.3.1.1.2-2A), 2 layer: TPMI = 13; | 6 | If number of layers is indicated to be 1 and/or TPMI ∈ {0, 1, 2, 3, 13} according to the first field (for example, according to Table 7.3.1.1.2-2A), reserved; If number of layers is indicated to be 2 and/or TPMI ∈ {0, 1, 2, 3, 4, 5, 6} according to the first field (for example, according to Table 7.3.1.1.2-2A), 2 layer: TPMI = 6; |
| 7 | If number of layers is indicated to be 1 and TPMI ∈ {0, 1, 2, 3, 13} | 7 | reserved |

TABLE 49-continued

| (for example, corresponding to Table 7.3.1.1.2-2D-2): Precoding information and number of layers for 4 antenna ports, if transform precoder is disabled, maxRank = 2, and ul-FullPowerTransmission-r16 = fullpowerMode1 | | |
| --- | --- | --- |
| Bit field mapped to index | codebookSubset = partialAndNonCoherent | Bit field mapped to index codebookSubset = nonCoherent |
| | according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 11; If number of layers is indicated to be 2 and/or TPMI ∈ {0-13} according to the first field (for example, according to Table 7.3.1.1.2-2A), reserved; | |
| 8 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 12; If number of layers is indicated to be 2 and/or TPMI ∈ {0-13} according to the first field (for example, according to Table 7.3.1.1.2-2A), reserved; | |
| 9 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 14; If number of layers is indicated to be 2 and/or TPMI ∈ {0-13} according to the first field (for example, according to Table 7.3.1.1.2-2A), reserved; | |
| 10 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 15; If number of layers is indicated to be 2 and/or TPMI ∈ {0-13} according to the first field (for example, according to Table 7.3.1.1.2-2A), reserved; | |
| 11-15 | reserved | |

TABLE 50

(for example, corresponding to Table 7.3.1.1.2-2E-2): Precoding information and number of layers for 4 antenna ports, if transform precoder is disabled, maxRank = 2, and ul-FullPowerTransmission-r16

| Bit field mapped to index | codebookSubset = partialAndNonCoherent | Bit field mapped to index | codebookSubset = nonCoherent |
|---|---|---|---|
| 0 | If number of layers is indicated to be 1 and TPMI ∈ {0, 1, 2, 3} according to the first field (for example, according to Table 7.3.1.1.2-2A), 1 layer: TPMI = 0; If number of layers is indicated to be 1 and TPMI = 13 according to the first field (for example, according to Table 7.3.1.1.2-2A), 1 layer: TPMI = 13; If number of layers is indicated to be 1 and TPMI ∈ {4-12, 14, 15} according to the first field (for example, according to Table 7.3.1.1.2-2A), 1 layer: TPMI = 4; If number of layers is indicated to be 2 and TPMI ∈ {0, 1, 2, 3, 4, 5} according to the first field (for example, according Table 7.3.1.1.2-2A), 2 layer: TPMI = 0; If number of layers is indicated to be 2 and TPMI = 6 according to the first field (for example, according to Table 7.3.1.1.2-2A), 2 layer: TPMI = 6; If number of layers is indicated to be 2 and TPMI ∈ {7-13} according to the first field (for example, according to Table 7.3.1.1.2-2A), 2 layer: TPMI = 7; | 0 | If number of layers is indicated to be 1 and TPMI ∈ {0, 1, 2, 3} according to the first field (for example, according to Table 7.3.1.1.2-2A), 1 layer: TPMI = 0; If number of layers is indicated to be 1 and TPMI = 13 according to the first field (for example, according to Table 7.3.1.1.2-2A), 1 layer: TPMI = 13; If number of layers is indicated to be 2 and TPMI ∈ {0, 1, 2, 3, 4, 5} according to the first field (for example, according to Table 7.3.1.1.2-2A), 2 layer: TPMI = 0; If number of layers is indicated to be 2 and TPMI = 6 according to the first field (for example, according to Table 7.3.1.1.2-2A), 2 layer: TPMI = 6; |
| 1 | If number of layers is indicated to be 1 and TPMI ∈ {0, 1, 2, 3} according to the first field (for example, according to Table 7.3.1.1.2-2A), 1 layer: TPMI = 1; If number of layers is indicated to be 1 and TPMI = 13 according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 5; If number of layers is indicated to be 2A and TPMI ∈ {0, 1, 2, 3, 4, 5} according to Table 7.3.1.1.2-2, 2 layer: TPMI = 1; If number of layers is indicated to be 2A and TPMI = 6 according to Table 7.3.1.1.2-2, reserved; If number of layers is indicated to be 2A and TPMI ∈ {7-13} according to Table 7.3.1.1.2-2, 2 layer: TPMI = 8; | 1 | If number of layers is indicated to be 1 and TPMI ∈ {0, 1, 2, 3} according to the first field (for example, according to Table 7.3.1.1.2-2A), 1 layer: TPMI = 1; If number of layers is indicated to be 1 and TPMI = 13 according to the first field (for example, according to Table 7.3.1.1.2-2A), reserved; If number of layers is indicated to be 2 and TPMI ∈ {0, 1, 2, 3, 4, 5} according to the first field (for example, according to Table 7.3.1.1.2-2A), 2 layer: TPMI = 1; If number of layers is indicated to be 2 and TPMI = 6 according to the first field (for example, according to Table 7.3.1.1.2-2A), reserved; |
| . . . | . . . | . . . | . . . |
| 3 | If number of layers is indicated to be 1 and TPMI ∈ {0, 1, 2, 3} according to the first field (for example, according to Table 7.3.1.1.2-2A), 1 layer: TPMI = 3; If number of layers is indicated to be 1 and TPMI = 13 according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 7; | 3 | If number of layers is indicated to be 1 and TPMI ∈ {0, 1, 2, 3} according to the first field (for example, according to Table 7.3.1.1.2-2A), 1 layer: TPMI = 3; If number of layers is indicated to be 1 and TPMI = 13 according to the first field (for example, according to Table 7.3.1.1.2-2A), reserved; If number of layers is indicated to be 2 and TPMI ∈ |

TABLE 50-continued (for example, corresponding to Table 7.3.1.1.2-2E-2): Precoding information
and number of layers for 4 antenna ports, if transform precoder is
disabled, maxRank = 2, and ul-FullPowerTransmission-r16

| Bit field mapped to index | codebookSubset = partialAndNonCoherent | Bit field mapped to index | codebookSubset = nonCoherent |
|---|---|---|---|
| | If number of layers is indicated to be 2 and TPMI ∈ {0, 1, 2, 3, 4, 5} according to the first field (for example, according to Table 7.3.1.1.2-2A), 2 layer: TPMI = 3; If number of layers is indicated to be 2 and TPMI = 6 according to the first field (for example, according to Table 7.3.1.1.2-2A), reserved; If number of layers is indicated to be 2 and TPMI ∈ {7-13} according to the first field (for example, according to Table 7.3.1.1.2-2A), 2 layer: TPMI = 10; | | {0, 1, 2, 3, 4, 5} according to the first field (for example, according to Table 7.3.1.1.2-2A), 2 layer: TPMI = 3; If number of layers is indicated to be 2 and TPMI = 6 according to the first field (for example, according to Table 7.3.1.1.2-2A), reserved; |
| 4 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 8; If number of layers is indicated to be 2 and TPMI ∈ {0, 1, 2, 3, 4, 5} according to the first field (for example, according to Table 7.3.1.1.2-2A), 2 layer: TPMI = 4; If number of layers is indicated to be 2 and TPMI = 6 according to the first field (for example, according to Table 7.3.1.1.2-2A), reserved; If number of layers is indicated to be 2 and TPMI ∈ {7-13} according to the first field (for example, according to Table 7.3.1.1.2-2A), 2 layer: TPMI = 11; | 4 | If number of layers is indicated to be 1 and/or TPMI ∈ {0, 1, 2, 3, 13} according to the first field (for example, according to Table 7.3.1.1.2-2A), reserved If number of layers is indicated to be 2 and TPMI ∈ {0, 1, 2, 3, 4, 5} according to the first field (for example, according to Table 7.3.1.1.2-2A), 2 layer: TPMI = 4; If number of layers is indicated to be 2 and TPMI = 6 according to the first field (for example, according to Table 7.3.1.1.2-2A), reserved; |
| 5 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 9; If number of layers is indicated to be 2 and TPMI ∈ {0, 1, 2, 3, 4, 5} according to the first field (for example, according to Table 7.3.1.1.2-2A), 2 layer: TPMI = 5; If number of layers is indicated to be 2 and TPMI = 6 according to the first field (for example, according to Table 7.3.1.1.2-2A), reserved; If number of layers is indicated to be 2 and TPMI ∈ {7-13} according to the first field (for example, according to Table 7.3.1.1.2-2A), 2 layer: TPMI = 12; | 5 | If number of layers is indicated to be 1 and/or TPMI ∈ {0, 1, 2, 3, 13} according to the first field (for example, according to Table 7.3.1.1.2-2A), reserved If number of layers is indicated to be 2 and TPMI ∈ {0, 1, 2, 3, 4, 5} according to the first field (for example, according to Table 7.3.1.1.2-2A), 2 layer: TPMI = 5; If number of layers is indicated to be 2 and TPMI = 6 according to the first field (for example, according to Table 7.3.1.1.2-2A), reserved; |
| 6 | If number of layers is indicated to be 1 and TPMI ∈ {0, 1, 2, 3, 13} according to the first field (for example, according to Table 7.3.1.1.2-2A), reserved; | 6-7 | reserved |

TABLE 50-continued (for example, corresponding to Table 7.3.1.1.2-2E-2): Precoding information
and number of layers for 4 antenna ports, if transform precoder is
disabled, maxRank = 2, and ul-FullPowerTransmission-r16

| Bit field mapped to index | codebookSubset = partialAndNonCoherent | Bit field mapped to index | codebookSubset = nonCoherent |
|---|---|---|---|
| | If number of layers is indicated to be 1 and TPMI ∈ {4-12, 14, 15} according to the first field (for example, according to Table 7.3.1.1.2-2A), 1 layer: TPMI = 10; If number of layers is indicated to be 2 and TPMI ∈ {0, 1, 2, 3, 4, 5, 6} according to the first field (for example, according to Table 7.3.1.1.2-2A), reserved; If number of layers is indicated to be 2 and TPMI ∈ {7-13} according to the first field (for example, according to Table 7.3.1.1.2-2A), 2 layer: TPMI = 13; | | |
| 7 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 11; If number of layers is indicated to be 2 and/or TPMI ∈ {0-13} according to the first field (for example, according to Table 7.3.1.1.2-2A), reserved; | | |
| 8 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 12; If number of layers is indicated to be 2 and/or TPMI ∈ {0-13} according to the first field (for example, according to Table 7.3.1.1.2-2A), reserved; | | |
| 9 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 14; If number of layers is indicated to be 2 and/or TPMI ∈ {0-13} according to the first field (for example, according to Table 7.3.1.1.2-2A), reserved; | | |
| 10 | If number of layers is indicated to be 1 and TPMI ∈ {0, 1, 2, 3, 13} according to the first field (for example, according to Table 7.3.1.1.2-2A), reserved; If number of layers is indicated to be 1 and TPMI ∈ {4-12, 14, 15} according to the first field (for example, according to Table 7.3.1.1.2-2A), 1 layer: TPMI = 15; If number of layers is indicated to be 2 and/or TPMI ∈ {0-13} | | |

TABLE 50-continued (for example, corresponding to Table 7.3.1.1.2-2E-2): Precoding information
and number of layers for 4 antenna ports, if transform precoder is
disabled, maxRank = 2, and ul-FullPowerTransmission-r16

| Bit field mapped to index | codebookSubset = partialAndNonCoherent | Bit field mapped to index | codebookSubset = nonCoherent |
|---|---|---|---|
| 11-15 | according to the first field (for example, according to Table 7.3.1.1.2-2A), reserved; reserved | | |

TABLE 51

(for example, corresponding to Table 7.3.1.1.2-2F-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 and TPMI ∈ {0, 1, 2, 3, 13} according to Table 7.3.1.1.2-2B, 1 layer: TPMI = 0; If number of layers is indicated to be 1 and TPMI ∈ {4-12, 14, 15} according to Table 7.3.1.1.2-2B, 1 layer: TPMI = 4; If number of layers is indicated to be 2 and TPMI ∈ {0, 1, 2, 3, 4, 5, 6} according to Table 7.3.1.1.2-2B, 2 layer: TPMI = 0; If number of layers is indicated to be 2 and TPMI ∈ {7-13} according to Table 7.3.1.1.2-2B, 2 layer: TPMI = 7; If number of layers is indicated to be 3 and TPMI ∈ {0, 1} according to Table 7.3.1.1.2-2B, 3 layer: TPMI = 0; If number of layers is indicated to be 3 and TPMI = 2 according to Table 7.3.1.1.2-2B, 3 layer: TPMI = 2; If number of layers is indicated to be 4 and TPMI = 0 according to Table 7.3.1.1.2-2B, 4 layer: TPMI = 0; If number of layers is indicated to be 4 and TPMI ∈ {1, 2} according to TPMI = 1; Table 7.3.1.1.2-2B, 4 layer: | 0 | If number of layers is indicated to be 1 and/or TPMI ∈ {0, 1, 2, 3, 13} according to Table 7.3.1.1.2-2B, 1 layer: TPMI = 0; If number of layers is indicated to be 2 and/or TPMI ∈ {0, 1, 2, 3, 4, 5, 6} according to Table 7.3.1.1.2-2B, 2 layer: TPMI = 0; If number of layers is indicated to be 3 and/or TPMI ∈ {0, 1} according to Table 7.3.1.1.2-2B, 3 layer: TPMI = 0; If number of layers is indicated to be 4 and/or TPMI = 0 according to Table 7.3.1.1.2-2B, 4 layer: TPMI = 0; |
| 1 | If number of layers is indicated to be 1 and TPMI ∈ {0, 1, 2, 3, 13} according to Table 7.3.1.1.2-2B, 1 layer: TPMI = 1; If number of layers is indicated to be 1 and TPMI ∈ {4-12, 14, 15} according to Table 7.3.1.1.2-2B, 1 layer: TPMI = 5; If number of layers is indicated to be 2 and TPMI ∈ {0, 1, 2, 3, 4, 5, 6} according to Table 7.3.1.1.2-2B, 2 layer: TPMI = 1; If number of layers is indicated to be 2 and TPMI ∈ {7-13} according to Table 7.3.1.1.2-2B, 2 layer: TPMI = 8; If number of layers is indicated to be 3 and TPMI ∈ {0, 1} according to Table 7.3.1.1.2-2B, 3 layer: TPMI = 1; If number of layers is indicated to be 3 and TPMI = 2 | 1 | If number of layers is indicated to be 1 and/or TPMI ∈ {0, 1, 2, 3, 13} according to Table 7.3.1.1.2-2B, 1 layer: TPMI = 1; If number of layers is indicated to be 2 and/or TPMI ∈ {0, 1, 2, 3, 4, 5, 6} according to Table 7.3.1.1.2-2B, 2 layer: TPMI = 1; If number of layers is indicated to be 3 and/or TPMI ∈ {0, 1} according to Table 7.3.1.1.2-2B, 3 layer: TPMI = 1; If number of layers is indicated to be 4 and/or TPMI = 0 according to Table 7.3.1.1.2-2B, reserved; |

TABLE 51-continued (for example, corresponding to Table 7.3.1.1.2-2F-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | according to Table 7.3.1.1.2-2B, reserved; If number of layers is indicated to be 4 and TPMI = 0 according to Table 7.3.1.1.2-2B, reserved; If number of layers is indicated to be 4 and TPMI ∈ {1, 2} according to Table 7.3.1.1.2-2B, 4 layer: TPMI = 2; | | |
| 2 | If number of layers is indicated to be 1 and TPMI ∈ {0, 1, 2, 3, 13} according to Table 7.3.1.1.2-2B, 1 layer: TPMI = 2; If number of layers is indicated to be 1 and TPMI ∈ {4-12, 14, 15} according to Table 7.3.1.1.2-2B, 1 layer: TPMI = 6; If number of layers is indicated to be 2 and TPMI ∈ {0, 1, 2, 3, 4, 5, 6} according to Table 7.3.1.1.2-2B, 2 layer: TPMI = 2; If number of layers is indicated to be 2 and TPMI ∈ {7-13} according to Table 7.3.1.1.2-2B, 2 layer: TPMI = 9; If number of layers is indicated to be 3 and/or TPMI ∈ {0, 1, according to Table 7.3.1.1.2-2B, reserved; If number of layers is indicated to be 4 and/or TPMI ∈ {0, 1, 2} according to Table 7.3.1.1.2-2B, reserved; | 2 | If number of layers is indicated to be 1 and/or TPMI ∈ {0, 1, 2, 3, 13} according to Table 7.3.1.1.2-2B, 1 layer: TPMI = 2; If number of layers is indicated to be 2 and/or TPMI ∈ {0, 1, 2, 3, 4, 5, 6} according to Table 7.3.1.1.2-2B, 2 layer: TPMI = 2; If number of layers is indicated to be 3 and/or TPMI ∈ {0, 1} according to Table 7.3.1.1.2-2B, reserved; If number of layers is indicated to be 4 and/or TPMI = 0 according to Table 7.3.1.1.2-2B, reserved; |
| 3 | If number of layers is indicated to be 1 and TPMI ∈ {0, 1, 2, 3, 13} according to Table 7.3.1.1.2-2B, 1 layer: TPMI = 3; If number of layers is indicated to be 1 and TPMI ∈ {4-12, 14, 15} according to Table 7.3.1.1.2-2B, 1 layer: TPMI = 7; If number of layers is indicated to be 2 and TPMI ∈ {0, 1, 2, 3, 4, 5, 6} according to Table 7.3.1.1.2-2B, 2 layer: TPMI = 3; If number of layers is indicated to be 2 and TPMI ∈ {7-13} according to Table 7.3.1.1.2-2B, 2 layer: TPMI = 10; If number of layers is indicated to be 3 or 4 and/or TPMI ∈ {0, 1, 2} according to Table 7.3.1.1.2-2B, reserved; | 3 | If number of layers is indicated to be 1 and/or TPMI ∈ {0, 1, 2, 3, 13} according to Table 7.3.1.1.2-2B, 1 layer: TPMI = 3; If number of layers is indicated to be 2 and/or TPMI ∈ {0, 1, 2, 3, 4, 5, 6} according to Table 7.3.1.1.2-2B, 2 layer: TPMI = 3; If number of layers is indicated to be 3 and/or TPMI ∈ {0, 1} according to Table 7.3.1.1.2-2B, reserved; If number of layers is indicated to be 4 and/or TPMI = 0 according to Table 7.3.1.1.2-2B, reserved; |
| 4 | If number of layers is indicated to be 1 and TPMI ∈ {0, 1, 2, 3, 13} according to Table 7.3.1.1.2-2B, 1 layer: TPMI = 13; If number of layers is indicated to be 1 and TPMI ∈ {4-12, 14, 15} according to Table 7.3.1.1.2-2B, 1 layer: TPMI = 8; If number of layers is indicated to be 2 and TPMI ∈ {0, 1, 2, 3, 4, 5, 6} according to Table 7.3.1.1.2-2B, 2 layer: TPMI = 4; If number of layers is indicated to be 2 and TPMI ∈ {7-13} according to Table 7.3.1.1.2-2B, 2 layer: | 4 | If number of layers is indicated to be 1 and/or TPMI ∈ {0, 1, 2, 3, 13} according to Table 7.3.1.1.2-2B, 1 layer: TPMI = 13; If number of layers is indicated to be 2 and/or TPMI ∈ {0, 1, 2, 3, 4, 5, 6} according to Table 7.3.1.1.2-2B, 2 layer: TPMI = 4; If number of layers is indicated to be 3 and/or TPMI ∈ {0, 1} according to Table 7.3.1.1.2-2B, reserved; If number of layers is indicated to be 4 and/or TPMI = |

TABLE 51-continued (for example, corresponding to Table 7.3.1.1.2-2F-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | TPMI = 11; If number of layers is indicated to be 3 or 4 and/or TPMI ∈ {0, 1, 2} according to Table 7.3.1.1.2-2B, reserved; | | 0 according to Table 7.3.1.1.2-2B, reserved; |
| 5 | If number of layers is indicated to be 1 and TPMI ∈ {0, 1, 2, 3, 13} according to Table 7.3.1.1.2-2B, reserved; If number of layers is indicated to be 1 and TPMI ∈ {4-12, 14, 15} according to Table 7.3.1.1.2-2B, 1 layer: TPMI = 9; If number of layers is indicated to be 2 and TPMI ∈ {0, 1, 2, 3, 4, 5, 6} according to Table 7.3.1.1.2-2B, 2 layer: TPMI = 5; If number of layers is indicated to be 2 and TPMI ∈ {7-13} according to Table 7.3.1.1.2-2B, 2 layer: TPMI = 12; If number of layers is indicated to be 3 or 4 and/or TPMI ∈ {0, 1, 2} according to Table 7.3.1.1.2-2B, reserved; | 5 | If number of layers is indicated to be 1 and/or TPMI ∈ {0, 1, 2, 3, 13} according to Table 7.3.1.1.2-2B, reserved; If number of layers is indicated to be 2 and/or TPMI ∈ {0, 1, 2, 3, 4, 5, 6} according to Table 7.3.1.1.2-2B, 2 layer: TPMI = 5; If number of layers is indicated to be 3 and/or TPMI ∈ {0, 1} according to Table 7.3.1.1.2-2B, reserved; If number of layers is indicated to be 4 and/or TPMI = 0 according to Table 7.3.1.1.2-2B, reserved; |
| 6 | If number of layers is indicated to be 1 and TPMI ∈ {0, 1, 2, 3, 13} according to Table 7.3.1.1.2-2B, reserved; If number of layers is indicated to be 1 and TPMI ∈ {4-12, 14, 15} according to Table 7.3.1.1.2-2B, 1 layer: TPMI = 10; If number of layers is indicated to be 2 and TPMI ∈ {0, 1, 2, 3, 4, 5, 6} according to Table 7.3.1.1.2-2B, 2 layer: TPMI = 6; If number of layers is indicated to be 2 and TPMI ∈ {7-13} according to Table 7.3.1.1.2-2B, 2 layer: TPMI = 13; If number of layers is indicated to be 3 or 4 and/or TPMI ∈ {0, 1, 2} according to Table 7.3.1.1.2-2B, reserved; | 6 | If number of layers is indicated to be 1 and/or TPMI ∈ {0, 1, 2, 3, 13} according to Table 7.3.1.1.2-2B, reserved; If number of layers is indicated to be 2 and/or TPMI ∈ {0, 1, 2, 3, 4, 5, 6} according to Table 7.3.1.1.2-2B, TPMI = 6; If number of layers is indicated to be 3 and/or TPMI ∈ {0, 1} according to Table 7.3.1.1.2-2B, reserved; If number of layers is indicated to be 4 and/or TPMI = 0 according to Table 7.3.1.1.2-2B, reserved; |
| 7 | If number of layers is indicated to be 1 and TPMI ∈ {0, 1, 2, 3, 13} according to Table 7.3.1.1.2-2B, reserved; If number of layers is indicated to be 1 and TPMI ∈ {4-12, 14, 15} according to Table 7.3.1.1.2-2B, 1 layer: TPMI = 11; If number of layers is indicated to be 2 and/or TPMI ∈ {0-13} according to Table 7.3.1.1.2-2B, reserved; If number of layers is indicated to be 3 or 4 and/or TPMI ∈ {0, 1, 2} according to Table 7.3.1.1.2-2B, reserved; | 7 | reserved |
| 8 | If number of layers is indicated to be 1 and TPMI ∈ {0, 1, 2, 3, 13} according to Table 7.3.1.1.2-2B, reserved; If number of layers is indicated to be 1 and TPMI ∈ {4-12, 14, 15} according to Table | | |

TABLE 51-continued (for example, corresponding to Table 7.3.1.1.2-2F-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | 7.3.1.1.2-2B, 1 layer: TPMI = 12; If number of layers is indicated to be 2 and/or TPMI ∈ {0-13} according to Table 7.3.1.1.2-2B, reserved; If number of layers is indicated to be 3 or 4 and/or TPMI ∈ {0, 1, 2} according to Table 7.3.1.1.2-2B, reserved; | | |
| 9 | If number of layers is indicated to be 1 and TPMI ∈ {0, 1, 2, 3, 13} according to Table 7.3.1.1.2-2B, reserved; If number of layers is indicated to be 1 and TPMI ∈ {4-12, 14, 15} according to Table 7.3.1.1.2-2B, 1 layer: TPMI = 14; If number of layers is indicated to be 2 and/or TPMI ∈ {0-13} according to Table 7.3.1.1.2-2B, reserved; If number of layers is indicated to be 3 or 4 and/or TPMI ∈ {0, 1, 2} according to Table 7.3.1.1.2-2B, reserved; | | |
| 10 | If number of layers is indicated to be 1 and TPMI ∈ {0, 1, 2, 3, 13} according to Table 7.3.1.1.2-2B, reserved; If number of layers is indicated to be 1 and TPMI ∈ {4-12, 14, 15} according to Table 7.3.1.1.2-2B, 1 layer: TPMI = 15; If number of layers is indicated to be 2 and/or TPMI ∈ {0-13} according to Table 7.3.1.1.2-2B, reserved; If number of layers is indicated to be 3 or 4 and/or TPMI ∈ {0, 1, 2} according to Table 7.3.1.1.2-2B, reserved; | | |
| 11-15 | reserved | | |

TABLE 52

(for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| 0 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 0; If number of layers is indicated to be 1 and TPMI = 13 according to the first field (for example, according to Table 7.3.1.1.2-2A or Table 7.3.1.1.2-2B), 1 layer: TPMI = 13; | 0 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 0; If number of layers is indicated to be 1 and TPMI = 13 according to the first field (for example, according to Table 7.3.1.1.2-2A or Table |

TABLE 52-continued (for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 1 and TPMI ∈ {4-12, 14, 15} according to the first field (for example, according to Table 7.3.1.1.2-2A or Table 7.3.1.1.2-2B), 1 layer: TPMI = 4; If number of layers is indicated to be 2 and TPMI {0, 1, 2, 3, 4, 5} according to the first field (for example, according to Table 7.3.1.1.2-2A or Table 7.3.1.1.2-2B), 2 layer: TPMI = 0; If number of layers is indicated to be 2 and TPMI = 6 according to the first field (for example, according to Table 7.3.1.1.2-2A or Table 7.3.1.1.2-2B), 2 layer: TPMI = 6; If number of layers is indicated to be 2 and TPMI ∈ {7-13} according to the first field (for example, according to Table 7.3.1.1.2-2A or Table 7.3.1.1.2-2B), 2 layer: TPMI = 7; If number of layers is indicated to be 3 and TPMI = 0 according to the first field (for example, according to Table 7.3.1.1.2-2A or Table 7.3.1.1.2-2B), 3 layer: TPMI = 0; If number of layers is indicated to be 3 and TPMI = 1 according to the first field (for example, according to Table 7.3.1.1.2-2A or Table 7.3.1.1.2-2B), 3 layer: TPMI = 1; If number of layers is indicated to be 3 and TPMI = 2 according to the first field (for example, according to Table 7.3.1.1.2-2A or Table 7.3.1.1.2-2B), 3 layer: TPMI = 2; If number of layers is indicated to be 4 and TPMI = 0 according to the first field (for example, according to Table 7.3.1.1.2-2A or Table 7.3.1.1.2-2B), 4 layer: TPMI = 0; If number of layers is indicated to be 4 and TPMI ∈ {1, 2} according to the first field (for example, according to Table 7.3.1.1.2-2A or Table 7.3.1.1.2-2B), 4 layer: TPMI = 1; | | 7.3.1.1.2-2B), 1 layer: TPMI = 13; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 0; If number of layers is indicated to be 2 and TPMI = 6 according to the first field (for example, according to Table 7.3.1.1.2-2A or Table 7.3.1.1.2-2B), 2 layer: TPMI = 6; If number of layers is indicated to be 3 and TPMI = 0 according to the first field (for example, according to Table 7.3.1.1.2-2A or Table 7.3.1.1.2-2B), 3 layer: TPMI = 0; If number of layers is indicated to be 3 and TPMI = 1 according to the first field (for example, according to Table 7.3.1.1.2-2A or Table 7.3.1.1.2-2B), 3 layer: TPMI = 1; If number of layers is indicated to be 4 and/or TPMI = 0 according to the first field (for example, according to Table 7.3.1.1.2-2A or Table 7.3.1.1.2-2B), 4 layer: TPMI = 0; |
| 1 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 1; If number of layers is indicated to be 1 and TPMI = 13 according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 5; | 1 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 1; If number of layers is indicated to be 1 and TPMI = 13 according to the first field (for example, according to Table 7.3.1.1.2-2A or Table 7.3.1.1.2-2B), reserved; If number of layers is indicated to be 2 and TPMI ∈ {0, 1, 2, 3, 4, 5} according to the first field (for example, |

TABLE 52-continued (for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 1; If number of layers is indicated to be 2 and TPMI = 6 according to the first field (for example, according to Table 7.3.1.1.2-2A or Table 7.3.1.1.2-2B), reserved; If number of layers is indicated to be 2 and TPMI ∈ {7-13} according to the first field (for example, according to Table 7.3.1.1.2-2A or Table 7.3.1.1.2-2B), 2 layer: TPMI = 8; If number of layers is indicated to be 3 and/or TPMI ∈ {0, 1, 2} according to the first field (for example, according to Table 7.3.1.1.2-2A or Table 7.3.1.1.2-2B), reserved; If number of layers is indicated to be 4 and TPMI = 0 according to the first field (for example, according to Table 7.3.1.1.2-2A or Table 7.3.1.1.2-2B), reserved If number of layers is indicated to be 4 and TPMI ∈ {1, 2} according to the first field (for example, according to Table 7.3.1.1.2-2A or Table 7.3.1.1.2-2B), 4 layer: TPMI = 2; | | according to Table 7.3.1.1.2-2A or 7.3.1.1.2-2B), 2 layer: TPMI = 1; If number of layers is indicated to be 2 and TPMI = 6 according to the first field (for example, according to Table 7.3.1.1.2-2A or Table 7.3.1.1.2-2B), reserved; If number of layers is indicated to be 3 and/or TPMI ∈ {0, 1} according to the first field (for example, according to Table 7.3.1.1.2-2A or Table 7.3.1.1.2-2B), reserved; If number of layers is indicated to be 4 and/or TPMI = 0 according to the first field (for example, according to Table 7.3.1.1.2-2A or Table 7.3.1.1.2-2B), reserved; |
| 2 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 2; If number of layers is indicated to be 1 and TPMI = 13 according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 6; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 2; If number of layers is indicated to be 2 and TPMI = 6 according to the first field (for example, according to Table 7.3.1.1.2-2A or Table 7.3.1.1.2-2B), reserved; If number of layers is indicated to be 2 and TPMI ∈ {7-13} according to the first field (for example, according to Table 7.3.1.1.2-2A or Table 7.3.1.1.2-2B), 2 layer: TPMI = 9; | 2 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 2; If number of layers is indicated to be 1 and TPMI = 13 according to the first field (for example, according to Table 7.3.1.1.2-2A or Table 7.3.1.1.2-2B), reserved; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 2; If number of layers is indicated to be 2 and TPMI = 6 according to the first field (for example, according to Table 7.3.1.1.2-2A or Table 7.3.1.1.2-2B), reserved; If number of layers is indicated to be 3 and/or TPMI ∈ {0, 1} according to the first field (for example, according to Table 7.3.1.1.2-2A or Table 7.3.1.1.2-2B), reserved; If number of layers is indicated to be 4 and/or TPMI = |

TABLE 52-continued (for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 3 and/or TPMI ∈ {0, 1, 2} according to the first field (for example, according to Table 7.3.1.1.2-2A or Table 7.3.1.1.2-2B), reserved; If number of layers is indicated to be 4 and/or TPMI ∈ {0, 1, 2} according to the first field (for example, according to Table 7.3.1.1.2-2A or Table 7.3.1.1.2-2B), reserved; | | 0 according to the first field (for example, according to Table 7.3.1.1.2-2A or Table 7.3.1.1.2-2B), reserved; |
| 3 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 3; If number of layers is indicated to be 1 and TPMI = 13 according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 7; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 3; If number of layers is indicated to be 2 and TPMI = 6 according to the first field (for example, according to Table 7.3.1.1.2-2A or Table 7.3.1.1.2-2B), reserved; If number of layers is indicated to be 2 and TPMI ∈ {7-13} according to the first field (for example, according to Table 7.3.1.1.2-2A or Table 7.3.1.1.2-2B), 2 layer: TPMI = 10; If number of layers is indicated to be 3 or 4 and/or TPMI ∈ {0, 1, 2} according to the first field (for example, according to Table 7.3.1.1.2-2A or Table 7.3.1.1.2-2B), reserved; | 3 | If number of layers is indicated to be 1 and TPMI ∈ {0, 1, 2, 3} according to the first field (for example, according to Table 7.3.1.1.2-2A or Table 7.3.1.1.2-2B), 1 layer: TPMI = 3; If number of layers is indicated to be 1 and TPMI = 13 according to the first field (for example, according to Table 7.3.1.1.2-2A or Table 7.3.1.1.2-2B), reserved; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 3; If number of layers is indicated to be 2 and TPMI = 6 according to the first field (for example, according to Table 7.3.1.1.2-2A or Table 7.3.1.1.2-2B), reserved; If number of layers is indicated to be 3 and/or TPMI ∈ {0, 1} according to the first field (for example, according to Table 7.3.1.1.2-2A or Table 7.3.1.1.2-2B), reserved; If number of layers is indicated to be 4 and/or TPMI = 0 according to the first field (for example, according to Table 7.3.1.1.2-2A or Table 7.3.1.1.2-2B), reserved; |
| 4 | If number of layers is indicated to be 1 and TPMI ∈ {0, 1, 2, 3, 13} according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 8; If number of layers is indicated to be 2 and TPMI ∈ {0, 1, 2, 3, 4, 5} according to the first field | 4 | If number of layers is indicated to be 1 and/or TPMI ∈ {0, 1, 2, 3, 13} according to the first field (for example, according to Table 7.3.1.1.2-2A or Table 7.3.1.1.2-2B), reserved; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 4; |

TABLE 52-continued (for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | (for example, according to Table 7.3.1.1.2-2A or Table 7.3.1.1.2-2B), 2 layer: TPMI = 4; If number of layers is indicated to be 2 and TPMI = 6 according to the first field (for example, according to Table 7.3.1.1.2-2A or Table 7.3.1.1.2-2B), reserved; If number of layers is indicated to be 2 and TPMI ∈ {7-13} according to the first field (for example, according to Table 7.3.1.1.2-2A Table or 7.3.1.1.2-2B), 2 layer: TPMI = 11; If number of layers is indicated to be 3 or 4 and/or TPMI ∈ {0, 1, 2} according to the first field (for example, according to Table 7.3.1.1.2-2A or Table 7.3.1.1.2-2B), reserved; | | If number of layers is indicated to be 2 and TPMI = 6 according to the first field (for example, according to Table 7.3.1.1.2-2A or Table 7.3.1.1.2-2B), reserved; If number of layers is indicated to be 3 and/or TPMI ∈ {0, 1} according to the first field (for example, according to Table 7.3.1.1.2-2A or Table 7.3.1.1.2-2B), reserved; If number of layers is indicated to be 4 and/or TPMI = 0 according to the first field (for example, according to Table 7.3.1.1.2-2A or Table 7.3.1.1.2-2B), reserved; |
| 5 | If number of layers is indicated to be 1 and TPMI ∈ {0, 1, 2, 3, 13} according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 9; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 5; If number of layers is indicated to be 2 and TPMI = 6 according to the first field (for example, according to Table 7.3.1.1.2-2A or Table 7.3.1.1.2-2B), reserved; If number of layers is indicated to be 2 and TPMI ∈ {7-13} according to the first field (for example, according to Table 7.3.1.1.2-2A or Table 7.3.1.1.2-2B), 2 layer: TPMI = 12; If number of layers is indicated to be 3 or 4 and/or TPMI ∈ {0, 1, 2} according to the first field (for example, according to Table 7.3.1.1.2-2A or Table 7.3.1.1.2-2B), reserved; | 5 | If number of layers is indicated to be 1 and/or TPMI ∈ {0, 1, 2, 3, 13} according to the first field (for example, according to Table 7.3.1.1.2-2A or Table 7.3.1.1.2-2B), reserved; If number of layers is indicated to be 2 and TPMI ∈ {0, 1, 2, 3, 4, 5} according to the first field (for example, according to Table 7.3.1.1.2-2A or Table 7.3.1.1.2-2B), 2 layer: TPMI = 5; If number of layers is indicated to be 2 and TPMI = 6 according to the first field (for example, according to Table 7.3.1.1.2-2A or Table 7.3.1.1.2-2B), reserved; If number of layers is indicated to be 3 and/or TPMI ∈ {0, 1} according to the first field (for example, according to Table 7.3.1.1.2-2A or Table 7.3.1.1.2-2B), reserved; If number of layers is indicated to be 4 and/or TPMI = 0 according to the first field (for example, according to Table 7.3.1.1.2-2A or Table 7.3.1.1.2-2B), reserved; |
| 6 | If number of layers is indicated to be 1 and TPMI ∈ {0, 1, 2, 3, 13} according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 10; | 6-7 | reserved |

TABLE 52-continued (for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | If number of layers is indicated to be 2 and TPMI ∈ {0, 1, 2, 3, 4, 5, 6} according to the first field (for example, according to Table 7.3.1.1.2-2A or Table 7.3.1.1.2-2B), reserved; If number of layers is indicated to be 2 and TPMI ∈ {7-13} according to the first field (for example, according to Table 7.3.1.1.2-2A or Table 7.3.1.1.2-2B), 2 layer: TPMI = 13; If number of layers is indicated to be 3 or 4 and/or TPMI ∈ {0, 1, 2} according to the first field (for example, according to Table 7.3.1.1.2-2A or Table 7.3.1.1.2-2B), reserved; | | |
| 7 | If number of layers is indicated to be 1 and TPMI ∈ {0, 1, 2, 3, 13} according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 11; If number of layers is indicated to be 2 and TPMI ∈ {0-13} according to the first field (for example, according to Table 7.3.1.1.2-2A or Table 7.3.1.1.2-2B), reserved; If number of layers is indicated to be 3 or 4 and/or TPMI ∈ {0, 1, 2} according to the first field (for example, according to Table 7.3.1.1.2-2A or Table 7.3.1.1.2-2B), reserved; | 7 | reserved |
| 8 | If number of layers is indicated to be 1 and TPMI ∈ {0, 1, 2, 3, 13} according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 12; If number of layers is indicated to be 2 and TPMI ∈ {0-13} according to the first field (for example, according to Table 7.3.1.1.2-2A or Table 7.3.1.1.2-2B), reserved; If number of layers is indicated to be 3 or 4 and/or TPMI ∈ {0, 1, 2} according to the first field (for example, according to Table 7.3.1.1.2-2A or Table 7.3.1.1.2-2B), reserved; | | |
| 9 | If number of layers is indicated to be 1 and TPMI ∈ {0, 1, 2, 3, 13} according to the first field | | |

TABLE 52-continued (for example, corresponding to Table 7.3.1.1.2-2G-2): Precoding information
and number of layers for 4 antenna ports, if transform precoder is disabled,
maxRank = 2 or 3 or 4, and ul-FullPowerTransmission-r16 = fullpowerMode1

| Bit field mapped to index | codebookSubset = partialAndNonCoherent | Bit field mapped to index | codebookSubset = nonCoherent |
|---|---|---|---|
| | (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 14; If number of layers is indicated to be 2 and TPMI ∈ {0-13} according to the first field (for example, according to Table 7.3.1.1.2-2A or Table 7.3.1.1.2-2B), reserved; If number of layers is indicated to be 3 or 4 and/or TPMI ∈ {0, 1, 2} according to the first field (for example, according to Table 7.3.1.1.2-2A or Table 7.3.1.1.2-2B), reserved; | | |
| 10 | If number of layers is indicated to be 1 and TPMI ∈ {0, 1, 2, 3, 13} according to the first field (for example, according to Table 7.3.1.1.2-2A or Table 7.3.1.1.2-2B), reserved; If number of layers is indicated to be 1 and TPMI ∈ {4-12, 14, 15} according to the first field (for example, according to Table 7.3.1.1.2-2A or Table 7.3.1.1.2-2B), 1 layer: TPMI = 15; If number of layers is indicated to be 2 and TPMI ∈ {0-13} according to the first field (for example, according to Table 7.3.1.1.2-2A or Table 7.3.1.1.2-2B), reserved; If number of layers is indicated to be 3 or 4 and/or TPMI ∈ {0, 1, 2} according to the first field (for example, according to Table 7.3.1.1.2-2A or Table 7.3.1.1.2-2B), reserved; | | |
| 11-15 | reserved | | |

TABLE 53

(for example, corresponding to Table 7.3.1.1.2-4B-2): Precoding information
and number of layers, for 2 antenna ports, if transform precoder is
disabled, maxRank = 2, and ul-FullPowerTransmission-r16 is not
configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| 0 | If number of layers is indicated to be 1 according to the first field (for example, according to Table 7.3.1.1.2-4), 1 layer: TPMI = 0; If number of layers is indicated to be 2 according to the first field (for example, according to Table 7.3.1.1.2-4), 2 layer: | 0 | If number of layers is indicated to be 1 according to the first field (for example, according to Table 7.3.1.1.2-4), 1 layer: TPMI = 0; If number of layers is indicated to be 2 according to the first field |

TABLE 53-continued (for example, corresponding to Table 7.3.1.1.2-4B-2): Precoding information and number of layers, for 2 antenna ports, if transform precoder is disabled, maxRank = 2, and ul-FullPowerTransmission-r16 is not configured or configured to fullpowerMode2 or configured to fullpower

| Bit field mapped to index | codebookSubset = fullyAndPartialAndNonCoherent | Bit field mapped to index | codebookSubset = nonCoherent |
|---|---|---|---|
| | TPMI = 0; | | (for example, according to Table 7.3.1.1.2-4), 2 layer: TPMI = 0; |
| 1 | If number of layers is indicated to be 1 according to the first field (for example, according to Table 7.3.1.1.2-4), 1 layer: TPMI = 1; If number of layers is indicated to be 2 according to the first field (for example, according to Table 7.3.1.1.2-4), reserved; | 1 | If number of layers is indicated to be 1 according to the first field (for example, according to Table 7.3.1.1.2-4), 1 layer: TPMI = 1; If number of layers is indicated to be 2 according to the first field (for example, according to Table 7.3.1.1.2-4), reserved; |
| 2 | If number of layers is indicated to be 1 according to the first field (for example, according to Table 7.3.1.1.2-4), 1 layer: TPMI = 2; If number of layers is indicated to be 2 according to the first field (for example, according to Table 7.3.1.1.2-4), 2 layer: TPMI = 1; | | |
| 3 | If number of layers is indicated to be 1 according to the first field (for example, according to Table 7.3.1.1.2-4), 1 layer: TPMI = 3; If number of layers is indicated to be 2 according to the first field (for example, according to Table 7.3.1.1.2-4), 2 layer: TPMI = 2; | | |
| 4 | If number of layers is indicated to be 1 according to the first field (for example, according to Table 7.3.1.1.2-4), 1 layer: TPMI = 4; If number of layers is indicated to be 2 according to the first field (for example, according to Table 7.3.1.1.2-4), reserved; | | |
| 5 | If number of layers is indicated to be 1 according to the first field (for example, according to Table 7.3.1.1.2-4), 1 layer: TPMI = 5; If number of layers is indicated to be 2 according to the first field (for example, according to Table 7.3.1.1.2-4), reserved; | | |
| 6-7 | reserved | | |

TABLE 54

(for example, corresponding to Table 7.3.1.1.2-4C-2): Precoding information and number of layers, for 2 antenna ports, if transform precoder is disabled, maxRank = 2, and ul-FullPowerTransmission-r16 = fullpowerMode1

| Bit field mapped to index | codebookSubset = nonCoherent |
|---|---|
| 0 | If number of layers is indicated to be 1 according to Table 7.3.1.1.2-4A, 1 layer: |

TABLE 54-continued (for example, corresponding to Table 7.3.1.1.2-4C-2): Precoding information and number of layers, for 2 antenna ports, if transform precoder is disabled, maxRank = 2, and ul-FullPowerTransmission-r16 = fullpowerMode1

| Bit field mapped to index | codebookSubset = nonCoherent |
|---|---|
| | If number of layers is indicated to be 2 according to the first field (for example, |

TABLE 54-continued (for example, corresponding to Table 7.3.1.1.2-4C-2):
Precoding information and number of layers, for 2 antenna
ports, if transform precoder is disabled, maxRank =
2, and ul-FullPowerTransmission-r16 = fullpowerMode1

| Bit field mapped to index | codebookSubset = nonCoherent |
|---|---|
| | according to Table 7.3.1.1.2-4A), 2 layer: TPMI = 0; |
| 1 | If number of layers is indicated to be 1 according to the first field (for example, according to Table 7.3.1.1.2-4A), 1 layer: TPMI = 1; If number of layers is indicated to be 2 according to the first field (for example, according to Table 7.3.1.1.2-4A), reserved; If number of layers is indicated to be 1 according to the first field (for example, according to Table 7.3.1.1.2-4A), 1 layer: TPMI = 2; |
| 2 | If number of layers is indicated to be 2 according to the first field (for example, according to Table 7.3.1.1.2-4A), reserved; |
| 3 | reserved |

According to above embodiments, there may be a set of available TPMIs (e.g. S1) in the second TPMI field. The set may be different based on different values of number of layers and/or different values of TPMI index indicated according to the first TPMI field. In some embodiments, a subset of available TPMIs (e.g. ST1) from S1 may be defined/configured. For example, the subset may be different for different set of S1. Alternatively, the subset may be predefined or configured by at least one of: radio resource control (RRC), medium access control (MAC) control element (CE) or DCI. For example, the precoding information table in this embodiment may be a subset of tables defined in Tables 1-61. For another example, the values of bit field mapped to index in Tables 1-6 may be only for disclosure, and the values can be changed. For example, the values of bit field mapped to index in Tables 1-61 may be any one of {0-63}. For example, in this way, the number of bits for the second TPMI field can be further reduced, which can save the signaling overhead in DCI.

As mentioned above, the control information may indicate an index associated with the first TPMI and the second TPMI for the plurality of PUSCH transmissions. Embodiments of the present disclosure are now described with the reference to the situation where the control information may indicate an index associated with the first TPMI and the second TPMI for the plurality of PUSCH transmissions. In some embodiments, the index may be indicated directly. Alternatively, t the index may be indicated indirectly. In other embodiments, the control information may implicitly indicate the index. Alternatively, the control information may explicitly indicate the index.

In some embodiments, if the number of layers is indicated as 1 by the index in the field, the first TPMI and the second TPMI associated/indicated with the index in the field can only be any one of the TPMI associated with 1 layer. In some embodiments, if the number of layers is indicated as 2 by the index in the field, the first TPMI and the second TPMI associated/indicated with the index in the field can only be any one of the TPMI associated with 2 layers. In some embodiments, if the number of layers is indicated as 3 by the index in the field, the first TPMI and the second TPMI associated/indicated with the index in the field can only be any one of the TPMI associated with 3 layers. In some embodiments, if the number of layers is indicated as 4 by the index in the field, the first TPMI and the second TPMI associated/indicated with the index in the field can only be any one of the TPMI associated with 4 layers. In some embodiments, the index in the field may indicate {R layers, TPMI1, TPMI2}, and R may be any one of {1, 2, 3, 4}. For example, TPMI1 is a non-negative integer, and TPMI1 may be any one from 0-27. For example, TPMI2 is a non-negative integer, and TPMI2 may be any one from 0-27.

In some embodiments, there may be 2 TPMIs (for example, $TPMI_{j1}$ and $TPMI_{j2}$) associated/linked/related with the index in the field. And $TPMI_{j1}$ is associated with one value R1 for the number of layers (For example, R1 may be any one of {1,2,3,4}), and $TPMI_{j2}$ is associated with the same value R1 for the number of layers. For example, the first TPMI is indicated to be $TPMI_{j1}$ with number of layers R1 or to be "reserved" with number of layers R1, and the second TPMI is indicated to be $TPMI_{j2}$ with number of layers R1 or to be "reserved" with number of layers R1. For example, $TPMI_{j1}$ is a non-negative integer, and $TPMI_{j1}$ may be any one from 0-27. For example, $TPMI_{j2}$ is a non-negative integer, and $TPMI_{j2}$ may be any one from 0-27. For example, $TPMI_{j1}$ may be different from $TPMI_{j2}$. In some embodiments, $TPMI_{j1}$=iii with R1 layers or $TPMI_{j1}$="reserved" with R1 layers and $TPMI_{j2}$=$i_{j2}$ with R1 layers or $TPMI_{j2}$="reserved" with R1 layers may be associated/linked/related with idx. And iii is a non-negative integer, $i_{j2}$ is a non-negative integer, and idx is a non-negative integer. For example, iii may be from 0 to 27. For example, $i_{j2}$ may be from 0 to 27. For example, idx may be from 0 to 1299. For another example, idx may be from 0 to 2047. For another example, iii may be different from $i_{j2}$. In some embodiments, the size for the field may be Y bits, and Y is positive integer. For example, Y may be no larger than 11. For example, Y may be any one of {1, 2, 3, 4, 5, 6, 7, 8, 9, 10, 11}.

In some embodiments, if the number of layers is indicated as 1 by the index in the field, the first TPMI and the second TPMI associated/indicated with the index in the field can only be any one of the TPMI associated with 1 layer. In some embodiments, if the number of layers is indicated as 2 by the index in the field, the first TPMI and the second TPMI associated/indicated with the index in the field can only be any one of the TPMI associated with 2 layers. In some embodiments, if the number of layers is indicated as 3 by the index in the field, the first TPMI and the second TPMI associated/indicated with the index in the field can only be any one of the TPMI associated with 3 layers. In some embodiments, if the number of layers is indicated as 4 by the index in the field, the first TPMI and the second TPMI associated/indicated with the index in the field can only be any one of the TPMI associated with 4 layers. In some embodiments, the index in the field may indicate {R layers, TPMI1, TPMI2}, and R may be any one of {1, 2, 3, 4}. For example, TPMI1 is a non-negative integer, and TPMI1 may be any one from 0-27. For example, TPMI2 is a non-negative integer, and TPMI2 may be any one from 0-27.

In some embodiments, if the number of antenna ports is configured as 4 or the number of SRS ports is 4, and if transform precoder is disabled, and if maxRank=2 or 3 or 4, and if ul-FullPowerTransmission-r16 is not configured or configured to fullpowerMode2 or configured to fullpower, and if codebookSubset is configured as non Coherent. In some embodiments, if the number of layers is indicated as 1 by the index in the field, the TPMI1 associated/indicated with the index in the field can only be any one of TPMI1={0, 1, 2, 3} with 1 layer, and the TPMI2 associated/indicated with the index in the field can only be any one of TPMI2={0, 1, 2, 3} with 1 layer. In some embodiments, if the number of layers is indicated as 2 by the index in the field, the TPMI1 associated/indicated with the index in the field can only be any one of TPMI1={0, 1, 2, 3, 4, 5} with 2 layers, the TPMI2 associated/indicated with the index in the field can only be any one of TPMI2={0, 1, 2, 3, 4, 5} with 2 layers. In some embodiments, if the number of layers is indicated as 3 by the index in the field, the TPMI1 associated/indicated with the index in the field can only be TPMI={0} with 3 layers, the TPMI2 associated/indicated with the index in the field can only be TPMI2={0} with 3 layers. In some embodiments, if the number of layers is indicated as 3 by the index in the field, there is no need to indicate the value of TPMI1 and TPMI2, and TPMI1 is assumed to be TPMI1={0} with 3 layers, and TPMI2 is assumed to be TPMI2={0} with 3 layers. In some embodiments, if the number of layers is indicated as 4 by the index in the field, the TPMI1 associated/indicated with the index in the field can only be TPMI={0} with 4 layers, the TPMI2 associated/indicated with the index in the field can only be TPMI2={0} with 4 layers. In some embodiments, if the number of layers is indicated as 4 by the index in the field, there is no need to indicate the value of TPMI1 and TPMI2, and TPMI1 is assumed to be TPMI1={0} with 4 layers, and TPMI2 is assumed to be TPMI2={0} with 4 layers. In some embodiments, the size for the field may be Y bits. Y is positive integer. For example, Y may be no larger than 6. For example, Y may be 5 or 6. In some embodiments, the number of valid codepoints or valid bit indices in the field may be W. W is positive integer. For example, W may be no larger than 54. In some embodiments, the number of codepoints or bit indices which are not "reserved" in the field may be W. W is positive integer. For example, W may be no larger than 54.

In some embodiments, if the number of antenna ports is configured as 4 or the number of SRS ports is 4, and if transform precoder is disabled, and if maxRank=2 or 3 or 4, and if ul-FullPowerTransmission-r16 is not configured or configured to fullpowerMode2 or configured to fullpower, and if codebookSubset is configured as partialAndNonCoherent. In some embodiments, if the number of layers is indicated as 1 by the index in the field, the TPMI1 associated/indicated with the index in the field can only be any one of TPMI1={0, 1, 2, 3, 4, 5, 6, 7, 8, 9, 10, 11} with 1 layer, and the TPMI2 associated/indicated with the index in the field can only be any one of TPMI2={0, 1, 2, 3, 4, 5, 6, 7, 8, 9, 10, 11} with 1 layer. In some embodiments, if the number of layers is indicated as 2 by the index in the field, the TPMI1 associated/indicated with the index in the field can only be any one of TPMI1={0, 1, 2, 3, 4, 5, 6, 7, 8, 9, 10, 11, 12, 13} with 2 layers, and the TPMI2 associated/indicated with the index in the field can only be any one of TPMI2={0, 1, 2, 3, 4, 5, 6, 7, 8, 9, 10, 11, 12, 13} with 2 layers. In some embodiments, if the number of layers is indicated as 3 by the index in the field, the TPMI1 associated/indicated with the index in the field can only be any one of TPMI1={0, 1} with 3 layers, and the TPMI2 associated/indicated with the index in the field can only be any one of TPMI2={0, 1} with 3 layers. In some embodiments, if the number of layers is indicated as 4 by the index in the field, the TPMI1 associated/indicated with the index in the field can only be any one of TPMI1={0, 1} with 4 layers, and the TPMI2 associated/indicated with the index in the field can only be any one of TPMI2={0, 1} with 4 layers. In some embodiments, the size for the field may be Y bits. Y is positive integer. For example, Y may be no larger than 9. For example, Y may be 8 or 9. In some embodiments, the number of valid codepoints or valid bit indices in the field may be W. W is positive integer. For example, W may be no larger than 348. In some embodiments, the number of codepoints or bit indices which are not "reserved" in the field may be W. W is positive integer. For example, W may be no larger than 348.

In some embodiments, if the number of antenna ports is configured as 4 or the number of SRS ports is 4, and if transform precoder is disabled, and if maxRank=2 or 3 or 4, and if ul-FullPowerTransmission-r16 is not configured or configured to fullpowerMode2 or configured to fullpower, and if codebookSubset is configured as fullAndPartialAndNonCoherent. In some embodiments, if the number of layers is indicated as 1 by the index in the field, the TPMI1 associated/indicated with the index in the field can only be any one of TPMI1={0, 1, 2, 3, 4, 5, 6, 7, 8, 9, 10, 11, 12, 13, 14, 15, 16, 17, 18, 19, 20, 21, 22, 23, 24, 25, 26, 27} with 1 layer, and the TPMI2 associated/indicated with the index in the field can only be any one of TPMI2={0, 1, 2, 3, 4, 5, 6, 7, 8, 9, 10, 11, 12, 13, 14, 15, 16, 17, 18, 19, 20, 21, 22, 23, 24, 25, 26, 27} with 1 layer. In some embodiments, if the number of layers is indicated as 2 by the index in the field, the TPMI1 associated/indicated with the index in the field can only be any one of TPMI1={0, 1, 2, 3, 4, 5, 6, 7, 8, 9, 10, 11, 12, 13, 14, 15, 16, 17, 18, 19, 20, 21} with 2 layers, and the TPMI2 associated/indicated with the index in the field can only be any one of TPMI2={0, 1, 2, 3, 4, 5, 6, 7, 8, 9, 10, 11, 12, 13, 14, 15, 16, 17, 18, 19, 20, 21} with 2 layers. In some embodiments, if the number of layers is indicated as 3 by the first index in the first field, the TPMI1 associated/indicated with the index in the field can only be any one of TPMI1={0, 1, 2, 3, 4, 5, 6} with 3 layers, and the TPMI2 associated/indicated with the index in the field can only be any one of TPMI2={0, 1, 2, 3, 4, 5, 6} with 3 layers. In some embodiments, if the number of layers is indicated as 4 by the index in the field, the TPMI1 associated/indicated with the index in the field can only be any one of TPMI1={0, 1, 2, 3, 4} with 4 layers, and the TPMI2 associated/indicated with the index in the field can only be any one of TPMI2={0, 1, 2, 3, 4} with 4 layers. In some embodiments, the size for the field may be Y bits. Y is positive integer. For example, Y may be no larger than 11. For example, Y may be 10 or 11. In some embodiments, the number of valid codepoints or valid bit indices in the field may be W. W is positive integer. For example, W may be no larger than 1299. In some embodiments, the number of codepoints or bit indices which are not "reserved" in the field may be W. W is positive integer. For example, W may be no larger than 1299.

In some embodiments, if the number of antenna ports is configured as 4 or the number of SRS ports is 4, and if transform precoder is disabled, and if maxRank=2, and if ul-FullPowerTransmission-r16 is configured to fullpowerMode1, and if codebookSubset is configured as non Coherent. In some embodiments, if the number of layers is indicated as 1 by the index in the field, the TPMI1 associated/indicated with the index in the field can only be any one of TPMI1={0, 1, 2, 3, 13} with 1 layer, and the TPMI2 associated/indicated with the index in the field can only be any one of TPMI2={0, 1, 2, 3, 13} with 1 layer. In some embodiments, if the number of layers is indicated as 2 by the index in the field, the TPMI1 associated/indicated with the index in the field can only be any one of TPMI1={0, 1, 2, 3, 4, 5, 6} with 2 layers, and the TPMI2 associated/indicated with the index in the field can only be any one of TPMI2={0, 1, 2, 3, 4, 5, 6} with 2 layers. In some embodiments, the size for the field may be Y bits. Y is positive integer. For example, Y may be no larger than 7. For example, Y may be 6 or 7. In some embodiments, the number of valid codepoints or valid bit indices in the field may be W. W is positive integer. For example, W may be no larger than 74. In some embodiments, the number of codepoints or bit indices which are not "reserved" in the field may be W. W is positive integer. For example, W may be no larger than 74.

In some embodiments, if the number of antenna ports is configured as 4 or the number of SRS ports is 4, and if transform precoder is disabled, and if maxRank=2, and if ul-FullPowerTransmission-r16 is configured to fullpower-Mode1, and if codebookSubset is configured as partialAndNonCoherent. In some embodiments, if the number of layers is indicated as 1 by the index in the field, the TPMI1 associated/indicated with the index in the field can only be any one of TPMI1={0, 1, 2, 3, 13, 12, 14, 15} with 1 layer, and the TPMI2 associated/indicated with the index in the field can only be any one of TPMI2={0, 1, 2, 3, 13, 12, 14, 15} with 1 layer. In some embodiments, if the number of layers is indicated as 2 by the first index in the first field, the TPMI1 associated/indicated with the index in the field can only be any one of TPMI1={0, 1, 2, 3, 4, 5, 6, 7, 8, 9, 10, 11, 12, 13} with 2 layers, and the TPMI2 associated/indicated with the index in the field can only be any one of TPMI2={0, 1, 2, 3, 4, 5, 6, 7, 8, 9, 10, 11, 12, 13} with 2 layers. In some embodiments, the size for the field may be Y bits. Y is positive integer. For example, Y may be no larger than 9. For example, Y may be 8 or 9. In some embodiments, the number of valid codepoints or valid bit indices in the field may be W. W is positive integer. For example, W may be no larger than 260. In some embodiments, the number of codepoints or bit indices which are not "reserved" in the field may be W. W is positive integer. For example, W may be no larger than 260.

In some embodiments, if the number of antenna ports is configured as 4 or the number of SRS ports is 4, and if transform precoder is disabled, and if maxRank=3 or 4, and if ul-FullPowerTransmission-r16 is configured to fullpowerMode1, and if codebookSubset is configured as non Coherent. In some embodiments, if the number of layers is indicated as 1 by the index in the field, the TPMI1 associated/indicated with the index in the field can only be any one of TPMI1={0, 1, 2, 3, 13} with 1 layer, and the TPMI2 associated/indicated with the index in the field can only be any one of TPMI2={0, 1, 2, 3, 13} with 1 layer. In some embodiments, if the number of layers is indicated as 2 by the index in the field, the TPMI1 associated/indicated with the index in the field can only be any one of TPMI1={0, 1, 2, 3, 4, 5, 6} with 2 layers, and the TPMI2 associated/indicated with the index in the field can only be any one of TPMI2={0, 1, 2, 3, 4, 5, 6} with 2 layers. In some embodiments, if the number of layers is indicated as 3 by the index in the field, the TPMI1 associated/indicated with the index in the field can only be any one of TPMI1={0, 1} with 3 layers, and the TPMI2 associated/indicated with the index in the field can only be any one of TPMI2={0, 1} with 3 layers. In some embodiments, if the number of layers is indicated as 4 by the index in the field, the TPMI1 associated/indicated with the index in the field can only be TPMI1={0} with 4 layers, and the TPMI2 associated/indicated with the index in the field can only be TPMI2={0} with 4 layers. In some embodiments, if the number of layers is indicated as 4 by the index in the field, there is only one codepoint/bit index for the index in the field to indicate the two TPMIs, and the first TPMI is TPMI1=0 with 4 layers, and the second TPMI is TPMI2={0} with 4 layers. In some embodiments, the size for the field may be Y bits. Y is positive integer. For example, Y may be no larger than 7. For example, Y may be 6 or 7. In some embodiments, the number of valid codepoints or valid bit indices in the field may be W. W is positive integer. For example, W may be no larger than 79. In some embodiments, the number of codepoints or bit indices which are not "reserved" in the field may be W. W is positive integer. For example, W may be no larger than 79.

In some embodiments, if the number of antenna ports is configured as 4 or the number of SRS ports is 4, and if transform precoder is disabled, and if maxRank=3 or 4, and if ul-FullPowerTransmission-r16 is configured to fullpowerMode1, and if codebookSubset is configured as partialAndNonCoherent. In some embodiments, if the number of layers is indicated as 1 by the index in the field, the TPMI1 associated/indicated with the index in the field can only be any one of TPMI1={0, 1, 2, 3, 13, 12, 14, 15} with 1 layer, and the TPMI2 associated/indicated with the index in the field can only be any one of TPMI2={0, 1, 2, 3, 13, 12, 14, 15} with 1 layer. In some embodiments, if the number of layers is indicated as 2 by the index in the field, the TPMI1 associated/indicated with the index in the field can only be any one of TPMI1={0, 1, 2, 3, 4, 5, 6, 7, 8, 9, 10, 11, 12, 13} with 2 layers, and the TPMI2 associated/indicated with the index in the field can only be any one of TPMI2={0, 1, 2, 3, 4, 5, 6, 7, 8, 9, 10, 11, 12, 13} with 2 layers. In some embodiments, if the number of layers is indicated as 3 by the index in the field, the TPMI1 associated/indicated with the index in the field can only be any one of TPMI1={0, 1, 2} with 3 layers, and the TPMI2 associated/indicated with the index in the field can only be any one of TPMI2={0, 1, 2} with 3 layers. In some embodiments, if the number of layers is indicated as 4 by the first index in the first field, the TPMI1 associated/indicated with the index in the field can only be any one of TPMI1={0, 1, 2} with 4 layers, and the TPMI2 associated/indicated with the index in the field can only be any one of TPMI2={0, 1, 2} with 4 layers. In some embodiments, the size for the field may be Y bits. Y is positive integer. For example, Y may be no larger than 9. For example, Y may be 8 or 9. In some embodiments, the number of valid codepoints or valid bit indices in the field may be W. W is positive integer. For example, W may be no larger than 278. In some embodiments, the number of codepoints or bit indices which are not "reserved" in the field may be W. W is positive integer. For example, W may be no larger than 278.

In some embodiments, if the number of antenna ports is configured as 2 or the number of SRS ports is 2, and if transform precoder is disabled, and if maxRank=2, and if ul-FullPowerTransmission-r16 is not configured or configured to fullpowerMode2 or configured to fullpower, and if codebookSubset is configured as nonCoherent. In some embodiments, if the number of layers is indicated as 1 by the index in the field, the TPMI1 associated/indicated with the index in the field can only be any one of TPMI1={0, 1} with 1 layer, and the TPMI2 associated/indicated with the index in the field can only be any one of TPMI2={0, 1} with 1 layer. In some embodiments, if the number of layers is indicated as 2 by the index in the field, the TPMI1 associated/indicated with the index in the field can only be TPMI1={0} with 2 layers, and the TPMI2 associated/indicated with the index in the field can only be TPMI2={0} with 2 layers. In some embodiments, if the number of layers is indicated as 2 by the index in the field, there is only one codepoint/bit index for the index in the field to indicate the two TPMIs, and the first TPMI is TPMI1=0 with 2 layers, and the second TPMI is TPMI2={0} with 2 layers. In some embodiments, the size for the field may be Y bits, and Y is positive integer. For example, Y may be no larger than 3. For example, Y may be 1 or 2 or 3. In some embodiments, the number of valid codepoints or valid bit indices in the field may be W. For example, W may be no larger than 5. For example, W may be 3 or 4 or 5. In some embodiments, the number of codepoints or bit indices which are not "reserved" in the field may be W. For example, W may be no larger than 5. For example, W may be 3 or 4 or 5.

In some embodiments, if the number of antenna ports is configured as 2 or the number of SRS ports is 2, and if transform precoder is disabled, and if maxRank=2, and if ul-FullPowerTransmission-r16 is not configured or configured to fullpowerMode2 or configured to fullpower, and if codebookSubset is configured as fullAndPartialAndNonCoherent. In some embodiments, if the number of layers is indicated as 1 by the index in the field, the TPMI1 associated/indicated with the index in the field can only be any one of TPMI1={0, 1, 2, 3, 4, 5} with 1 layer, and the TPMI2 associated/indicated with the index in the field can only be any one of TPMI2={0, 1, 2, 3, 4, 5} with 1 layer. In some embodiments, if the number of layers is indicated as 2 by the first index in the first field, the TPMI1 associated/indicated with the index in the field can only be any one of TPMI1={0, 1, 2} with 2 layers, and the TPMI2 associated/indicated with the index in the field can only be any one of TPMI2={0, 1, 2} with 2 layers. In some embodiments, the size for the field may be Y bits. Y is positive integer. For example, Y may be no larger than 6. For example, Y may be 4 or 5 or 6. In some embodiments, the number of valid codepoints or valid bit indices in the field may be W. W is positive integer. For example, W may be no larger than 45. In some embodiments, the number of codepoints or bit indices which are not "reserved" in the field may be W. W is positive integer. For example, W may be no larger than 45.

In some embodiments, if the number of antenna ports is configured as 2 or the number of SRS ports is 2, and if transform precoder is disabled, and if maxRank=2, and if ul-FullPowerTransmission-r16 is configured to fullpowerMode1, and if codebookSubset is configured as non Coherent. In some embodiments, if the number of layers is indicated as 1 by the first index in the first field, the TPMI1 associated/indicated with the index in the field can only be any one of TPMI1={0, 1, 2} with 1 layer, and the TPMI2 associated/indicated with the index in the field can only be any one of TPMI2={0, 1, 2} with 1 layer. In some embodiments, if the number of layers is indicated as 2 by the index in the field, the TPMI1 associated/indicated with the index in the field can only be TPMI1={0} with 2 layers, and the TPMI2 associated/indicated with the index in the field can only be TPMI2={0} with 2 layers. In some embodiments, if the number of layers is indicated as 2 by the index in the field, there is only one codepoint/bit index for the index in the field to indicate the two TPMIs, and the first TPMI is TPMI1=0 with 2 layers, and the second TPMI is TPMI2=0 with 2 layers. In some embodiments, the size for the field may be Y bits. Y is positive integer. For example, Y may be no larger than 4. For example, Y may be 2 or 3 or 4. In some embodiments, the number of valid codepoints or valid bit indices in the field may be W. W is positive integer. For example, W may be no larger than 10. In some embodiments, the number of codepoints or bit indices which are not "reserved" in the field may be W. W is positive integer. For example, W may be no larger than 10.

For example, the terminal device 110-1 may be configured with single DCI based M-TRP PUSCH repetition schemes, and the terminal device 110-1 may be configured with codebook based uplink/PUSCH transmission (when the higher layer parameter txConfig in pusch-Config is set to 'codebook'), there may be two sets of PUSCH transmissions/repetitions, and the precoder for the first set of PUSCH transmissions/repetitions is based on a new/enhanced TPMI/PMI indicated in the field "precoding information and number of layers" in DCI.

In some embodiments, the terminal device 110-1 may determine 2015 the first TPMI based on the control information. The index may correspond to a number of layers for the plurality of PUSCH transmissions. The first index may further correspond to the first value of the first TPMI and correspond to a second value of the second TPMI. The terminal device 110-1 determines 2020 a second TPMI based on one or more of the followings: the number of layers, a configuration of codebook subset type, a configuration of full power mode, the index, or the first value of the first TPMI.

In some embodiments, there may be at least one index/codepoint in the field in the (new/enhanced) TPMI/PMI field which indicates the number of layers and two TPMI values. The number of layers is applied for the first and second set of PUSCH transmissions/repetitions. The first TPMI of the index/codepoint in the field may be used for the first set of PUSCH transmissions/repetitions. The second TPMI of the index/codepoint in the field may be used for the second set of PUSCH transmissions/repetitions. If there is only one TPMI value of the index/codepoint in the field, the TPMI value may be used for the first set of PUSCH transmissions/repetitions, or used for both the first and second set of PUSCH transmissions/repetitions. If the number of PUSCH transmissions/repetitions is 1, the first TPMI of the index/codepoint in the field is applied for the PUSCH transmission.

In some embodiments, the combination of two TPMI values associated with same index/codepoint in the field may be configured in at least one of RRC, MAC CE and DCI. Alternatively, the TPMI values associated with same index/codepoint are associated with same number of layers, and associated with same type of codebookSubset and/or same type of full power mode. Taking 4 antenna ports as an example, and if transform precoder is disabled, maxRank=2 or 3 or 4, and ul-FullPowerTransmission-r16 is not configured or configured to fullpowerMode2 or configured to fullpower for example, if the number of layers is 1, and if the first TPMI value is any one of {0, 1, 2, 3}, the second TPMI value can only be any one of {0, 1, 2, 3} and/or with a different value from the first TPMI value. In this way, number of bits for the additional/second TPMI field can be reduced, and only one field designed in DCI, which can save the signaling overhead in DCI.

In some embodiments, there may be a set (e.g. SE) of available pairs of two TPMIs (e.g. TPMI1 and TPMI2) in the TPMI/RI field. The set may be different based on different values of number of layers. In some embodiments, a subset (e.g. $S_{J1\_S}$) of available pairs of two TPMIs (e.g. TPMI1 and TPMI2) from SE may be defined/configured. For example, the subset may be different for different set of $S_{J1}$. Alternatively, the subset may be predefined or configured by at least one of: radio resource control (RRC), medium access control (MAC) control element (CE) or DCI. For example, same value of TPMI1 and TPMI2 is not included in the set or subset. For example, in this way, the number of bits for the second TPMI field can be further reduced, which can save the signaling overhead in DCI.

Referring back to FIG. 2, the terminal device 110-1 may determine 2025 a first precoding matrix based on the first TPMI. The terminal device 110-1 may also determine 2030 a second precoding matrix based on the second TPMI. For example, the precoding matrix may be determined based on the TPMI by the following:

When the higher-layer parameter txConfig is not configured, the precoding matrix W=1.

TABLE 55

(for example, corresponding to Table 6.3.1.5-1 in 3GPP standard specification):
Precoding matrix W for single-layer transmission using two antenna ports.

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

TABLE 56

(for example, corresponding to Table 6.3.1.5-2 in 3GPP standard specification): Precoding matrix W for single-layer transmission using four antenna ports with transform precoding enabled.

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

TABLE 57

(for example, corresponding to Table 6.3.1.5-3 in 3GPP standard specification): Precoding matrix W for single-layer transmission using four antenna ports with transform precoding disabled.

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |

TABLE 57-continued (for example, corresponding to Table 6.3.1.5-3 in 3GPP standard specification): Precoding matrix W for single-layer transmission using four antenna ports with transform precoding disabled.

| TPMI index | W (ordered from left to right in increasing order of TPMI index) |
|---|---|
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\j\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$   —  —  —  — |

TABLE 58

(for example, corresponding to Table 6.3.1.5-4 in 3GPP standard specification): Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1&0\\0&1\end{bmatrix}$ $\frac{1}{\sqrt{2}}\begin{bmatrix}1&1\\1&-1\end{bmatrix}$ $\frac{1}{2}\begin{bmatrix}1&1\\j&-j\end{bmatrix}$ |

TABLE 59

(for example, corresponding to Table 6.3.1.5-5 in 3GPP standard specification): Precoding matrix W for two-layer transmission using four antenna ports with transform precoding disabled.

| TPMI index | W (ordered from left to right in increasing order |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$   —  — |

TABLE 60

(for example, corresponding to Table 6.3.1.5-6 in 3GPP standard specification): Precoding matrix W for three-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0&0\\0&1&0\\0&0&1\\0&0&0\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ $\frac{1}{2\sqrt{3}}\begin{bmatrix}1&1&1\\-1&1&-1\\1&1&-1\\-1&1&1\end{bmatrix}$ $\frac{1}{2\sqrt{3}}\begin{bmatrix}1&1&1\\-1&1&-1\\j&j&-j\\-j&j&j\end{bmatrix}$ — |

TABLE 61

(for example, corresponding to Table 6.3.1.5-7: Precoding matrix W for four-layer transmission using four antenna ports with transform precoding disabled.

| TPMI index | W (ordered from left to right in increasing order of TPMI index) |
|---|---|
| 0-3 | $\frac{1}{2}\begin{bmatrix}1&0&0&0\\0&1&0&0\\0&0&1&0\\0&0&0&1\end{bmatrix}$ $\frac{1}{2\sqrt{2}}\begin{bmatrix}1&1&0&0\\0&0&1&1\\1&-1&0&0\\0&0&1&-1\end{bmatrix}$ $\frac{1}{2\sqrt{2}}\begin{bmatrix}1&1&0&0\\0&0&1&1\\j&-j&0&0\\0&0&j&-j\end{bmatrix}$ $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ — — — |

35

Referring back to FIG. 2, the terminal device 110-1 may apply 2035 the first precoding matrix to the first set of PUSCH transmissions. The terminal device 110-1 may also apply 2040 the second precoding matrix to the second set of PUSCH transmissions. For example, the PUSCH transmissions may be precoded based on the precoding matrix. The terminal device 110-1 transmits 2045 the PUSCH transmissions based on the first TPMI and the second TPMI.

Figure 3:
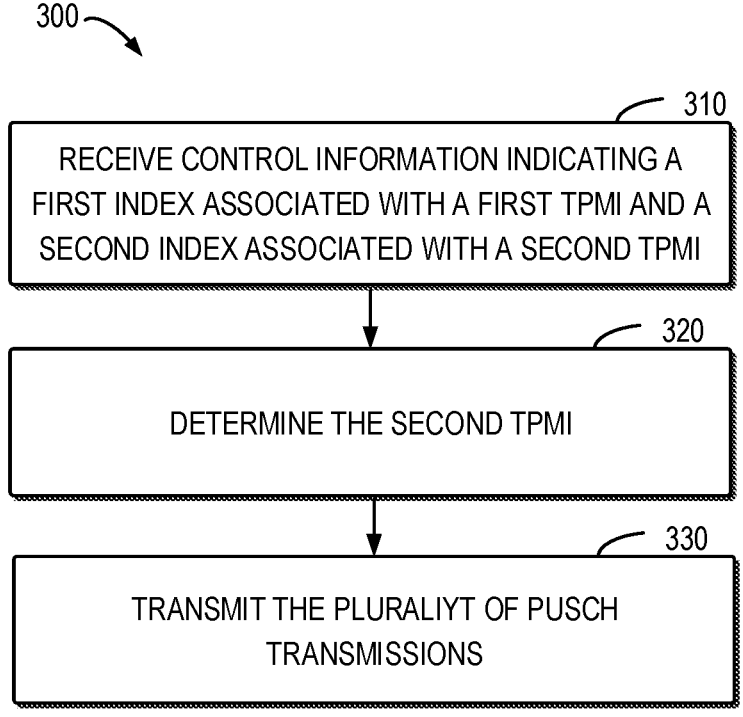
FIG. 3 illustrates an example method of communication implemented at a terminal device in accordance with some embodiments of the present disclosure.

FIG. 3 shows a flowchart of an example method 300 in accordance with an embodiment of the present disclosure. Only for the purpose of illustrations, the method 300 can be implemented at a terminal device 110-1 as shown in FIG. 1.

At block 310, the terminal device 110-1 receives control information from the network device 120. The control information indicates a first index associated with a first transmission precoding matrix indicator (TPMI). The control information also indicates a second index associated with a second TPMI. The first index corresponds to a number of layers for the plurality of PUSCH transmissions. In some embodiments, the first index corresponds to the first value of the first TPMI and the second index corresponds to a second value of the second TPMI. The plurality of PUSCH transmissions comprises a first set of PUSCH transmissions and a second set of PUSCH transmission. The first set of PUSCH transmissions may comprise a second number of PUSCH transmissions. The second number is in a range from 1 to 64. For example, the second number may be any suitable number for {1, 2, 3, . . . , 64}. The second set of PUSCH transmissions may comprise a third number of PUSCH transmissions. The third number is in a range from 1 to 64. For example, the third number may be any suitable number for {1, 2, 3, . . . , 64}.

At block 320, the terminal device 110-1 determines the second TPMI based on the number of layers and at least one of: a configuration of codebook subset type, a configuration of full power mode, the first index, the second index, or a first value of the first TPMI. For example, the configuration of codebook subset type comprises at least one of: nonCoherent, partialAndNonCoherent, or fullyAndPartialAndNonCoherent. In addition, the configuration of full power mode comprises at least one of: fullpowerMode1, fullpowerMode2, or fullpower.

At block 330, the terminal device 110-1 transmits, to the network device 120, the plurality of PUSCH transmissions processed based on the first TPMI and the second TPMI. In some embodiments, the terminal device 110-1 may determine a first precoding matrix based on the first TPMI and determine a second precoding matrix based on the second TPMI.

In some embodiment, if the plurality of PUSCH transmissions comprises a first set of PUSCH transmissions and a second set of PUSCH transmission, the terminal device 110-1 may apply the first precoding matrix to the first set of PUSCH and apply the second precoding matrix to the second set of PUSCH transmissions.

Figure 4:
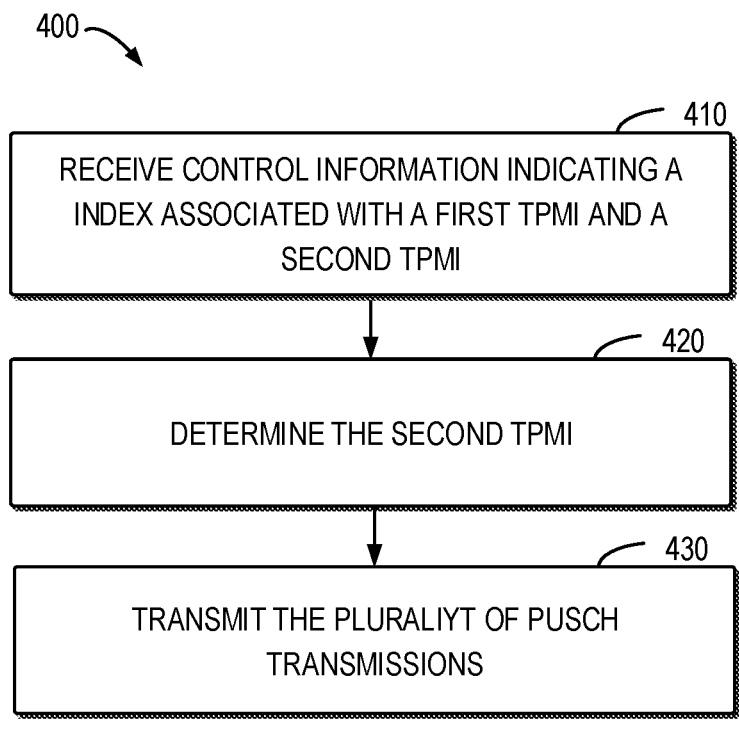
FIG. 4 illustrates an example method of communication implemented at a terminal device in accordance with some embodiments of the present disclosure.

FIG. 4 shows a flowchart of an example method 400 in accordance with an embodiment of the present disclosure. Only for the purpose of illustrations, the method 400 can be implemented at a terminal device 110-1 as shown in FIG. 1.

At block 410, the terminal device 110-1 receives control information from the network device 120. The control information indicates an index associated with the first TPMI and the second TPMI for the plurality of PUSCH transmissions. The index corresponds to a number of layers for the plurality of PUSCH transmissions. In some embodiments, the index corresponds to the first value of the first TPMI and corresponds to a second value of the second TPMI. The plurality of PUSCH transmissions comprises a first set of PUSCH transmissions and a second set of PUSCH transmission. The first set of PUSCH transmissions may comprise a second number of PUSCH transmissions. The second number is in a range from 1 to 64. For example, the second number may be any suitable number for {1, 2, 3, . . . , 64}. The second set of PUSCH transmissions may comprise a third number of PUSCH transmissions. The third number is in a range from 1 to 64. For example, the third number may be any suitable number for {1, 2, 3, . . . , 64}.

At block 420, the terminal device 110-1 determines the second TPMI based on at least one of: the number of layers, a configuration of codebook subset type, a configuration of full power mode, or a first value of the first TPMI. For example, the configuration of codebook subset type comprises at least one of: nonCoherent, partialAndNonCoherent, or fullyAndPartialAndNonCoherent. In addition, the configuration of full power mode comprises at least one of: fullpowerMode1, fullpowerMode2, or fullpower.

At block 430, the terminal device 110-1 transmits, to the network device 120, the plurality of PUSCH transmissions processed based on the first TPMI and the second TPMI. In some embodiments, the terminal device 110-1 may determine a first precoding matrix based on the first TPMI and determine a second precoding matrix based on the second TPMI.

In some embodiment, if the plurality of PUSCH transmissions comprises a first set of PUSCH transmissions and a second set of PUSCH transmission, the terminal device 110-1 may apply the first precoding matrix to the first set of PUSCH and apply the second precoding matrix to the second set of PUSCH transmissions.

Figure 5:
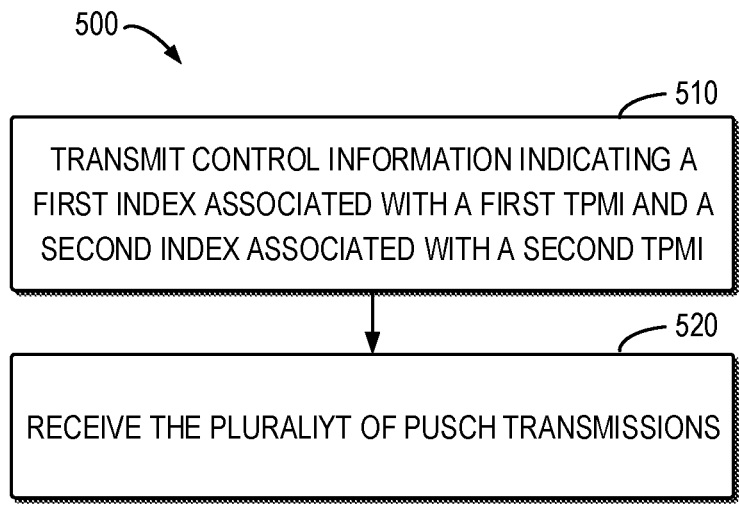
FIG. 5 illustrates an example method of communication implemented at a network device in accordance with some embodiments of the present disclosure.

FIG. 5 shows a flowchart of an example method 500 in accordance with an embodiment of the present disclosure. Only for the purpose of illustrations, the method 500 can be implemented at a network device 120 as shown in FIG. 1.

At block 510, the network device 120 transmits control information to the first device 110-1. The control information indicates a first index associated with a first transmission precoding matrix indicator (TPMI) for a plurality of physical uplink shared channel (PUSCH) transmissions. The control information also indicates a second index associated with a second TPMI for the plurality of PUSCH transmissions. The first index corresponds to a number of layers for the plurality of PUSCH transmissions. In some embodiments, the first index corresponds to the first value of the first TPMI and the second index corresponds to a second value of the second TPMI. The plurality of PUSCH transmissions comprises a first set of PUSCH transmissions and a second set of PUSCH transmission. The first set of PUSCH transmissions may comprise a second number of PUSCH transmissions. The second number is in a range from 1 to 64. For example, the second number may be any suitable number for {1, 2, 3, . . . , 64}. The second set of PUSCH transmissions may comprise a third number of PUSCH transmissions. The third number is in a range from 1 to 64. For example, the third number may be any suitable number for {1, 2, 3, . . . , 64}.

The second TPMI may be determined based on the number of layers and at least one of: a configuration of codebook subset type, a configuration of full power mode, or a first value of the first TPMI. For example, the configuration of codebook subset type comprises at least one of: nonCoherent, partialAndNonCoherent, or fullyAndPartialAndNonCoherent. In addition, the configuration of full power mode comprises at least one of: fullpowerMode1, fullpowerMode2, or fullpower.

At block 520, the network device 120 receives, from the terminal device 110-1, the plurality of PUSCH transmissions processed based on the first TPMI and the second TPMI. In some embodiments, the terminal device 110-1 may determine a first precoding matrix based on the first TPMI and determine a second precoding matrix based on the second TPMI.

Figure 6:
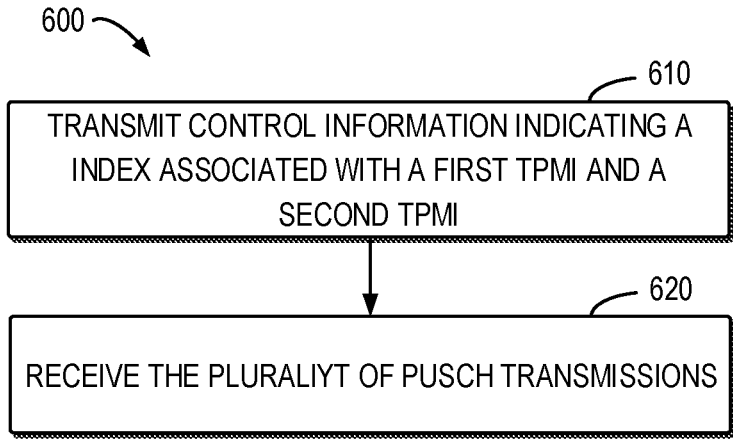
FIG. 6 illustrates an example method of communication implemented at a network device in accordance with some embodiments of the present disclosure.

FIG. 6 shows a flowchart of an example method 600 in accordance with an embodiment of the present disclosure. Only for the purpose of illustrations, the method 600 can be implemented at a network device 120 as shown in FIG. 1.

At block 610, the network device 120 transmits control information to the first device 110-1. The control information indicates an index associated with the first TPMI and the second TPMI for the plurality of PUSCH transmissions. The index corresponds to a number of layers for the plurality of PUSCH transmissions. In some embodiments, the index corresponds to the first value of the first TPMI and corresponds to a second value of the second TPMI. The plurality of PUSCH transmissions comprises a first set of PUSCH transmissions and a second set of PUSCH transmission. The first set of PUSCH transmissions may comprise a second number of PUSCH transmissions. The second number is in a range from 1 to 64. For example, the second number may be any suitable number for {1, 2, 3, . . . , 64}. The second set of PUSCH transmissions may comprise a third number of PUSCH transmissions. The third number is in a range from 1 to 64. For example, the third number may be any suitable number for {1, 2, 3, . . . , 64}.

The second TPMI may be determined based on the number of layers and at least one of: a configuration of codebook subset type, a configuration of full power mode, or a first value of the first TPMI. For example, the configuration of codebook subset type comprises at least one of: nonCoherent, partialAndNonCoherent, or fullyAndPartialAndNonCoherent. In addition, the configuration of full power mode comprises at least one of: fullpowerMode1, fullpowerMode2, or fullpower.

At block 520, the network device 120 receives, from the terminal device 110-1, the plurality of PUSCH transmissions processed based on the first TPMI and the second TPMI. In some embodiments, the terminal device 110-1 may determine a first precoding matrix based on the first TPMI and determine a second precoding matrix based on the second TPMI.

In some embodiments, the maximum number of layers may be 1 or 2 for the plurality of PUSCH transmissions. For example, the rows/indices for TPMIs with number of layers of 3 or 4 in the Tables 1-61 or in the above embodiments may be omitted.

Figure 7:
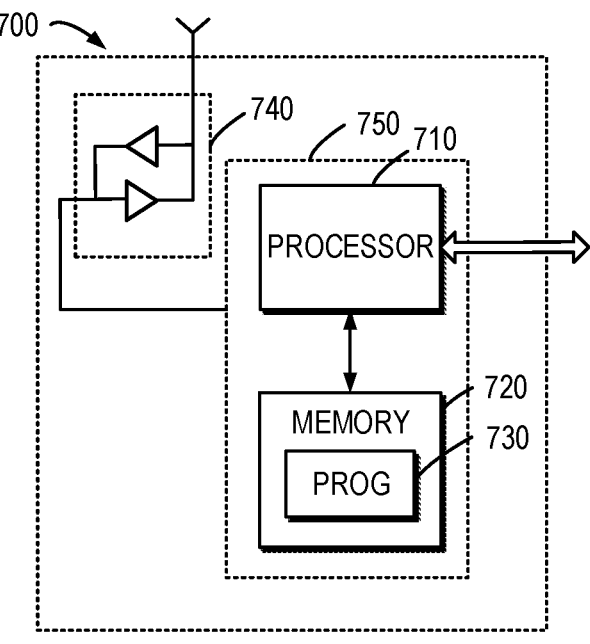
FIG. 7 is a simplified block diagram of a device that is suitable for implementing embodiments of the present disclosure.

FIG. 7 is a simplified block diagram of a device 700 that is suitable for implementing embodiments of the present disclosure. The device 700 can be considered as a further example implementation of the network device 110 or the terminal device 120 as shown in FIG. 1. Accordingly, the device 700 can be implemented at or as at least a part of the network device 110 or the terminal device 120.

As shown, the device 700 includes a processor 710, a memory 720 coupled to the processor 710, a suitable transmitter (TX) and receiver (RX) 740 coupled to the processor 710, and a communication interface coupled to the TX/RX 740. The memory 710 stores at least a part of a program 730. The TX/RX 740 is for bidirectional communications. The TX/RX 740 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 730 is assumed to include program instructions that, when executed by the associated processor 710, enable the device 700 to operate in accordance with the embodiments of the present disclosure, as discussed herein with reference to FIGS. 1 to 5. The embodiments herein may be implemented by computer software executable by the processor 710 of the device 700, or by hardware, or by a combination of software and hardware. The processor 710 may be configured to implement various embodiments of the present disclosure. Furthermore, a combination of the processor 710 and memory 720 may form processing means 850 adapted to implement various embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

In some embodiments, a terminal device (for example, the terminal device 110) comprising circuitry configured to: receive, from the network device, control information indicating a first index associated with a first transmission precoding matrix indicator (TPMI) and a second index associated with a second TPMI, the first index corresponding to a number of layers for a plurality of physical uplink shared channel (PUSCH) transmissions; determine the second TPMI based on the number of layers and at least one of a configuration of codebook subset type, a configuration of full power mode, the first index, the second index, or a first value of the first TPMI; and transmit, to the network device, the plurality of PUSCH transmissions processed based on the first TPMI and the second TPMI.

In some embodiments, the first index corresponds to the first value of the first TPMI and the second index corresponds to a second value of the second TPMI.

In some embodiments, the circuitry is further configured to determine a first precoding matrix based on the first TPMI; and determine a second precoding matrix based on the second TPMI.

In some embodiments, wherein the plurality of PUSCH transmissions comprises a first set of PUSCH transmissions and a second set of PUSCH transmission, and the circuitry is configured to transmit the plurality of PUSCH transmissions by applying the first precoding matrix to the first set of PUSCH transmissions; applying the second precoding matrix to the second set of PUSCH transmissions; and transmitting the first set of PUSCH transmissions and the second set of PUSCH transmissions.

In some embodiments, the first set of PUSCH transmissions comprises a second number of PUSCH transmissions, wherein the second number is in a range from 1 to 64, and the second set of PUSCH transmissions comprises a third number of PUSCH transmissions, wherein the third number is in a range from 1 to 64.

In some embodiments, the configuration of codebook subset type comprises at least one of: nonCoherent, partialAndNonCoherent, or fullyAndPartialAndNonCoherent.

In some embodiments, the configuration of full power mode comprises at least one of: fullpowerMode1, fullpowerMode2, or fullpower.

In some embodiments, a terminal device (for example, the terminal device 110) comprising circuitry configured to: receive, at a terminal device and from the network device, control information indicating an index associated with a first transmission precoding matrix indicator (TPMI) and a second TPMI for a plurality of physical uplink shared channel (PUSCH)transmissions, the index corresponding to a number of layers for the plurality of PUSCH transmissions; determine the second TPMI based on at least one of: the number of layers, a configuration of codebook subset type, a configuration of full power mode, the index, or a first value of the first TPMI; and transmit, to the network device, the plurality of PUSCH transmissions processed based on the first TPMI and the second TPMI.

In some embodiments, the index corresponds to the first value of the first TPMI and corresponds to a second value of the second TPMI.

In some embodiments, the circuitry is further configured to determine a first precoding matrix based on the first TPMI; and determine a second precoding matrix based on the second TPMI.

In some embodiments, wherein the plurality of PUSCH transmissions comprises a first set of PUSCH transmissions and a second set of PUSCH transmission, and the circuitry is configured to transmit the plurality of PUSCH transmissions by applying the first precoding matrix to the first set of PUSCH transmissions; applying the second precoding matrix to the second set of PUSCH transmissions; and transmitting the first set of PUSCH transmissions and the second set of PUSCH transmissions.

In some embodiments, the first set of PUSCH transmissions comprises a second number of PUSCH transmissions, wherein the second number is in a range from 1 to 64, and the second set of PUSCH transmissions comprises a third number of PUSCH transmissions, wherein the third number is in a range from 1 to 64.

In some embodiments, the configuration of codebook subset type comprises at least one of: nonCoherent, partialAndNonCoherent, or fullyAndPartialAndNonCoherent.

In some embodiments, the configuration of full power mode comprises at least one of: fullpowerMode1, fullpowerMode2, or fullpower.

In some embodiments, a network device (for example, the network device 120) comprising circuitry configured to: transmit, at a network device and to the terminal device, control information indicating a first index associated with a first transmission precoding matrix indicator (TPMI) and a second index associated with a second TPMI, the first index corresponding to a number of layers for a plurality of physical uplink shared channel (PUSCH) transmissions, the second TPMI determined based on the value of the number of layers and at least one of: a configuration of codebook subset type, a configuration of full power mode, the first index, the second index, or the first value of the first TPMI; receive, from the terminal deice, the plurality of PUSCH transmission processed based on based on the first TPMI and the second TPMI.

In some embodiments, the first index corresponds to the first value of the first TPMI and the second index corresponds to a second value of the second TPMI.

In some embodiments, the first set of PUSCH transmissions comprises a second number of PUSCH transmissions, wherein the second number is in a range from 1 to 64, and the second set of PUSCH transmissions comprises a third number of PUSCH transmissions, wherein the third number is in a range from 1 to 64.

In some embodiments, the configuration of codebook subset type comprises at least one of: nonCoherent, partialAndNonCoherent, or fullyAndPartialAndNonCoherent.

In some embodiments, the configuration of full power mode comprises at least one of: fullpowerMode1, fullpowerMode2, or fullpower.

In some embodiments, a network device (for example, the network device 120) comprising circuitry configured to: transmit, at a network device and to the terminal device, control information control information indicating an index associated with a first transmission precoding matrix indicator (TPMI) and a second TPMI for a plurality of physical uplink shared channel (PUSCH) transmissions, the index corresponding to a number of layers for the plurality of PUSCH transmissions, the second TPMI for the plurality determined based on at least one of: the value of the number of layers, a configuration of codebook subset type, a configuration of full power mode, or the first value of the first TPMI; and receive, from the terminal deice, the plurality of PUSCH transmission processed based on based on the first TPMI and the second TPMI.

In some embodiments, the index corresponds to the first value of the first TPMI and corresponds to a second value of the second TPMI.

In some embodiments, the first set of PUSCH transmissions comprises a second number of PUSCH transmissions, wherein the second number is in a range from 1 to 64, and the second set of PUSCH transmissions comprises a third number of PUSCH transmissions, wherein the third number is in a range from 1 to 64.

In some embodiments, the configuration of codebook subset type comprises at least one of: nonCoherent, partialAndNonCoherent, or fullyAndPartialAndNonCoherent.

In some embodiments, the configuration of full power mode comprises at least one of: fullpowerMode1, fullpowerMode2, or fullpower.

The term "circuitry" used herein may refer to one or more or all of the following: (a) hardware circuit implementations and (b) combinations of hardware circuits and software. For example, the circuitry may be (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3 to 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of a User Equipment (UE), the method comprising:

receiving Downlink control information (DCI) comprising a first field and a second field, wherein the first field indicates a first Precoding information, information and a number of layers and wherein the second field indicates a second Precoding information; and applying, to Physical Uplink Shared Channel (PUSCH) repetitions, two Transmitted Precoding Matrix Indicators (TPMIs) that are based on the first Precoding information, the number of layers and the second Precoding information related to the number of layers of the DCI, wherein a number of bits of the second field is determined based on the second Precoding information, a parameter codebookSubset and the number of layers indicated by the first field, and wherein the parameter codebookSubset comprises fully-AndPartialAndNonCoherent, partial AndNonCoherent or nonCoherent.

2. The method of claim 1, wherein the second Precoding information is associated with the number of layers.

3. The method of claim 1, further comprising:

determining PUSCH transmission precoders based on the TPMIs for two or four antenna ports.

4. The method of claim 1, wherein:

the number of bits of the second field is determined based on third information related to two Sounding Reference Resource (SRS) resource sets.

5. The method of claim 4, wherein:

the number of bits of the second field is determined based on a number of antenna ports.

6. A User Equipment (UE), comprising:

a memory storing instructions; and a processor configured to execute the instructions to:

receive Downlink control information (DCI) comprising a first field and a second field, wherein the first field indicates a first Precoding information and a number of layers and wherein the second field indicates a second Precoding information; and apply, to Physical Uplink Shared Channel (PUSCH) repetitions, two Transmitted Precoding Matrix Indicators (TPMIs) that are based on the first Precoding information, the number of layers and the second Precoding information related to the number of layers of the DCI, wherein a number of bits of the second field is determined based on the second Precoding information, a parameter codebookSubset and the number of layers indicated by the first field, and wherein the parameter codebookSubset comprises fully AndPartialAndNonCoherent, partial AndNonCoherent or noncoherent.

7. The UE of claim 6, wherein the second Precoding information is associated with the number of layers.

8. The UE of claim 6, wherein:

the UE determines PUSCH transmission precoders based on the TPMIs for two or four antenna ports.

9. The UE of claim 6, wherein:

the number of bits of the second field is determined based on third information related to two Sounding Reference Resource (SRS) resource sets.

10. The UE of claim 9, wherein:

the number of bits of the second field is determined based on a number of antenna ports.

* * * * *